US008502178B2

(12) United States Patent
Moriya et al.

(10) Patent No.: US 8,502,178 B2
(45) Date of Patent: Aug. 6, 2013

(54) EXTREME ULTRAVIOLET LIGHT SOURCE APPARATUS, METHOD FOR CONTROLLING EXTREME ULTRAVIOLET LIGHT SOURCE APPARATUS, AND RECORDING MEDIUM WITH PROGRAM RECORDED THEREON

(75) Inventors: Masato Moriya, Hiratsuka (JP); Hideyuki Hayashi, Hiratsuka (JP); Tooru Abe, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/349,355

(22) Filed: Jan. 12, 2012

(65) Prior Publication Data

US 2012/0175533 A1 Jul. 12, 2012

Related U.S. Application Data

(63) Continuation of application No. PCT/JP2010/062854, filed on Jul. 29, 2010.

(30) Foreign Application Priority Data

Jul. 29, 2009 (JP) ................................ 2009-177063

(51) Int. Cl.
*G01J 3/10* (2006.01)
*H05G 2/00* (2006.01)

(52) U.S. Cl.
USPC .................. 250/504 R; 372/38.02; 372/38.1; 372/55; 372/57

(58) Field of Classification Search
USPC ............... 372/38.02, 38.1, 55, 57; 250/504 R
See application file for complete search history.

(56) References Cited

U.S. PATENT DOCUMENTS

| | | | | |
|---|---|---|---|---|
| 3,775,840 | A | 12/1973 | Diepers et al. | |
| 4,866,517 | A * | 9/1989 | Mochizuki et al. | 378/119 |
| 4,969,169 | A * | 11/1990 | Forsyth | 378/34 |
| 6,304,630 | B1 | 10/2001 | Bisschops et al. | |
| 6,655,808 | B2 | 12/2003 | Antoni et al. | |
| 6,721,344 | B2 | 4/2004 | Nakao et al. | |
| 6,792,076 | B2 * | 9/2004 | Petach et al. | 378/119 |
| 6,855,943 | B2 | 2/2005 | Shields | |
| 6,973,164 | B2 * | 12/2005 | Hartlove et al. | 378/119 |
| 6,987,279 | B2 * | 1/2006 | Hoshino et al. | 250/504 R |
| 7,095,773 | B2 | 8/2006 | Nakao et al. | |
| 7,122,814 | B2 | 10/2006 | Hergenhan et al. | |
| 7,217,940 | B2 * | 5/2007 | Partlo et al. | 250/504 R |

(Continued)

FOREIGN PATENT DOCUMENTS

| | | |
|---|---|---|
| EP | 0 439 867 | 8/1991 |
| JP | 2001-002426 A | 1/2001 |

(Continued)

*Primary Examiner* — David A Vanore

(74) *Attorney, Agent, or Firm* — McDermott Will & Emery LLP

(57) ABSTRACT

An extreme ultraviolet light source apparatus, in which a target material is irradiated with a laser beam from a laser apparatus and the target material is turned into plasma, thereby emitting extreme ultraviolet light, may include a burst control unit configured to control irradiation of the target material is irradiated with the laser beam outputted successively in pulses from the laser apparatus when the extreme ultraviolet light is emitted successively in pulses. The target material is prevented from being turned into plasma by the laser beam while the laser beam is outputted successively in pulses from the laser apparatus when the successive pulsed emission is paused.

19 Claims, 47 Drawing Sheets

U.S. PATENT DOCUMENTS

| | | | | |
|---|---|---|---|---|
| 7,271,401 | B2 * | 9/2007 | Imai et al. | 250/504 R |
| 7,288,777 | B2 * | 10/2007 | Partlo et al. | 250/504 R |
| 7,288,778 | B2 * | 10/2007 | Partio et al. | 250/504 R |
| 7,297,968 | B2 * | 11/2007 | Endo et al. | 250/504 R |
| 7,317,196 | B2 * | 1/2008 | Partlo et al. | 250/504 R |
| 7,368,742 | B2 | 5/2008 | Hergenhan et al. | |
| 7,382,816 | B2 | 6/2008 | Ariga et al. | |
| 7,405,413 | B2 | 7/2008 | Hergenhan et al. | |
| 7,405,416 | B2 * | 7/2008 | Algots et al. | 250/493.1 |
| 7,439,530 | B2 * | 10/2008 | Ershov et al. | 250/504 R |
| 7,480,030 | B2 * | 1/2009 | Cormont et al. | 355/69 |
| 7,598,509 | B2 * | 10/2009 | Ershov et al. | 250/504 R |
| 7,608,846 | B2 * | 10/2009 | Nakano | 250/504 R |
| 7,615,766 | B2 * | 11/2009 | Nakano | 250/504 R |
| 8,000,361 | B2 | 8/2011 | Abe et al. | |
| 2003/0047441 | A1 * | 3/2003 | Hensley et al. | 204/164 |
| 2003/0142198 | A1 | 7/2003 | Miyake | |
| 2004/0022295 | A1 | 2/2004 | Weulersse et al. | |
| 2004/0195529 | A1 * | 10/2004 | Hergenhan et al. | 250/504 R |
| 2005/0018716 | A1 | 1/2005 | Mueller et al. | |
| 2005/0115316 | A1 | 6/2005 | Giusti et al. | |
| 2005/0115361 | A1 * | 6/2005 | Forbes Jones et al. | 75/336 |
| 2005/0117620 | A1 | 6/2005 | Thro et al. | |
| 2005/0186716 | A1 * | 8/2005 | Kasumi | 438/149 |
| 2005/0265407 | A1 * | 12/2005 | Braun et al. | 372/30 |
| 2006/0017026 | A1 * | 1/2006 | Hergenhan et al. | 250/504 R |
| 2006/0203965 | A1 * | 9/2006 | Zink | 378/119 |
| 2007/0001131 | A1 * | 1/2007 | Ershov et al. | 250/503.1 |
| 2007/0158597 | A1 | 7/2007 | Fomenkov et al. | |
| 2008/0014986 | A1 | 1/2008 | Yun | |
| 2008/0149862 | A1 | 6/2008 | Hansson et al. | |
| 2008/0181268 | A1 * | 7/2008 | Dubois et al. | 372/30 |
| 2009/0218522 | A1 * | 9/2009 | Nakano et al. | 250/504 R |
| 2011/0220816 | A1 | 9/2011 | Kakizaki et al. | |

FOREIGN PATENT DOCUMENTS

| | | | |
|---|---|---|---|
| JP | 2001-015636 | A | 1/2001 |
| JP | 2005-197454 | A | 7/2005 |
| JP | 2006-048978 | A | 2/2006 |
| JP | 2007-109451 | A | 4/2007 |
| JP | 2008-270549 | A | 11/2008 |
| JP | 2009-091195 | A | 4/2009 |
| WO | WO 02/31932 | A1 | 4/2002 |

* cited by examiner

FIG. 36

| Pattern | Period | Charging Electrode 40 (S7) | Acceleration/ Deceleration Mechanism 50 (S8) |
|---|---|---|---|
| a1 | Successive Light Emission Period T2 | ON | OFF |
| | Successive Light Emission Pause PeriodT1 | ON | ON |
| a2 | Successive Light Emission Period T2 | OFF | ON |
| | Successive Light Emission Pause PeriodT1 | ON | ON |
| a3 | Successive Light Emission Period T2 | OFF | OFF |
| | Successive Light Emission Pause PeriodT1 | ON | ON |
| a4 | Successive Light Emission Period T2 | ON | ON |
| | Successive Light Emission Pause PeriodT1 | ON | OFF |
| a5 | Successive Light Emission Period T2 | ON | ON |
| | Successive Light Emission Pause PeriodT1 | OFF | ON |
| a6 | Successive Light Emission Period T2 | ON | ON |
| | Successive Light Emission Pause PeriodT1 | OFF | OFF |

FIG. 44

| Pattern | Period | First Electrode 40 (S7) | Deflection Mechanism 60 (S9) |
|---|---|---|---|
| b1 | Successive Light Emission Period T2 | ON | OFF |
| | Successive Light Emission Pause PeriodT1 | ON | ON |
| b2 | Successive Light Emission Period T2 | OFF | ON |
| | Successive Light Emission Pause PeriodT1 | ON | ON |
| b3 | Successive Light Emission Period T2 | OFF | OFF |
| | Successive Light Emission Pause PeriodT1 | ON | ON |
| b4 | Successive Light Emission Period T2 | ON | ON |
| | Successive Light Emission Pause PeriodT1 | ON | OFF |
| b5 | Successive Light Emission Period T2 | ON | ON |
| | Successive Light Emission Pause PeriodT1 | OFF | ON |
| b6 | Successive Light Emission Period T2 | ON | ON |
| | Successive Light Emission Pause PeriodT1 | OFF | OFF |

EXTREME ULTRAVIOLET LIGHT SOURCE APPARATUS, METHOD FOR CONTROLLING EXTREME ULTRAVIOLET LIGHT SOURCE APPARATUS, AND RECORDING MEDIUM WITH PROGRAM RECORDED THEREON

CROSS-REFERENCE TO RELATED APPLICATIONS

The present application is a continuation of PCT/JP2010/062854 filed Jul. 29, 2010, which claims priority from Japanese Patent Application No. 2009-177063 filed Jul. 29, 2009.

BACKGROUND

1. Technical Field

This disclosure relates to an extreme ultraviolet (EUV) light source apparatus, a method for controlling the extreme ultraviolet light source apparatus, and a recording medium with a program of the method recorded thereon.

2. Related Art

In recent years, as semiconductor production processes become capable of producing semiconductor devices with increasingly fine feature sizes, as photolithography has been making rapid progress toward finer fabrication. In the next generation, microfabrication of semiconductor devices with sizes of 60 nm to 45 nm, and further, feature sizes of 32 nm and finer will be required. Accordingly, in order to meet the demand for microfabrication at 32 nm and finer, an exposure apparatus is needed in which a system for generating EUV light at a wavelength of approximately 13 nm is combined with a reduced projection reflective optical system.

Three kinds of systems for generating EUV light are generally known, including Laser Produced Plasma (LLP) type system in which plasma is generated by irradiating a target material with a laser beam, a Discharge Produced Plasma (DPP) type system in which plasma is generated by electric discharge is used, and an Synchrotron Radiation (SR) type system in which orbital radiation is used to generate plasma.

SUMMARY

An extreme ultraviolet light source apparatus according to one aspect of this disclosure, having a laser apparatus configured to irradiate a target material, wherein the target material is turned into plasma and emits extreme ultraviolet light. The apparatus may include a burst control unit configured to control irradiation of the target material with the laser beam which is outputted successively in pulses from the laser apparatus, such that upon irradiation of the target material, the extreme ultraviolet light is emitted successively in pulses, and wherein the burst control unit is configured to prevent extreme ultraviolet light from being emitted from the target material by preventing the laser beam from irradiating the target material when the successive pulsed emission is paused.

A method according to another aspect of this disclosure for controlling a light source apparatus in which a target material is irradiated with a laser beam from a laser apparatus and the target material is turned into plasma and which emits extreme ultraviolet light may include: irradiating the target material with the laser beam outputted from the laser apparatus successively in pulses such that the extreme ultraviolet light is emitted successively in pulses; and preventing the laser beam from irradiating the target material, thereby preventing the target material from being turned into plasma by the laser beam while the laser beam is outputted from the laser apparatus successively in pulses when the successively pulsed emission is paused.

A recording medium according to yet another aspect of this disclosure with a program recorded thereon for controlling a light source apparatus in which a target material is irradiated with a laser beam from a laser apparatus and the target material is turned into plasma and which emits extreme ultraviolet light may include a program which causes the light source apparatus to control irradiation of the target material with the laser beam outputted successively in pulses from the laser apparatus such that the extreme ultraviolet light is emitted successively in pulses upon irradiation of the target material, and prevent extreme ultraviolet light from being emitted from the target material by preventing the laser beam from irradiating the target material when the successive pulsed emission is paused.

BRIEF DESCRIPTION OF THE DRAWINGS

FIG. 36 is a table showing ON-OFF control patterns of a charging electrode and an acceleration voltage mechanism in a successive light emission period and a successive light emission pause period.

FIG. 44 is a table showing ON-OFF control patterns of a charging electrode and a deflection mechanism in a successive light emission period and a successive light emission pause period.

DESCRIPTION OF PREFERRED EMBODIMENTS

Figure 1:
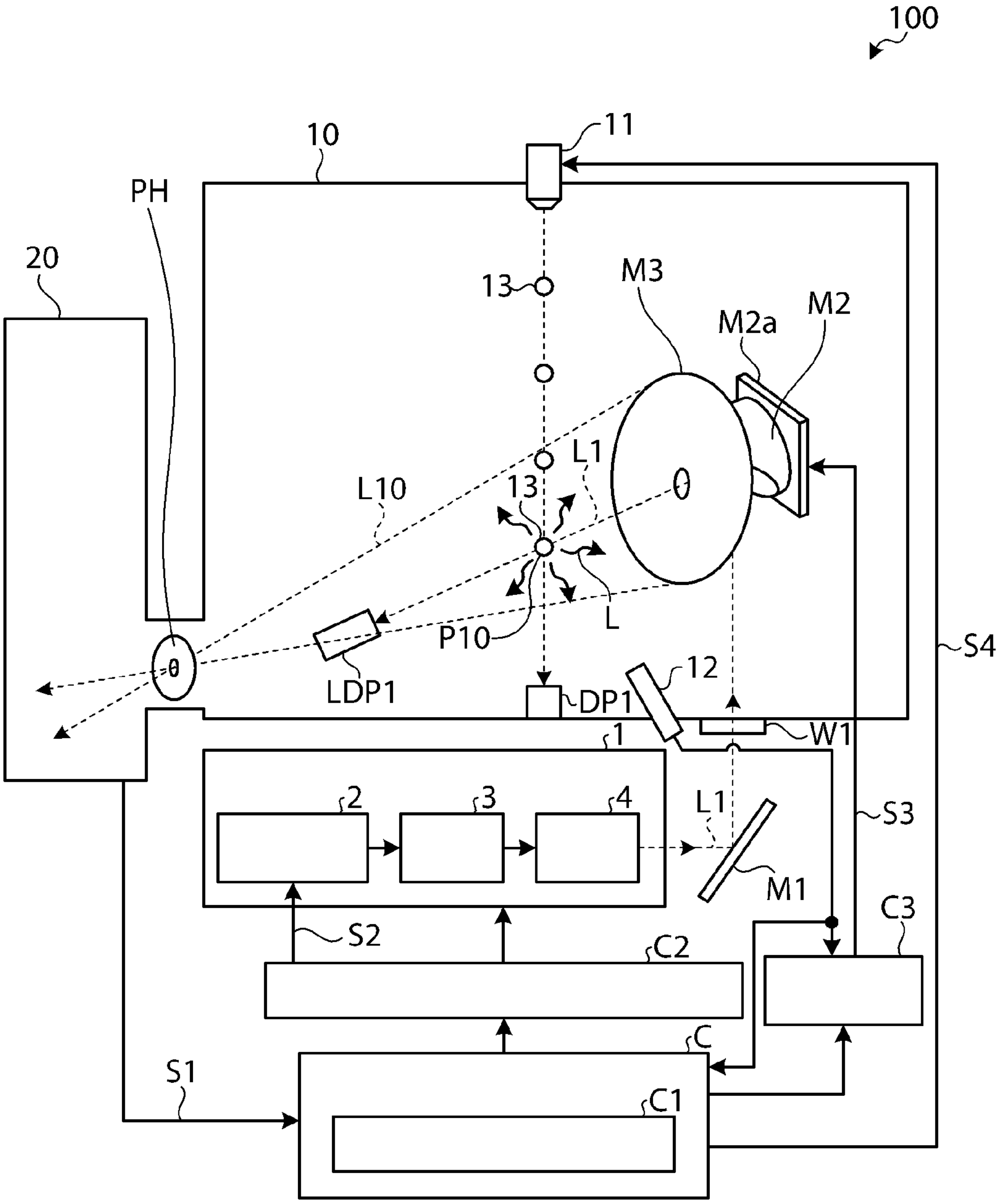
FIG. 1 schematically illustrates a configuration of an EUV light source apparatus according to a first embodiment of this disclosure.

Hereinafter, selected embodiments for implementing the present disclosure will be described in detail with reference to the accompanying drawings. In the subsequent description, each drawing merely illustrates shape, size, positional relationship, and so on, schematically to the extent that each drawing enables the content of this disclosure to be understood. The present disclosure is not limited to the shape, the size, the positional relationship, and so on, illustrated in each drawing. In certain instances, part of hatching along a section is omitted in the drawings in order to show the configuration clearly. Further, numerical values indicated hereafter are merely preferred examples of the present disclosure; thus, the present disclosure is not limited to the indicated numerical values.

First Embodiment

A first embodiment of the present disclosure is described below in detail with reference to the drawings. In the description to follow, an LPP type EUV light source apparatus will be illustrated as an example, but without being limited thereto, the embodiment may also be applied to a DPP type EUV light source apparatus or to an SR type light source apparatus. In the first embodiment, a case in which a target material is turned into plasma with single-stage laser irradiation will be illustrated as an example, but without being limited thereto, the configuration may be such that the target material is turned into plasma with multiple-stage laser irradiation, for example. Further, the first embodiment may be applied to a laser apparatus, a laser processing apparatus, and so forth.

In the present disclosure, the term "successive light emission operation (period)" may refer to an operation (period) in which EUV light is emitted successively; the term "successive light emission pause operation (period)" may refer to an operation (period) in which emission of the EUV light is paused; and the term "burst operation (period)" may refer to an operation (period) in which the successive light emission operation and the successive light emission pause operation alternate with each other.

FIG. 1 schematically illustrates the configuration of an EUV light source apparatus according to the first embodiment of the present disclosure. As shown in FIG. 1, in an LPP type EUV light source apparatus 100, a pulse laser beam L1 outputted from a driver laser 1, for example, may be focused on a tin (Sn) droplet 13, serving as a target material, supplied into an EUV chamber 10. The target material is turned into plasma by being irradiated with the pulse laser beam L1, after which, the target material may emit light L. Of the emitted light L, EUV light L10 of a desired wavelength (for example, wavelength of approximately 13.5 nm) may be reflected by an EUV collector mirror M3 configured to selectively reflect light at the desired wavelength and outputted to an exposure apparatus 20.

In the configuration shown in FIG. 1, the driver laser 1 may include an oscillator 2 for oscillating a seed beam of the pulse laser beam L1, and a pre-amplifier 3 and a main amplifier 4 for amplifying the seed beam outputted from the oscillator 2. Various types of lasers, such as a semiconductor laser, may be used for the oscillator 2. A pulse laser beam oscillated from the oscillator 2 may be amplified by the pre-amplifier 3 and the main amplifier 4, for example, configuring a two-stage amplifier. An amplifier with a mixed gas containing, for example, $CO_2$ as a gain medium may be used for the pre-amplifier 3 and the main amplifier 4. The pulse laser beam L1 outputted from the driver laser 1 may be guided to the EUV chamber 10 by an optical system including a mirror M1, for example, and thereafter, may enter the EUV chamber 10 through a window W1 provided to the EUV chamber 10.

A focusing mirror M2, which may be an off-axis paraboloidal mirror, and the EUV collector mirror M3 having a through-hole provided at substantially the center thereof may be provided in the EUV chamber 10. The focusing mirror M2 may reflect the pulse laser beam L1 incident thereon via the window W1 with high reflectance. The pulse laser beam L1 reflected with high reflectance may pass through the through-hole in the EUV collector mirror M3 and be focused in a plasma generation site P10. The focusing mirror M2 may be disposed outside the EUV chamber 10. In this case, the pulse laser beam L1 reflected by the optical system including the mirror M1, for example, may be reflected by the focusing mirror M2, may then pass through the window W1 and the through-hole in the EUV collector mirror M3, and may be focused in the plasma generation site P10.

A target supply unit 11 for supplying the target material in the form of a droplet 13 may be provided in the EUV chamber 10. For example, the target supply unit 11 may be configured to output the droplet 13 to the plasma generation site P10 in the EUV chamber 10. The target supply unit 11 may control timing at which and/or a direction to which the droplet 13 is outputted so that the droplet 13 may be irradiated with the pulse laser beam L1 in the plasma generation site P10. Without being limited thereto, however, the driver laser 1 may control timing at which and/or a direction to which the pulse laser beam L1 is outputted so that the pulse laser beam L1 may be focused on the droplet 13 in the plasma generation site P10. The target material may be supplied into the EUV chamber 10 in the form of a solid target, such as a wire, a ribbon, a disc, and so forth, without being limited to the form of the droplet. In this case, the EUV chamber 10 may preferably be provided with a mechanism for rotating the wire, the ribbon, the disc, and so forth, periodically or on-demand.

When the target material is Sn, the light L may be emitted radially from plasma generated as the target material is irradiated with the pulse laser beam L1, and the light L may include EUV light L10 at a wavelength of for example, approximately 13.5 nm. Of the light L emitted from the plasma, the EUV light L10 may be selectively reflected by the EUV collector mirror M3, as described above. The reflected EUV light L10 may be focused at a pinhole PH such that an image of the EUV light L10 may be transferred at the pinhole PH. Thereafter, the EUV light L10 may pass through the pinhole PH and be outputted to the exposure apparatus 20.

A beam dump LDP1 for absorbing a laser beam that has passed the plasma generation site P10 may be provided on an extension along a beam path of the pulse laser beam L1. A target collection unit DP1 for collecting the target material that has not been turned into plasma may be provided on an extension along a trajectory of the droplet 13.

An EUV light source controller C may be configured to control the EUV light source apparatus 100. The EUV light source controller C may be configured to control oscillation and/or amplification by the driver laser 1 via for example a laser controller C2. The EUV light source controller C, for example, may be configured to cause the laser controller C2 to output an oscillation timing control signal S2 to the oscillator 2 to thereby control the oscillation timing of the pulse laser beam L1. Further, the EUV light source controller C may be configured to output a target generation signal S4 to the target supply unit 11 to thereby control output of the droplet 13. In addition, the EUV light source controller C may be configured to control a posture of the focusing mirror M2 via a mirror controller C3 to thereby control a location at which the laser beam may be focused by the focusing mirror M2.

An imaging unit 12 may capture an image around the plasma generation site P10. Information based on the image captured by the imaging unit 12 may be inputted to the EUV light source controller C. Alternatively, the information may be inputted to the mirror controller C3. The information may contain, for example, timing at which and a trajectory along which the droplet 13 passes the plasma generation site P10, the plasma generated in the plasma generation site P10, and so forth, in the form of an image and an imaging time thereof. Based on the information from the imaging unit 12, the EUV light source controller C or the mirror controller C3 may output a mirror actuation control signal S3 to a mirror actuator M2*a* to control the posture of the focusing mirror M2 such that the pulse laser beam L1 may be focused in the plasma generation site P10. Further, based on the information from the imaging unit 12, the EUV light source controller C may control timing at which the droplet 13 is outputted from the target supply unit 11 and the timing at which the pulse laser beam L1 is outputted from the driver laser 1 so that the droplet 13 may be irradiated with the pulse laser beam L1 in the plasma generation site P10.

The EUV light source controller C may include a burst control unit C1. The burst control unit C1 may perform burst control processing in which the EUV light L10 is emitted in bursts based on a burst emission instruction signal S1 from the exposure apparatus 20. Here, emission in burst means emission in a burst operation. In the burst operation, a period in which the EUV light L10 is successively emitted in pulses at a constant rate (successive light emission period) and a period in which emission of the EUV light 10 is paused (successive light emission pause period) alternate with each other. The exposure apparatus 20 may perform exposure processing using averaged energy of the EUV light L10 emitted in bursts.

In the first embodiment, the burst control unit C1 may be configured to control timing at which the driver laser 1 outputs the pulse laser beam L1 (oscillation timing) so that the droplet 13 is irradiated with the pulse laser beam L1, during the successive light emission period of the burst operation. Meanwhile, during the successive light emission pause period, the burst control unit C1 may modify the oscillation timing control signal S2 to thereby cause the oscillation timing of the pulse laser beam L1 to be shifted. In a state in which the oscillation timing of the pulse laser beam L1 is shifted, the droplet 13 is not irradiated with the pulse laser beam L1; thus, generation of the light L containing the EUV light L10 may be paused.

Figures 2A, 2B:
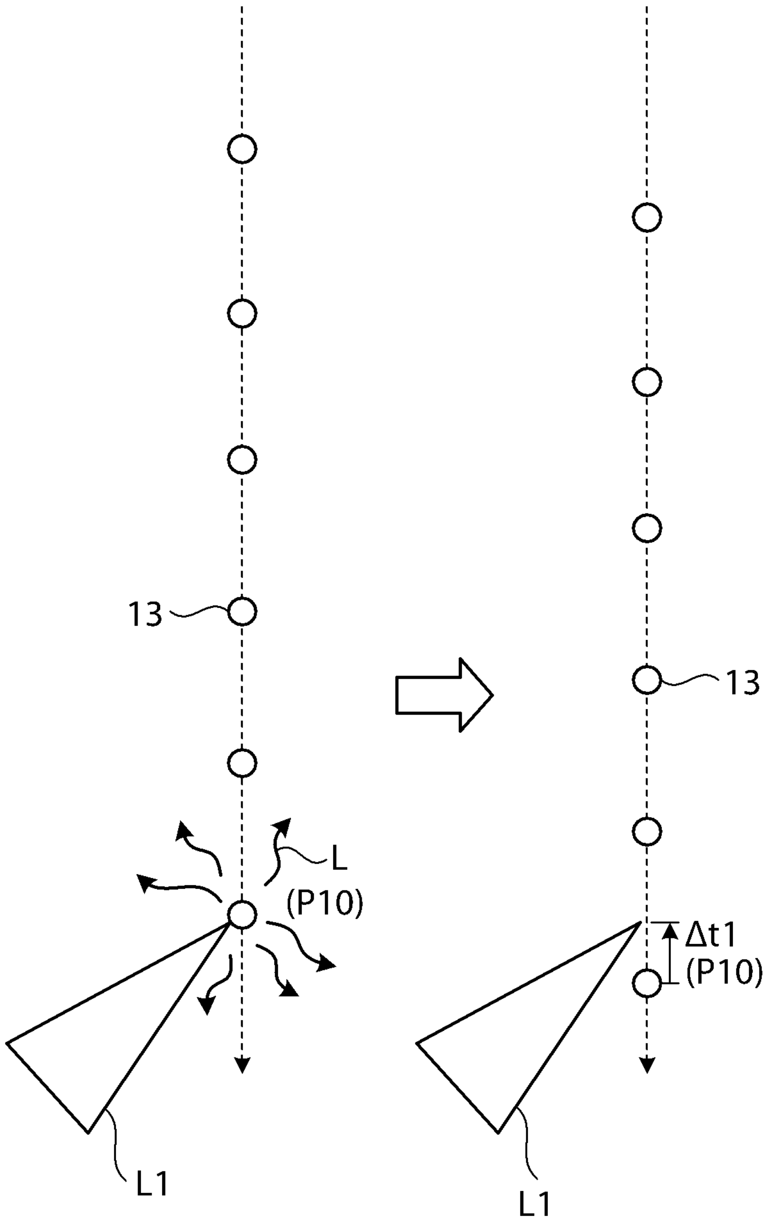
FIGS. 2A and 2B schematically illustrate an operation during a successive light emission pause period according to the first embodiment.

That is, as shown in FIG. 2A, during the successive light emission period, the burst control unit C1 may control the oscillation timing of the pulse laser beam L1 so that the droplet 13 is irradiated with the pulse laser beam L1 in the plasma generation site P10. Meanwhile, during the successive light emission pause period, as shown in FIG. 2B, the burst control unit C1 may shift the oscillation timing of the pulse laser beam L1 by a period Δt1 with respect to the oscillation timing during the successive light emission period. With this time lag, the droplet 13 may not be irradiated with the pulse laser beam L1, whereby generation of the light L containing the EUV light L10 may be paused. Note that the oscillation timing may be shifted forward or backward. That is, it is acceptable as long as the oscillation timing of the pulse laser beam L1 is shifted such that the droplet 13 is not irradiated with the pulse laser beam L1.

Here, referring to a timing chart shown in FIG. 3 and a flowchart shown in FIG. 4, the burst control processing according to the first embodiment will be described. The EUV light source controller C may first perform processing to cause the target supply unit 11 to start generating the droplet 13 (Step S101). Then, the EUV light source controller C may measure the position (or trajectory) and the speed of the droplet 13 based on the image of the plasma generation site P10 captured by the imaging unit 12 (Step S102). Subsequently, the EUV light source controller C may estimate a time at which the droplet 13 arrives in the plasma generation site P10 (plasma generation site arrival time) from the actuation timing of the target supply unit 11 (output timing of the target generation signal S4, for example), and determine oscillation trigger timing for controlling the oscillation timing of the pulse laser beam L1 based on the estimated plasma generation site arrival time (Step S103).

Thereafter, the burst control unit C1 of the EUV light source controller C may determine whether or not a successive light emission period T2 is occurring at a given moment (Step S104). If the successive light emission period T2 is occurring (Step S104, Yes), the burst control unit C1 may output to the oscillator 2 the oscillation timing control signal S2 which may cause the pulse laser beam L1 to be oscillated at the oscillation trigger timing determined in Step S103 (Step S105). With this, the droplet 13 may be irradiated with the pulse laser beam L1 outputted from the driver laser 1, whereby the EUV light L10 may be generated.

Figure 3:
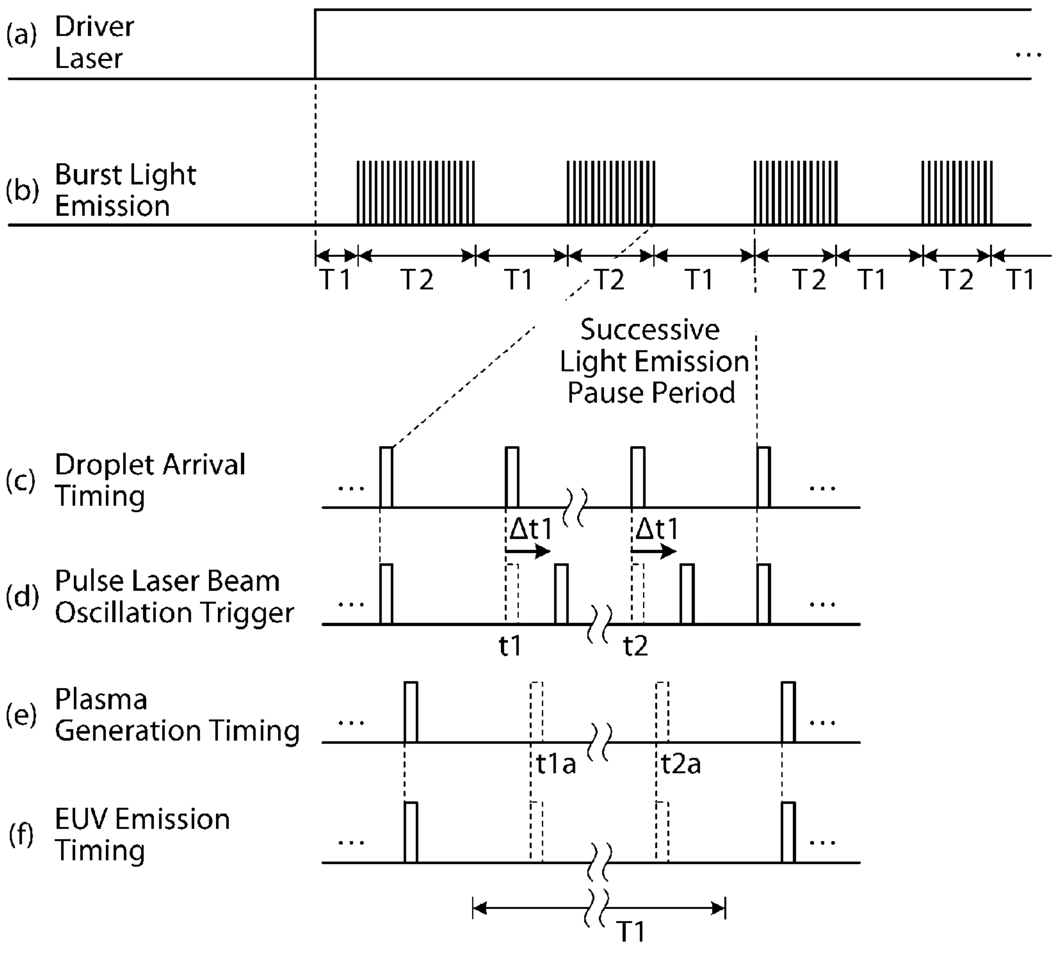
FIG. 3 is a timing chart illustrating the operation during the successive light emission pause period according to the first embodiment.
Figure 4:
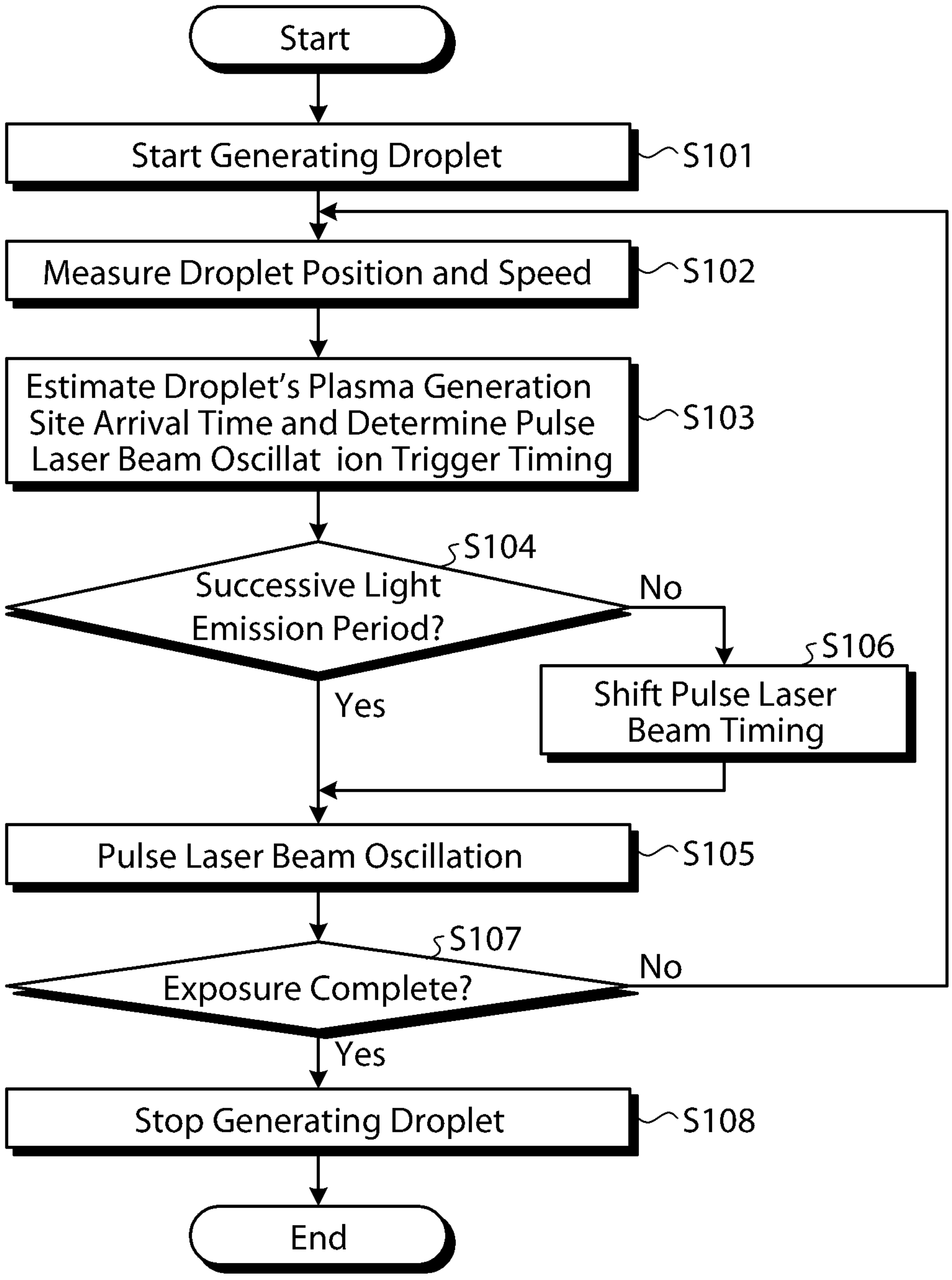
FIG. 4 is a flowchart illustrating a burst control processing procedure according to the first embodiment.

Meanwhile, if the successive light emission period T2 is not occurring (Step S104, No), that is, if a successive light emission pause period T1 is occurring, the burst control unit C1 may delay the oscillation trigger timing determined in Step S103 by the period Δt1, for example (Step S106: see (d) in FIG. 3), the oscillation timing control signal S2, in which the timing is modified, may be outputted to the oscillator 2 (Step S105). In this case, the pulse laser beam L1 may be oscillated while being delayed by the period Δt1; therefore, the droplet 13 may not be irradiated therewith. As a result, emission of the EUV light L10 may be paused. In the example shown in FIG. 3, during the successive light emission pause period T1, plasma may not be generated at plasma generation timing t1*a* and t2*a* (see (e) in FIG. 3); therefore, the EUV light L10 may not be generated at EUV emission timing t1*a* and t2*a* (see (f) in FIG. 3).

Thereafter, the EUV light source controller C may determine whether or not a burst light emission indication signal S1 indicating completion of exposure is inputted from the exposure apparatus 20 (Step S107). If the exposure is not complete (Step S107, No), the processing may return to Step S102 and continue with the above-described burst operation. If the exposure is complete (Step S107, Yes), the EUV light source controller C may stop generation of the droplet 13 (Step S108), and the processing may be terminated.

As in the first embodiment, when generation of the EUV light L10 is paused by shifting the oscillation timing of the pulse laser beam L1 during the successive light emission pause period T1, the following advantages may be expected:

1. Damage to an optical element, such as the EUV collector mirror M3 in the EUV chamber 10, may be reduced. As a result, the lifetime of the EUV light source apparatus may be extended.
2. Since the driver laser 1 is in the successive light emission operation during the burst operation, the optical system of the driver laser 1 may be thermally stabilized. With this, the droplet 13 may be irradiated with the pulse laser beam L1 at a stable location with stable energy. As a result, stable EUV light L10 may be emitted.
3. Since the driver laser 1 is in the successive light emission operation during the burst operation, the heat load variation in the driver laser 1 may be reduced. With this, damage to the optical element or the like used in the driver laser 1 caused by the heat load variation may be reduced. As a result, lifetime of the optical element may be extended.

When the oscillation of the pulse laser beam L1 is paused during the successive light emission pause period T1, the following problems with the driver laser 1 may occur in some cases:

1. Sudden heat load variation may occur to an optical element or the like at the start of the successive light emission period T2.
2. Sudden heat load variation may also occur when a duty ratio between the successive light emission period T2 and the successive light emission pause period T1 is modified.
3. Resulting from the above, a focusing condition of the pulse laser beam L1 may become unstable, or the following capability in the energy control may deteriorate. As a result, stable EUV light may not be obtained.

In the first embodiment, however, the pulse laser beam L1 may be oscillated continuously during the burst operation, which may make it possible to stabilize the focusing condition of the pulse laser beam L1 during the successive light emission period T2, and to improve the following capability in the energy control. As a result, the EUV light emission control may be performed with stability.

First Modification of First Embodiment

In the above-described first embodiment, generation of the EUV light L10 may be paused by shifting the oscillation timing of the pulse laser beam L1 while the pulse laser beam L1 is oscillated continuously. Without being limited thereto, however, generation of the EUV light L10 may be paused by shifting a beam axis of the pulse laser beam L1, for example, while the pulse laser beam L1 is oscillated continuously. Hereinafter, this case will be described as a first modification of the first embodiment.

Figure 5:
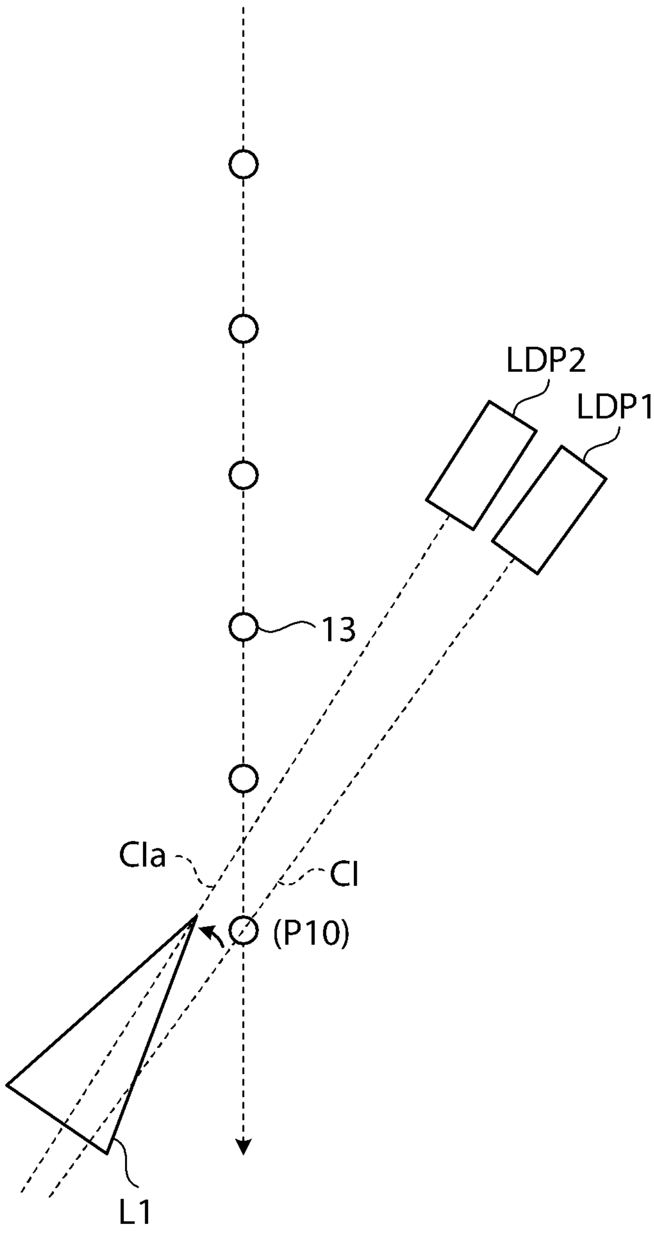
FIG. 5 schematically illustrates an operation during a successive light emission pause period according to a first modification of the first embodiment.

As shown in FIG. 5, in the first modification, a beam axis CI of the pulse laser beam L1 may be made to pass through the plasma generation site P10 during the successive light emission period T2. Meanwhile, the beam axis CI of the pulse laser beam L1 may be shifted to a beam axis CIa from the beam axis CI during the successive light emission pause period T1. With this, the droplet 13 may be prevented from being irradiated with the pulse laser beam L1; thus, generation of the EUV light L10 may be paused. In this case, the driver laser 1 may be in the successive light emission operation during the burst operation. Note that in addition to the beam dump LDP1 disposed on the extension of the beam axis CI of the pulse laser beam L1, a beam dump LDP2 may be provided on an extension of the beam axis CIa.

Figure 6:
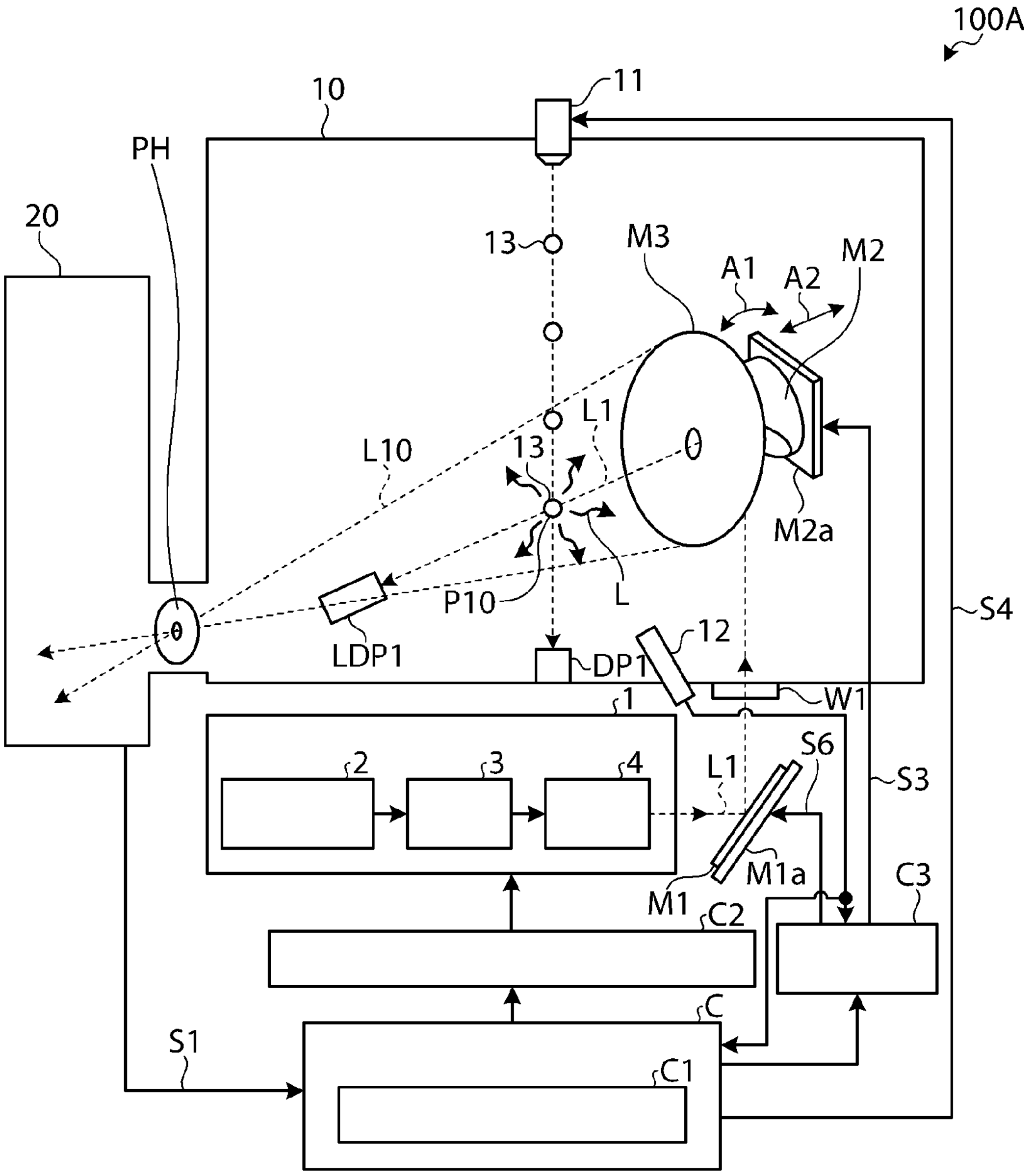
FIG. 6 schematically illustrates a configuration of an EUV light source apparatus according to the first modification of the first embodiment.

Shifting of the beam axis of the pulse laser beam L1 may be achieved by, as shown in FIG. 6, actuating a mirror actuator M2*a* via the mirror controller C3. When the focusing mirror M2 is rotated in the direction of A1 as the mirror actuator M2*a* is actuated, the beam axis of the pulse laser beam L1 may be shifted for example from the beam axis CI to the beam axis CIa. Note that, as shown in FIG. 6, the configuration may be such that the mirror M1 is provided with a mirror actuator M1*a*, for example, and the mirror actuator M1*a* is actuated by a mirror actuation control signal S6, whereby the beam axis of the pulse laser beam L1 may be shifted.

Figure 7:
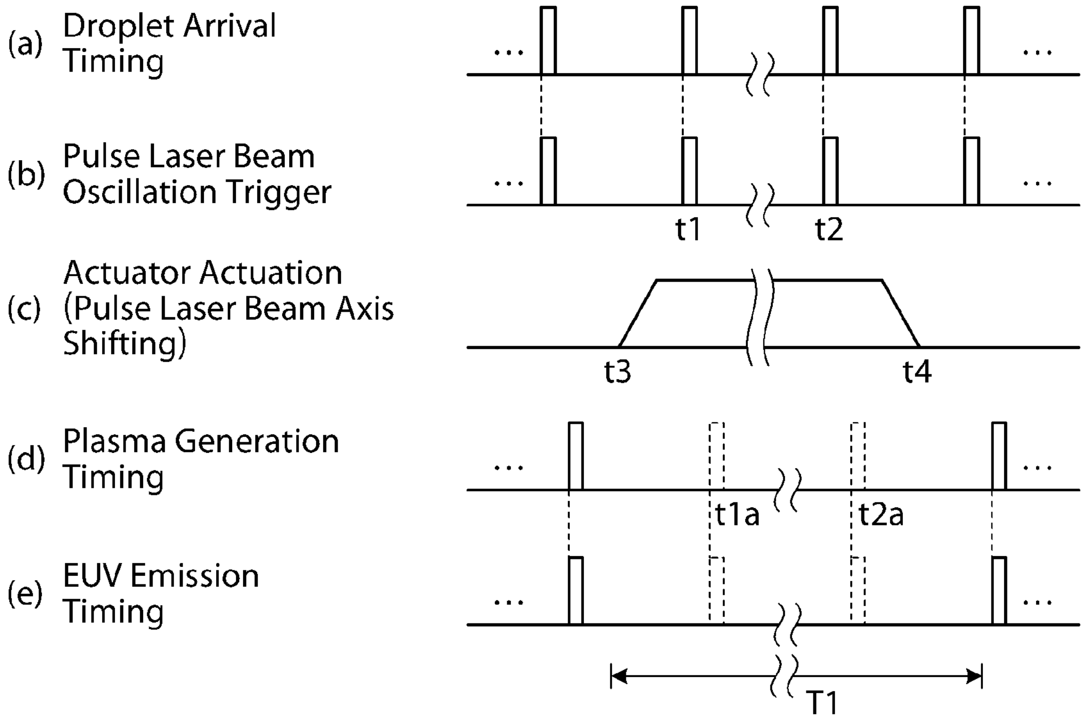
FIG. 7 is a timing chart illustrating the operation during the successive light emission pause period according to the first modification of the first embodiment.

As shown in (c) of FIG. 7, the mirror actuator M2*a* may be actuated from a time point t3, at which the successive light emission pause period T1 may start, until a time point t4, at which the successive light emission pause period T1 may end, to shift the beam axis of the pulse laser beam L1, whereby the droplet 13 may not be irradiated with the pulse laser beam L1. Thus, the plasma may not be generated at the plasma generation timing t1*a* and t2*a* (see (d) of FIG. 7). As a result, the EUV light L10 may not be generated at the EUV light emission timing t1*a* and t2*a* (see (e) of FIG. 7).

Figure 8:
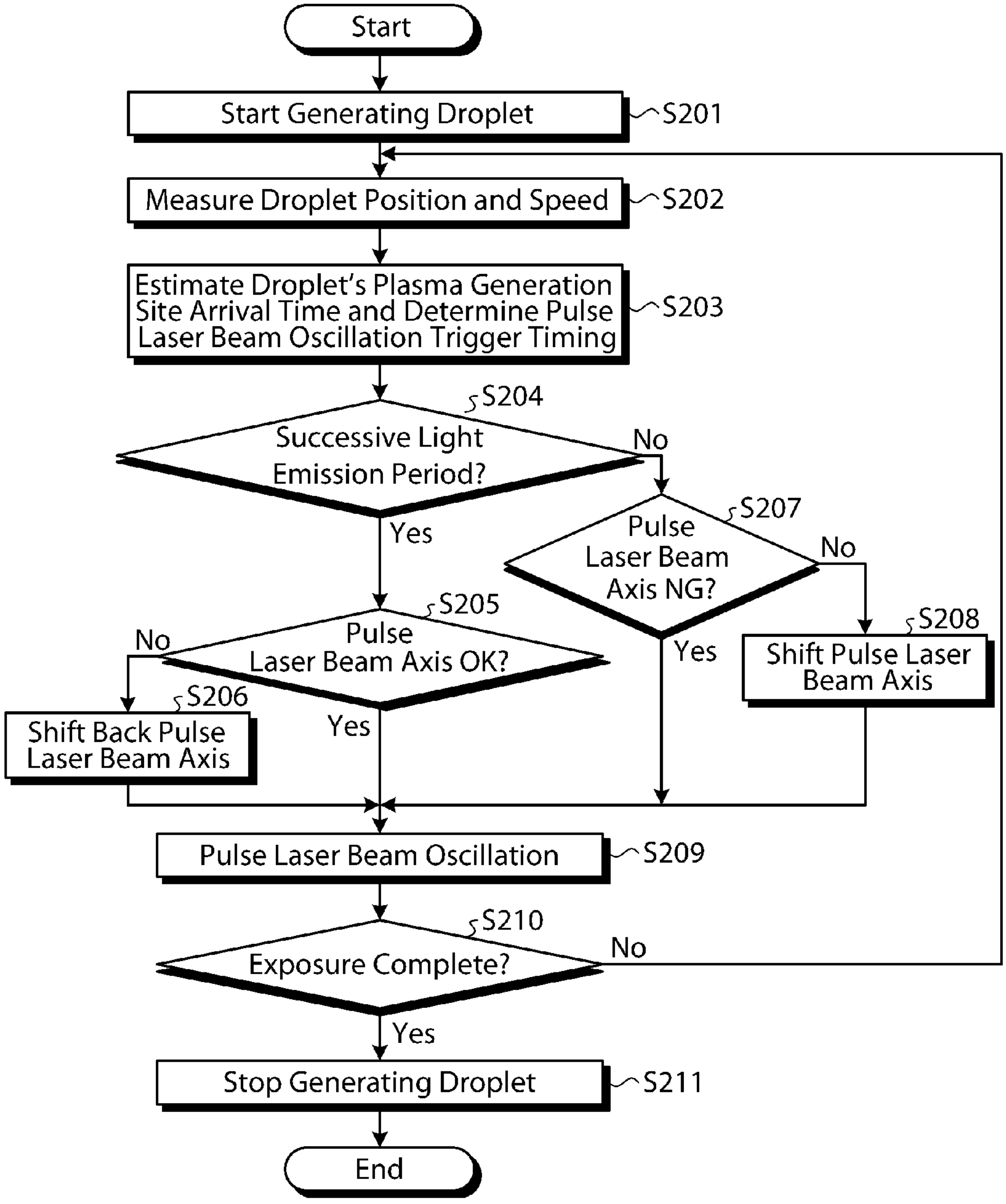
FIG. 8 is a flowchart illustrating a burst control processing procedure according to the first modification of the first embodiment.

Here, referring to a flowchart shown in FIG. 8, the burst control processing according to the first modification of the first embodiment will be described. The EUV light source controller C may first perform processing to cause the target supply unit 11 to start generating the droplet 13 (Step S201). Then, the EUV light source controller C may measure the position (or trajectory) and the speed of the droplet 13 based on the image information around the plasma generation site P10 by the imaging unit 12 (Step S202). Subsequently, the EUV light source controller C may estimate the plasma generation site arrival time, and determine the oscillation trigger timing of the pulse laser beam L1 based on the estimated plasma generation site arrival time (Step S203).

Thereafter, the burst control unit C1 of the EUV light source controller C may determine whether or not the successive light emission period T2 is occurring at a given moment (Step S204). If the successive light emission period T2 is occurring (Step S204, Yes), the burst control unit C1 may determine whether or not the beam axis CI of the pulse laser beam L1 is shifted at that moment (Step S205). Then, when the beam axis of the pulse laser beam L1 is shifted to the beam axis CIa (Step S205, No), the burst control unit C1 may shift back the beam axis CIa of the laser pulse beam (Step S206), and thereafter output to the oscillator 2 the oscillation timing control signal S2 for causing the pulse laser beam L1 to be oscillated at the oscillation trigger timing determined in Step S203 (Step S209). With this, the droplet 13 may be irradiated with the pulse laser beam L1 outputted from the driver laser 1, whereby the EUV light L10 may be generated.

Meanwhile, if the successive light emission period T2 is not occurring (Step S204, No), that is, if the successive light emission pause period T1 is occurring, the burst control unit C1 may determine whether or not the beam axis of the pulse laser beam L1 is shifted at a given moment (Step S207). Then, when the beam axis of the pulse laser beam L1 in not shifted (Step S207, No), the burst control unit C1 may cause the beam axis of the pulse laser beam L1 to be shifted to the beam axis CIa (Step S208), and then may output to the oscillator 2 the oscillation timing control signal S2 for causing the pulse laser beam L1 to be oscillated at the oscillation trigger timing determined in Step S203 (Step S209). With this, the droplet 13 may not be irradiated with the pulse laser beam L1 outputted from the driver laser 1, whereby generation of the EUV light L10 may be paused.

Subsequently, the EUV light source controller C may determine whether or not the burst light emission indication signal S1 indicating completion of the exposure has been inputted from the exposure apparatus 20 (Step S210). If the exposure is not complete (Step S210, No), the processing may return to Step S202, and the above-described burst operation may be continued. Meanwhile, if the exposure is complete (Step S210, Yes), the EUV light source controller C may stop the generation of the droplet 13 (Step S211), and the processing may be terminated.

In the first modification of the first embodiment, generation of the EUV light L10 may be paused by shifting the beam axis of the pulse laser beam L1 during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 may be in the successive light emission operation during the burst operation, the optical system in the driver laser 1 may be thermally stable. With this, the droplet 13 may be irradiated with the pulse laser beam L1 at a stable location with stable energy. As a result, stable EUV light L10 may be emitted.
3. Since the driver laser 1 may be in the successive light emission operation during the burst operation, the heat load variation of the driver laser 1 may be reduced. With this, damage to the optical element or the like used in the driver laser 1 caused by the heat load variation may be reduced. As a result, the lifetime of the optical element may be extended.

Second Modification of First Embodiment

Generation of the EUV light L10 may be paused by shifting a focus of the pulse laser beam L1 while the pulse laser beam L1 is oscillated continuously. Hereinafter, this case will be described as a second modification of the first embodiment.

Figures 9A, 9B:
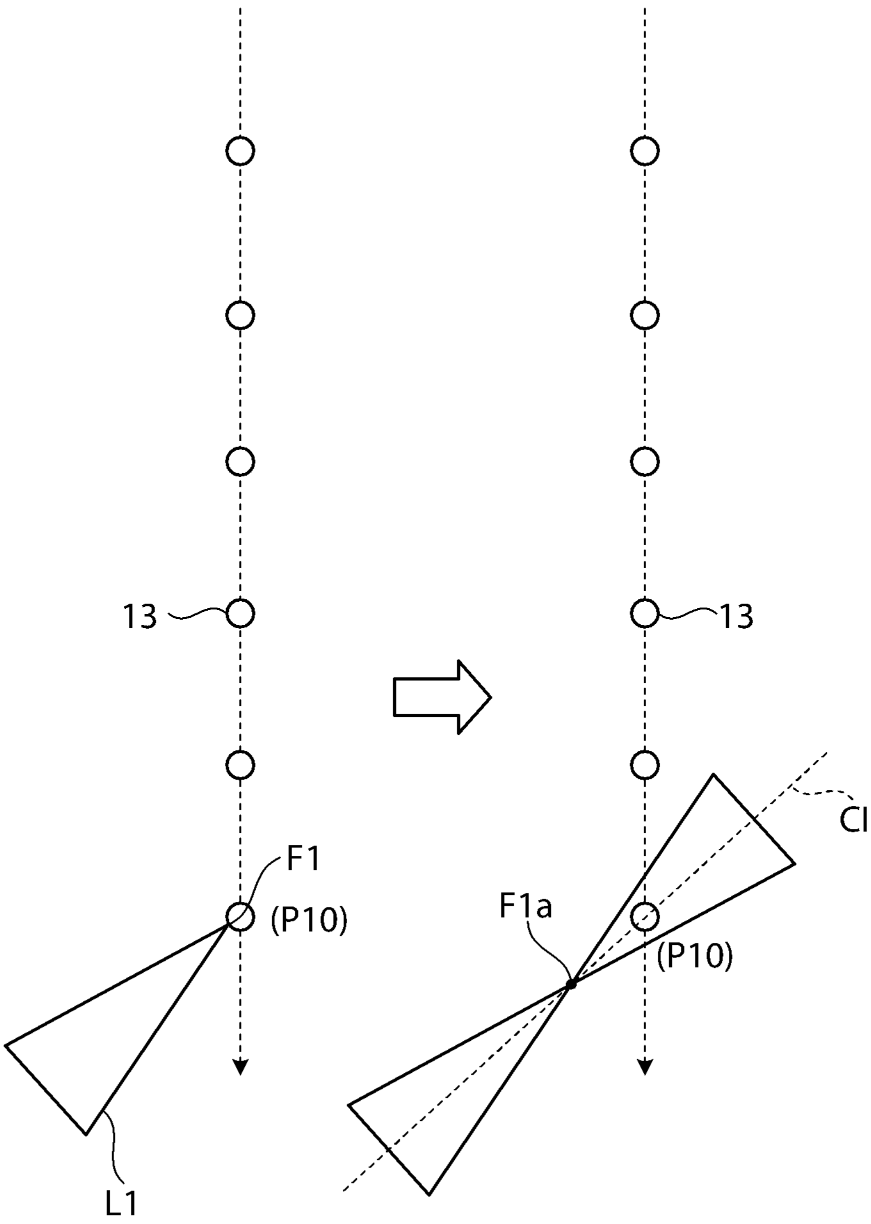
FIGS. 9A and 9B schematically illustrate an operation during a successive light emission pause period according to a second modification of the first embodiment.

As shown in FIGS. 9A and 9B, a focus F1 of the pulse laser beam L1 may be made to coincide with the plasma generation site P10 during the successive light emission period T2 (see FIG. 9A). Meanwhile, the focus of the pulse laser beam L1 may be shifted to a focus F1*a*, which is offset from the focus F1 in the direction of the beam axis CI, during the successive light emission pause period T1 (see FIG. 9B). With this, energy density of the pulse laser beam L1 with which the droplet 13 may be irradiated may be reduced, whereby the droplet 13 may be prevented from being turned into plasma. As a result, generation of the EUV light L10 may be paused. In this case, the driver laser 1 may also be in the successive light emission operation during the burst operation.

Figure 10:
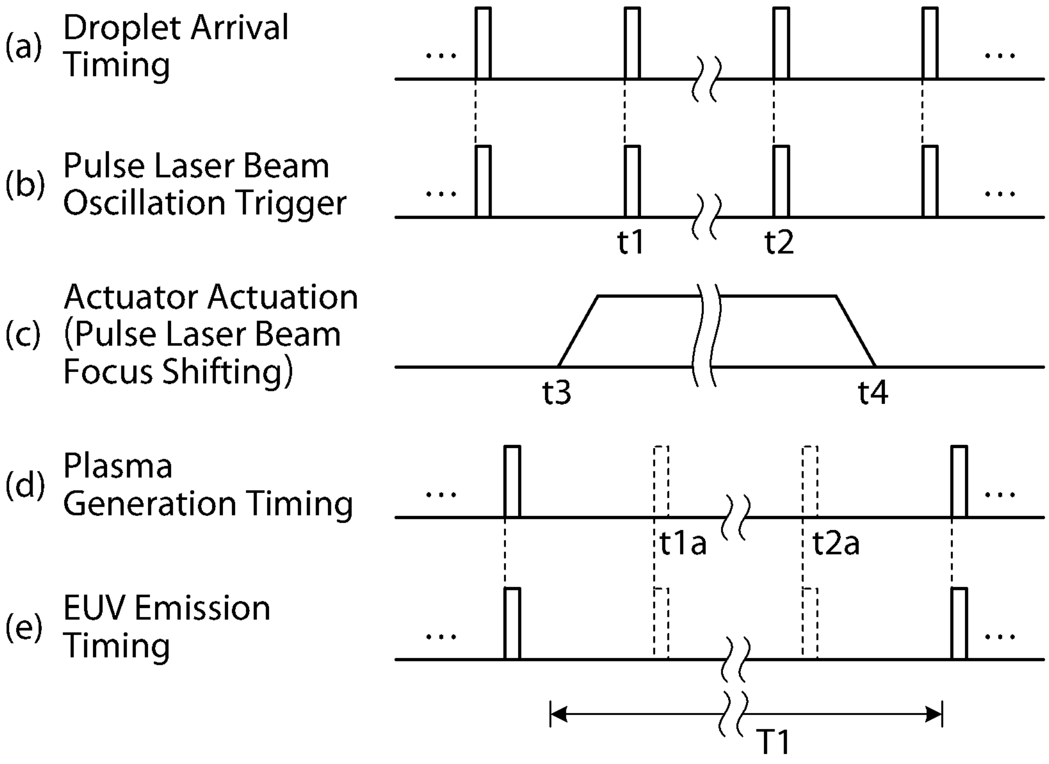
FIG. 10 is a timing chart illustrating the operation during the successive light emission pause period according to the second modification of the first embodiment.

Shifting of the focus of the pulse laser beam L1 may be achieved by, as shown in FIG. 10, actuating the mirror actuators M1*a* and M2*a* via the mirror controller C3. When the distance between the focusing mirror M2 and the plasma generation site P10 is changed by actuating the mirror actuators M1*a* and M2*a* (see FIG. 6), the focus of the pulse laser beam L1 may be shifted in the direction of A2. Note that the configuration may be such that a divergence angle of the laser beam outputted from the driver laser 1 is controlled by an actuator that is not shown in the figure, whereby the focus of the pulse laser beam L1 may be shifted.

As shown in (c) of FIG. 10, the mirror actuator M2*a* may be actuated during a period including the successive light emission pause period T1 from the time point t3 until the time point t4, whereby the focus of the pulse laser beam L1 may be shifted. Then, even when the droplet 13 is irradiated with the pulse laser beam L1, the energy density thereof is low; thus, the droplet 13 may not be turned into plasma. Accordingly, the plasma may not be generated at the plasma generation timing t1*a* and t2*a* (see (d) of FIG. 10). As a result, the EUV light L10 may not be generated at the EUV light emission timing t1*a* and t2*a* (see (e) of FIG. 10).

Figure 11:
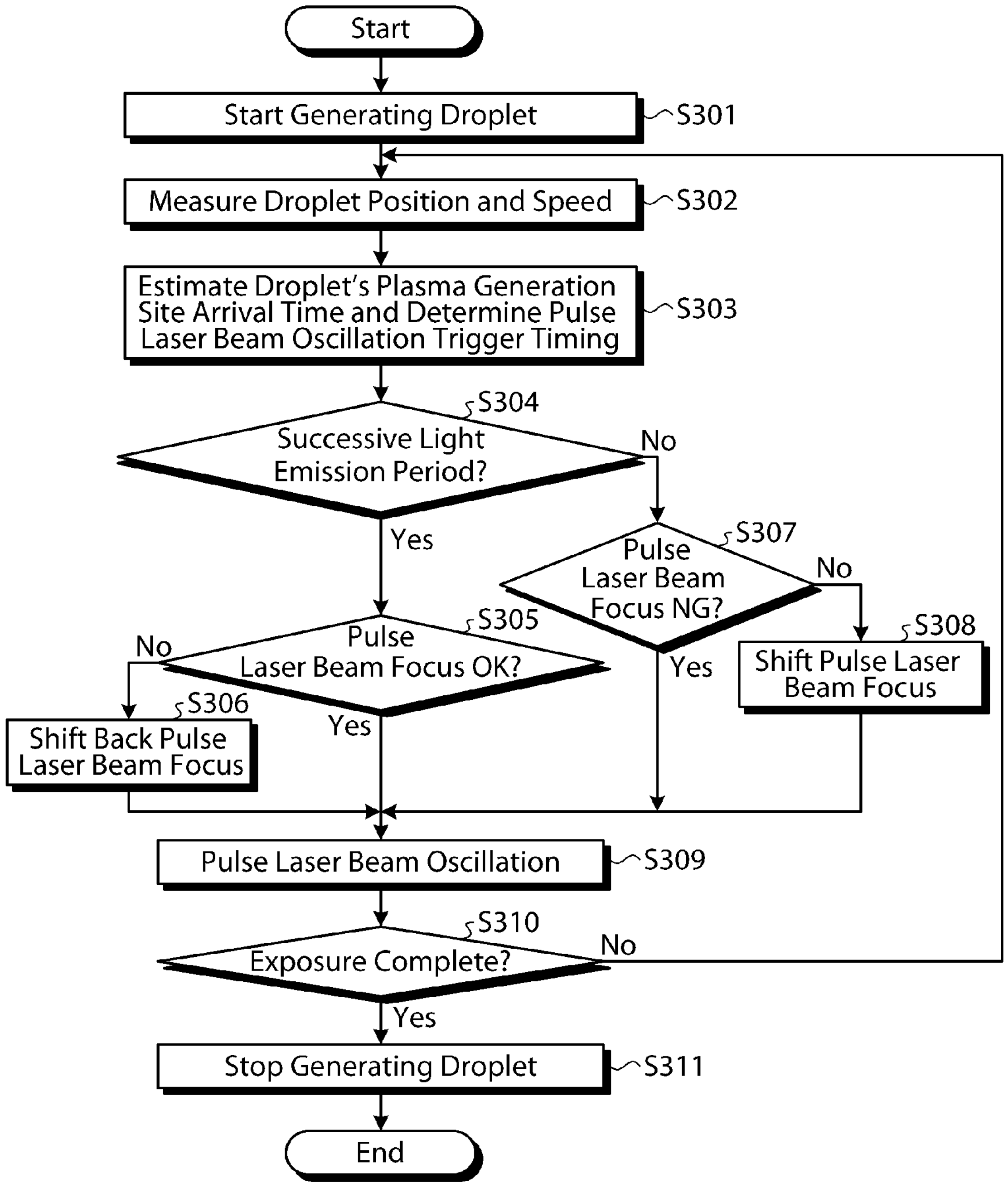
FIG. 11 is a flowchart illustrating a burst control processing procedure according to the second modification of the first embodiment.

Here, referring to a flowchart shown in FIG. 11, burst control processing according to a second modification of the first embodiment will be described. The EUV light source controller C may first perform processing to cause the target supply unit 11 to start generating the droplet 13 (Step S301). Then, the EUV light source controller C measures the position (or trajectory) and the speed of the droplet 13 based on the image information around the plasma generation site P10 by the imaging unit 12 (Step S302). Subsequently, the EUV light source controller C may estimate the plasma generation site arrival time, and determine the oscillation trigger timing of the pulse laser beam L1 based on the estimated plasma generation site arrival time (Step S303).

Thereafter, the burst control unit C1 of the EUV light source controller C may determine whether or not the successive light emission period T2 is occurring at a given moment (Step S304). If the successive light emission period T2 is occurring (Step S304, Yes), the burst control unit C1 may determine whether or not the focus of the pulse laser beam L1 is shifted at that moment (Step S305). Then, when the focus of the pulse laser beam L1 is shifted to the focus F1*a* (Step S305, No), the burst control unit C1 may shift the focus F1*a* of the pulse laser beam L1 back to the focus F1 (Step S306), and thereafter output to the oscillator 2 the oscillation timing control signal S2 for causing the pulse laser beam L1 to be oscillated at the oscillation trigger timing determined in Step S303 (Step S309). With this, the droplet 13 may be irradiated with the pulse laser beam L1 outputted from the driver laser 1, whereby the EUV light L10 may be generated.

Meanwhile, if the successive light emission period T2 is not occurring (Step S304, No), that is, if the successive light emission pause period T1 is occurring, the burst control unit C1 may determine whether or not the focus of the pulse laser beam L1 is shifted at that moment (Step S307). Then, when the focus of the pulse laser beam L1 is not shifted (Step S307, No), the burst control unit C1 may cause the focus of the pulse laser beam L1 to be shifted to the focus F1*a* (Step S308), and thereafter output to the oscillator 2 the oscillation timing control signal S2 for causing the pulse laser beam L1 to be oscillated at the oscillation trigger timing determined in Step S303 (Step S309). With this, the droplet 13 may not be turned into plasma even when being irradiated with the pulse laser beam L1, whereby generation of the EUV light L10 may be paused.

Thereafter, the EUV light source controller C may determine whether or not the burst light emission indication signal S1 indicating completion of the exposure has been inputted from the exposure apparatus 20 (Step S310). If the exposure is not complete (Step S310, No), the processing may return to Step S302 and the above-described burst operation may be continued. Meanwhile, if the exposure is complete (Step S310, Yes), the EUV light source controller C may stop generation of the droplet 13 (Step S311), and the process may be terminated.

In the second modification of the first embodiment, generation of the EUV light L10 may be paused by shifting the focus of the pulse laser beam L1 during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 may be in the successive light emission operation during the burst operation, the optical system in the driver laser 1 may be thermally stable. With this, the droplet 13 may be irradiated with the pulse laser beam L1 at a stable location with stable energy. As a result, stable EUV light L10 may be emitted.
3. Since the driver laser 1 may be in the successive light emission operation during the burst operation, the heat load variation of the driver laser 1 may be reduced. With this, damage to the optical element or the like used in the driver laser 1 caused by the heat load variation may be reduced. As a result, the lifetime of the optical element may be extended.

Second Embodiment

A second embodiment of the present disclosure is described below in detail with reference to the drawings. In the second embodiment, a case in which the target material may be turned into plasma with two-stage laser irradiation will be illustrated as an example. Note that the second embodiment may also be applied to a laser apparatus, a laser processing apparatus, and so forth.

Figure 12:
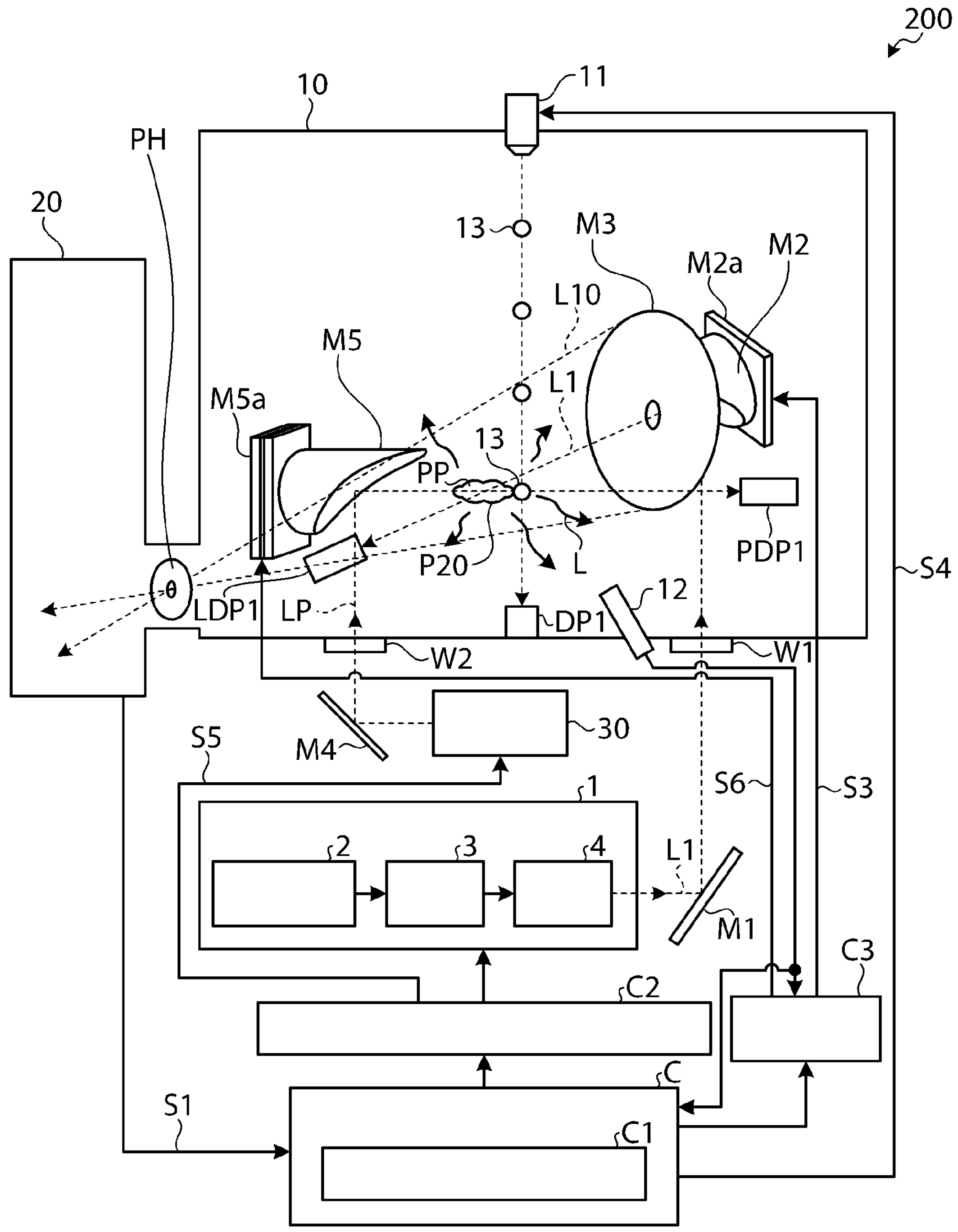
FIG. 12 schematically illustrates a configuration of an EUV light source apparatus according to a second embodiment of this disclosure.

FIG. 12 schematically illustrates the configuration of an EUV light source apparatus 200 according to the second embodiment. As shown in FIG. 12, the EUV light source apparatus 200 according to the second embodiment may include a pre-pulse laser 30 in addition to the configuration shown in FIG. 1. A pre-pulse laser beam LP outputted from the pre-pulse laser 30 may enter the EUV chamber 10 via an optical system including a mirror M4 and via a window W2 provided to the EUV chamber 10. Then, the pre-pulse laser beam LP may be reflected by a focusing mirror M5, thereby being focused on a droplet 13 passing through a pre-plasma generation site P11 (see FIG. 13A). With this, pre-plasma PP may be generated from a portion or the entirety of the droplet 13. The pulse laser beam L1 may be focused on the pre-plasma PP, whereby plasma which may emit the EUV light L10 may be generated. According to the second embodiment, in the EUV light source apparatus 200, oscillation of the pre-pulse laser beam LP may be paused during the successive light emission pause period T1 in the burst operation while the driver laser 1 is in the successive light emission operation. Accordingly, generation of the EUV light L10 may be paused. A beam dump PDP1 for absorbing the pre-pulse laser beam LP may be provided on an extension of a beam axis of the pre-pulse laser beam LP.

Here, the pre-plasma may be plasma with low electron temperature and/or low electron density, neutral particles, or a mixed state of the neutral particles and the plasma with low electron temperature and/or low electron density, which have been generated from a surface of a collection of the target material, such as the droplet 13. A target in this pre-plasma PP state may be irradiated with the pulse laser beam L1, whereby the target may be turned into plasma with relatively high electron temperature and/or relatively high electron density.

It is known that a relatively large amount of EUV light may be obtained from the plasma with relatively high electron temperature and/or relatively high electron density. That is, the pre-plasma may be further heated by the laser pulse beam, whereby the EUV light L10 may be generated with high conversion efficiency (CE).

Figures 13A, 13B:
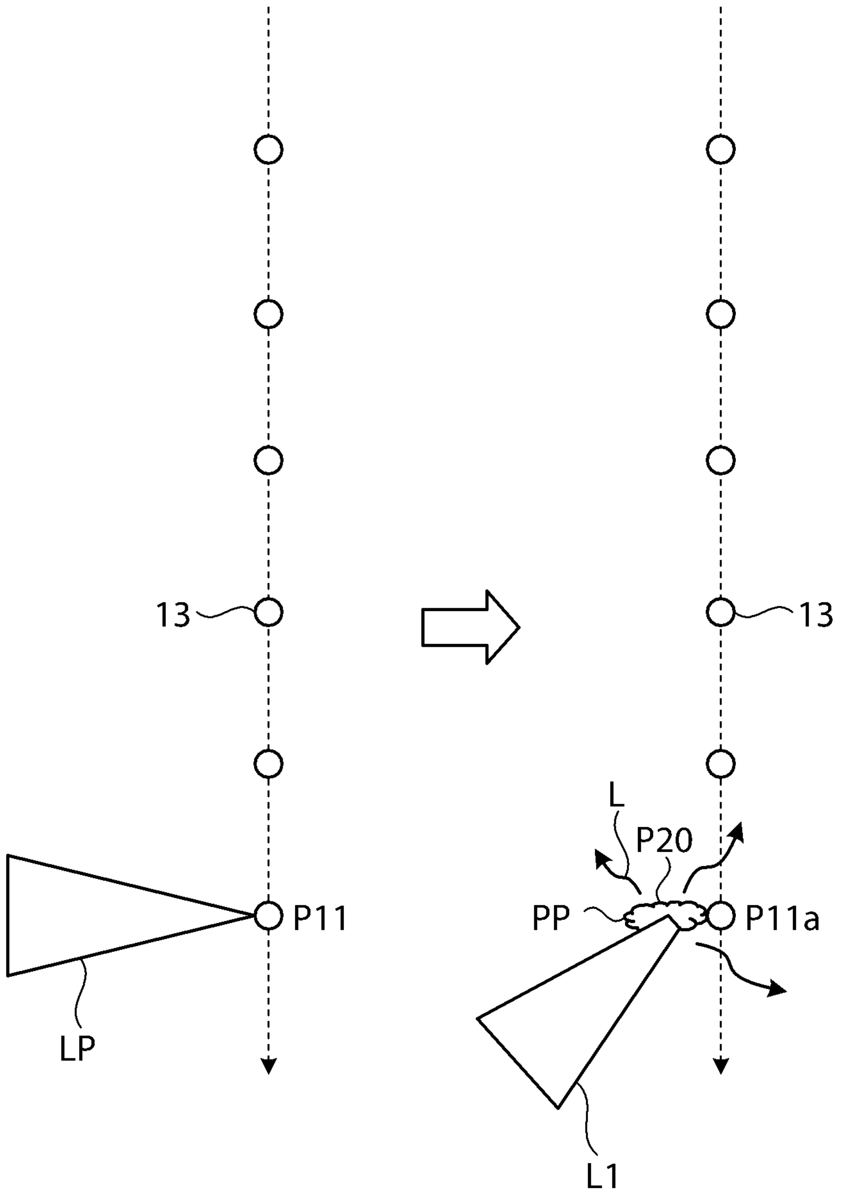
FIGS. 13A and 13B schematically illustrate emission of EUV light by pre-plasma irradiation according to the second embodiment.

Here, as shown in FIGS. 13A and 13B, the droplet 13 passing through the pre-plasma generation site P11 may be irradiated with the pre-pulse laser beam LP. Then, the pre-plasma PP may be generated in a plasma generation site P20, which is in the vicinity of a pre-plasma generation site P11*a* corresponding to a position to which the droplet 13 may move slightly after being irradiated with the pre-pulse laser beam LP. Thus, in the second embodiment, the pulse laser beam L1 may be focused on the pre-plasma PP generated around the plasma generation site P20. With this, the plasma serving as the light emission source of the EUV light L10 may be generated from the pre-plasma PP. In this way, the pre-plasma PP, which is in a near-plasma state, may be irradiated with the pulse laser beam L1 and the plasma is generated, whereby the conversion efficiency (CE) of the pulse laser beam L1 into the EUV light L10 may be improved.

Figures 14A, 14B:
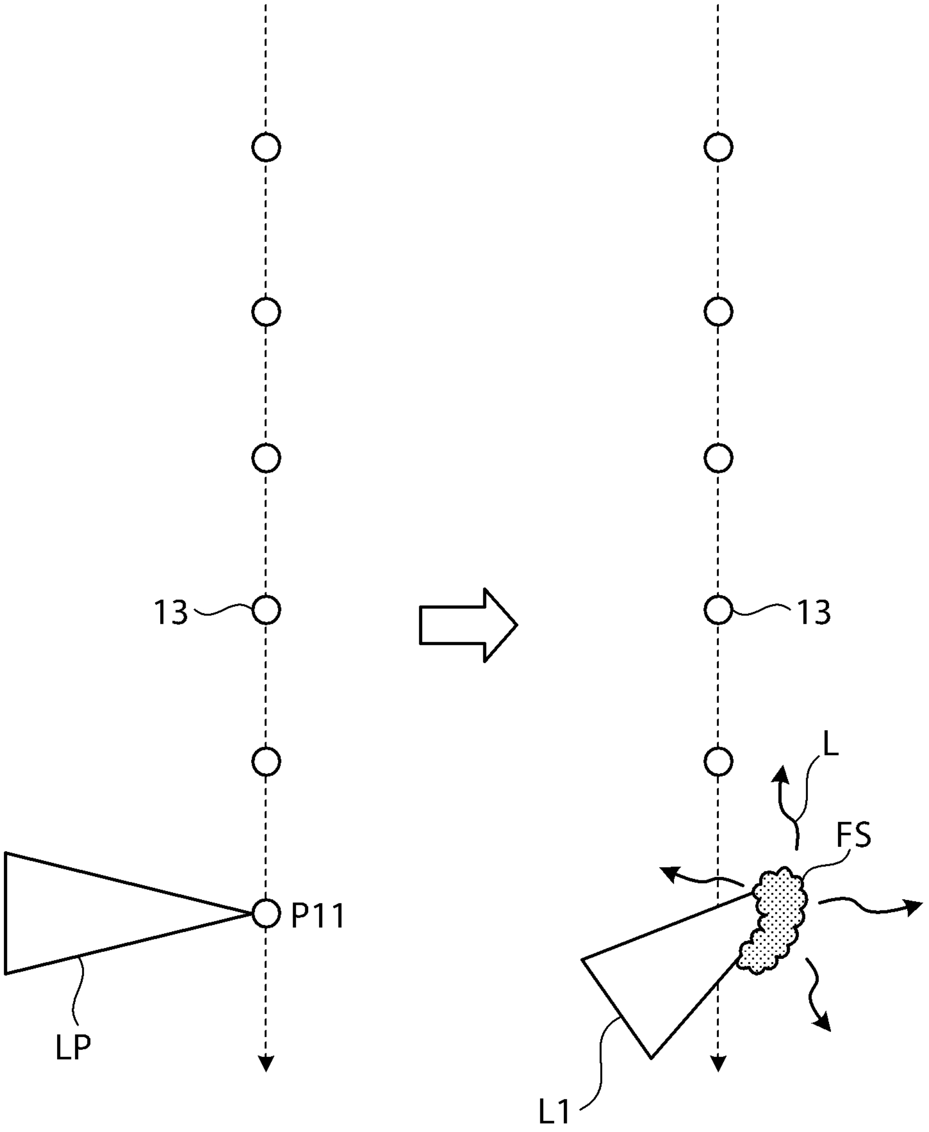
FIGS. 14A and 14B schematically illustrate emission of the EUV light by fragment irradiation according to the second embodiment.

Note that in place of the pre-plasma PP, a fragmented material (fragment) group of the target material generated by crushing the droplet 13 may be used to generate the plasma. For generating the fragmented material (fragment) group of the target material, a pulse laser beam with a lower pulse energy than the pre-pulse laser beam LP for generating the pre-plasma may be used for the pre-pulse laser beam LP. As shown in FIGS. 14A and 14B, when the droplet 13 is irradiated with the pre-pulse laser beam LP with lower pulse energy than the pre-pulse beam for generating the pre-plasma (see FIG. 14A), the droplet 13 may be crushed. With this, a fragment space FS may be formed, in a direction in which the pre-pulse laser beam LP may travel, with the fragmented material in which particles of the target material are scattered. In the second embodiment, the fragment space FS may be irradiated with the pulse laser beam L1, whereby the plasma serving as the light emission source of the EUV light L10 may be generated (see FIG. 14B). Even in this case (fragment irradiation), as in the case where the pre-plasma PP is irradiated with the pulse laser beam L1 (pre-plasma irradiation), the conversion efficiency (CE) of the pulse laser beam L1 into the EUV light L10 may be improved, compared for example to the case where the plasma is generated from the droplet 13 with single-stage laser irradiation. Further, in either case of the pre-plasma irradiation or the fragment irradiation, the pulse energy of the pulse laser beam L1 may be lower in order to obtain the EUV light L10 of the same intensity. Accordingly, the driver laser 1 may be reduced in size, and consequently, power consumption by the driver laser 1 may be reduced as well.

Figures 15A, 15B, 15C:
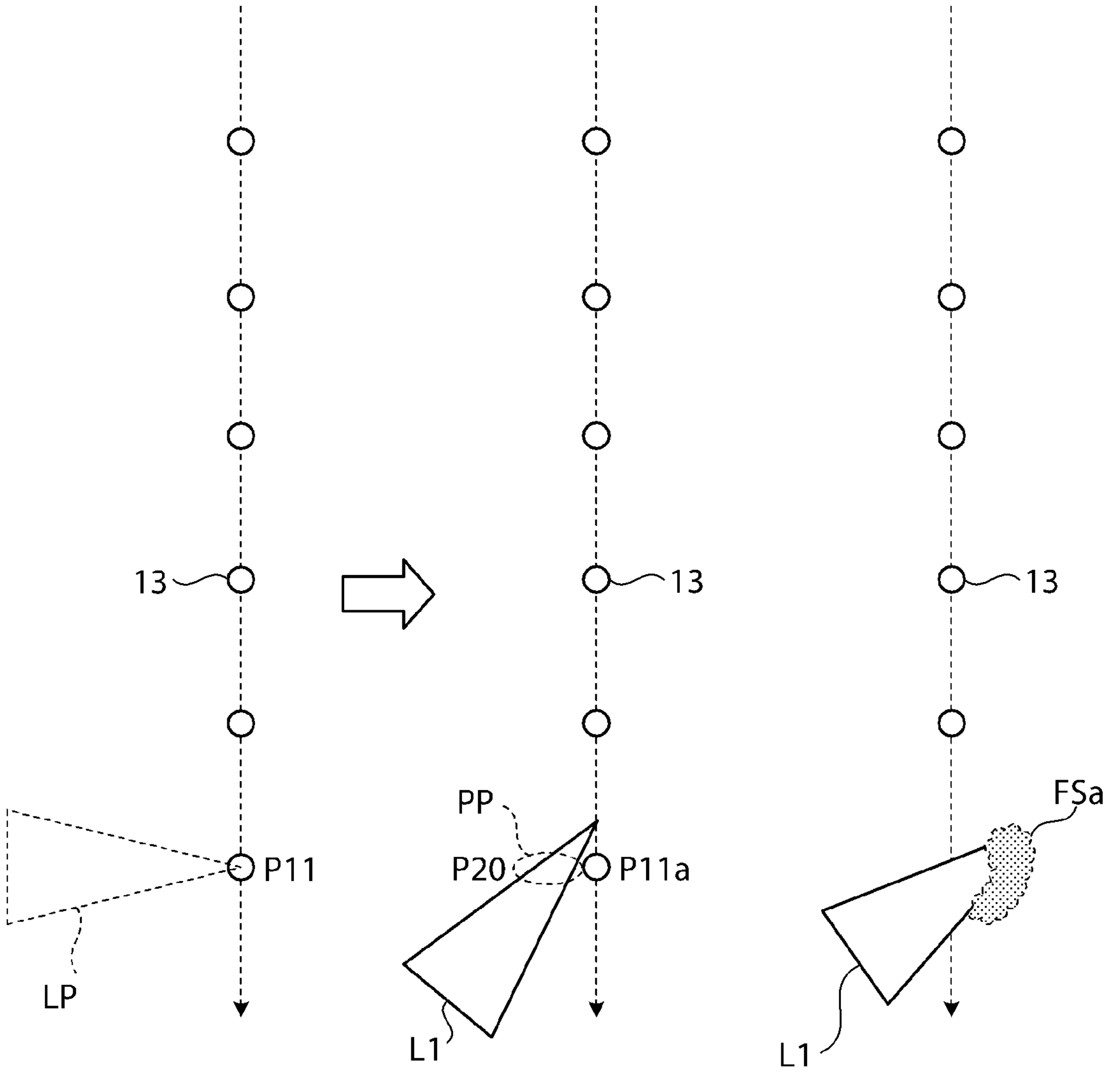
FIGS. 15A through 15C schematically illustrate an operation during a successive light emission pause period according to the second embodiment.

In the second embodiment, under the control by the EUV light source controller C, the laser controller C2 may control oscillation of the pre-pulse laser 30. At this time, as shown in FIG. 15A, the burst control unit C1 may stop oscillation of the pre-pulse laser beam LP during the successive light emission pause period T1, so that the pre-plasma PP or the fragment space FS may not be generated. As a result, as shown in FIG. 15B, the plasma generation site P20 in which the pre-plasma PP is not generated may be irradiated with the pulse laser beam L1. Alternatively, as shown in FIG. 15C, a fragment space FSa in which the fragments are not generated may be irradiated with the pulse laser beam L1. Accordingly, the EUV light L10 may not be generated.

Figure 16:
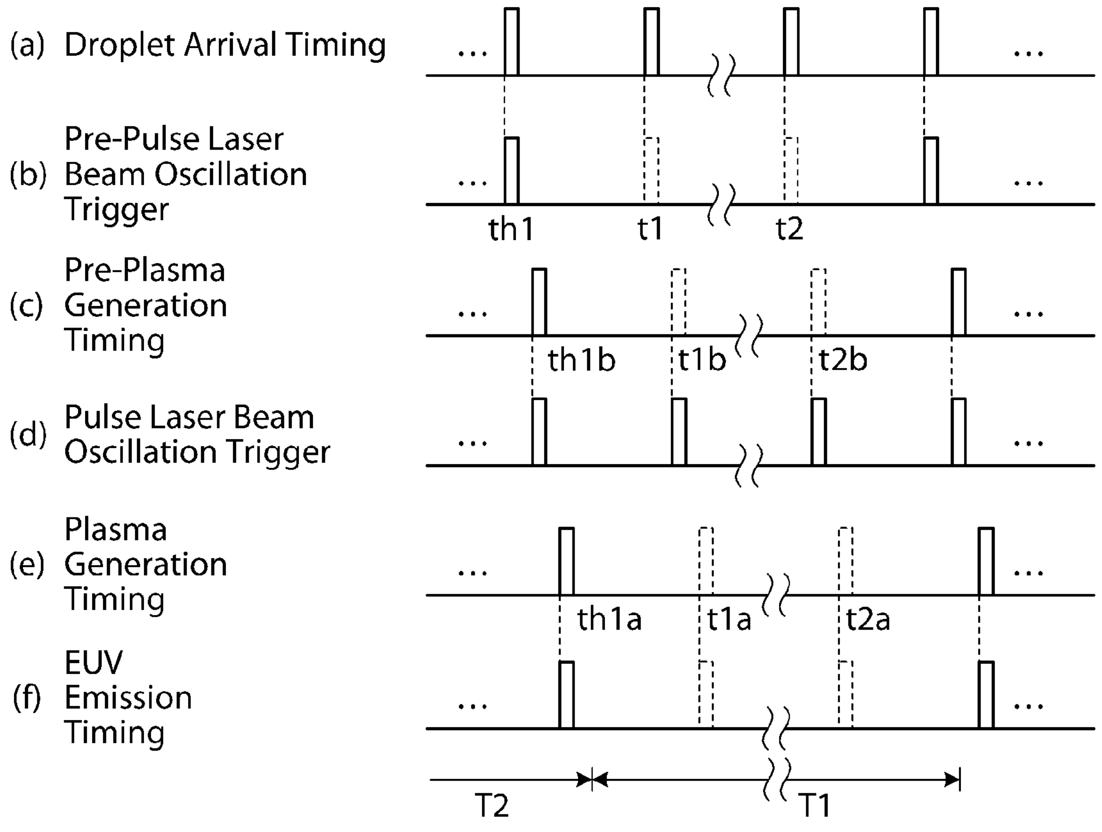
FIG. 16 is a timing chart illustrating an operation during the successive light emission pause period according to the second embodiment.

For example, in the case of the pre-plasma irradiation, if it is during the successive light emission period T2 in FIG. 16, a pre-pulse laser beam oscillation trigger may be generated (see (b) of FIG. 16) at timing th1 at which the droplet 13 may arrive in the pre-plasma generation site P11 (see (a) of FIG. 16). Then, the pre-plasma PP may be generated at timing th1*b* which is delayed from the timing th1 (see (c) of FIG. 16). A pulse laser beam oscillation trigger may be generated at the timing th1*b* (see (d) of FIG. 16), and the plasma may be generated at timing th1*a* which is delayed from the timing th1*b* (see (e) of FIG. 16). As a result, the EUV light L10 may be emitted (see (f) of FIG. 16).

Meanwhile, if it is during the successive light emission pause period T1, the pre-pulse laser beam oscillation trigger may not be generated; therefore, the pre-plasma PP may not be generated (see (b) and (c) of FIG. 16). Accordingly, even when the pulse laser beam L1 is generated, the plasma may not be generated, and as a result, the EUV light L10 may not be generated either (see (d) and (f) of FIG. 16). That is, generation of the EUV light L10 may be paused while the driver laser 1 is in the successive light emission operation.

Figure 17:
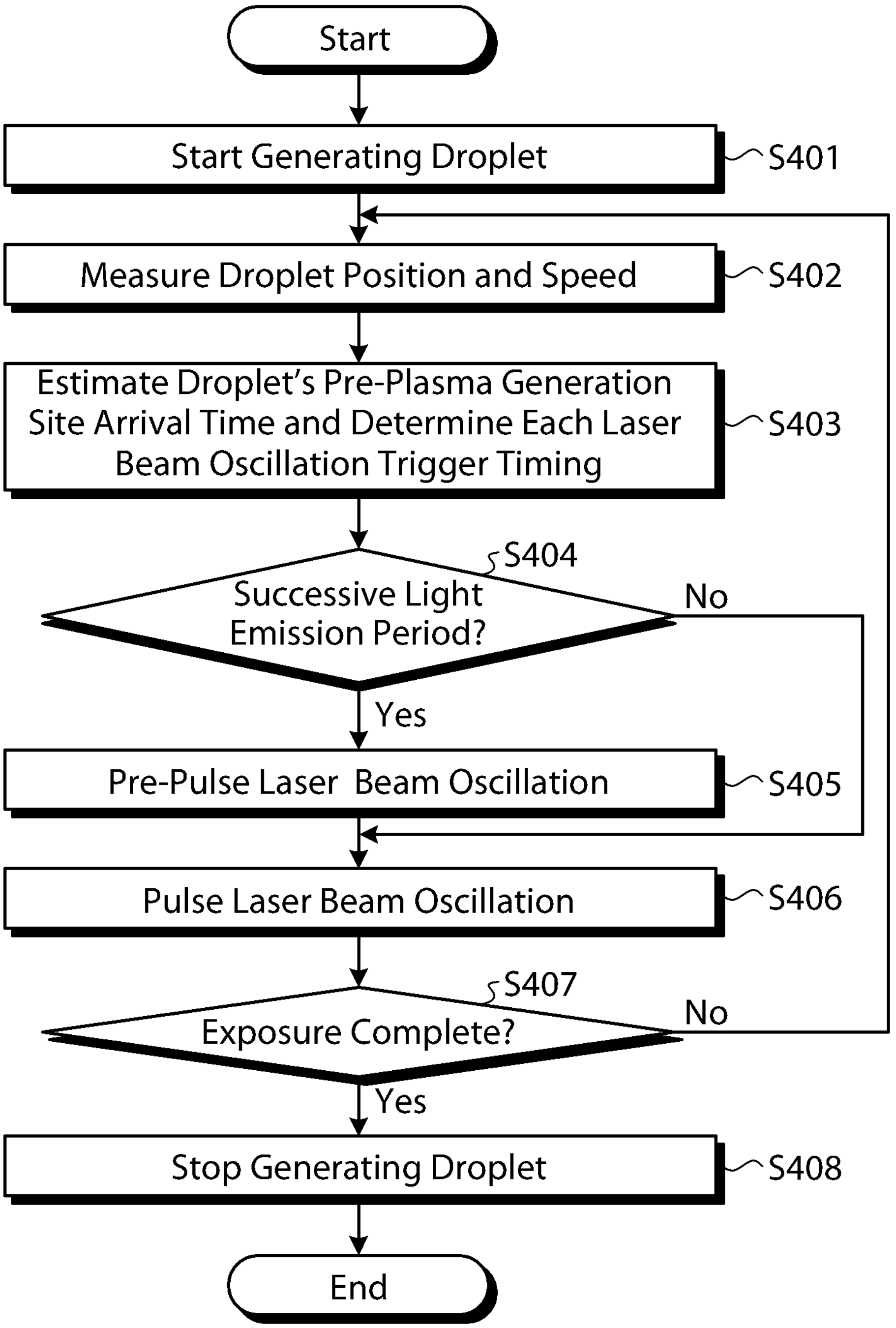
FIG. 17 is a flowchart illustrating a burst control processing procedure according to the second embodiment.

Here, the burst control processing according to the second embodiment will be described in detail with reference to a flowchart shown in FIG. 17. The EUV light source controller C may first perform processing to cause the target supply unit 11 to start generating the droplet 13 (Step S401). Then, the EUV light source controller C may measure the position (or trajectory) and the speed of the droplet 13 based on the image information around the pre-plasma generation site P11 by the imaging unit 12 (Step S402). Subsequently, the EUV light source controller C may estimate the time at which the droplet 13 may arrive in the pre-plasma generation site P11 (pre-plasma generation site arrival time) from actuation timing of the target supply unit 11 (output timing of the target generation signal S4, for example), and determine oscillation trigger timing of the pre-pulse laser beam LP and of the pulse laser beam L1 based on the estimated pre-plasma generation site arrival time (Step S403).

Thereafter, the burst control unit C1 of the EUV light source controller C may determine whether or not the successive light emission period T2 is occurring at a given moment (Step S404). If the successive light emission period T2 is occurring (Step S404, Yes), the burst control unit C1 may cause the pre-pulse laser beam LP to be oscillated (Step S405), and then cause the pulse laser beam L1 to be oscillated (Step S406). With this, the droplet 13 may be irradiated with the pre-pulse laser beam LP, and the pre-plasma PP may be generated; then, the pre-plasma PP may be irradiated with the pulse laser beam L1, and the EUV light L10 may be generated.

Meanwhile, if the successive light emission period T2 is not occurring (Step S404, No), that is, if the successive light emission pause period T1 is occurring, the pre-pulse laser beam LP may not be oscillated, and only the pulse laser beam L1 may be oscillated (Step S406). With this, the EUV light L10 may not be generated.

Thereafter, the EUV light source controller C may determine whether or not the burst light emission indication signal S1 indicating completion of exposure has been inputted from the exposure apparatus 20 (Step S407). If the exposure is not complete (Step S407, No), the processing may return to Step S402 and the above-described burst operation may be continued. If the exposure is complete (Step S407, Yes), the EUV light source controller C may stop generation of the droplet 13 (Step S408), and the processing may be terminated.

In Second embodiment, generation of the EUV light L10 may be paused by stopping oscillation of the pre-pulse laser beam LP during the successive light emission pause period T1 of the burst oscillation period, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 may be in the successive light emission operation during the burst operation, the optical system in the driver laser 1 may be thermally stable. With this, the droplet 13 may be irradiated with the pulse laser beam L1 at a stable location with stable energy. As a result, stable EUV light L10 may be emitted.
3. Since the driver laser 1 may be in the successive light emission operation during the burst operation, the heat load variation of the driver laser 1 may be reduced. With this, damage to the optical element or the like used in the driver laser 1 caused by the heat load variation may be reduced. As a result, the lifetime of the optical element may be extended.

First Modification of Second Embodiment

Figure 18A:
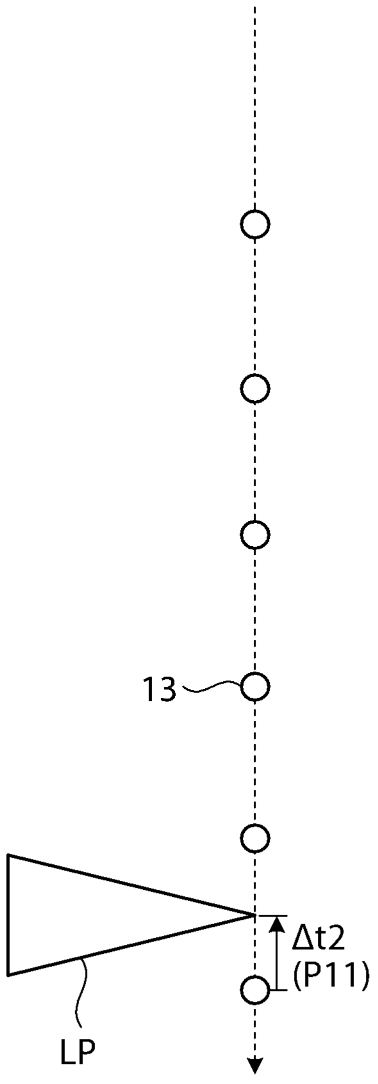
FIGS. 18A and 18B schematically illustrate an operation during a successive light emission pause period according to a first modification of the second embodiment.
Figure 18B:
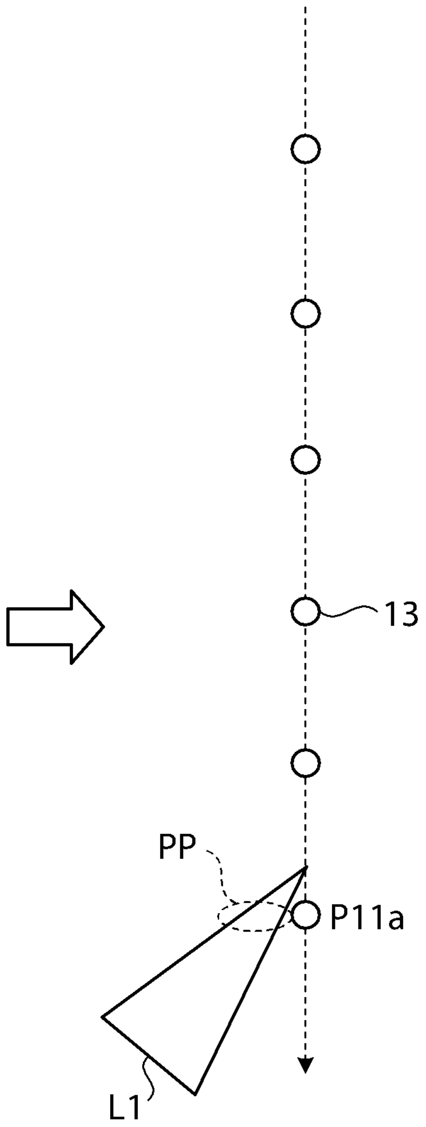

In the above-described second embodiment, generation of the EUV light L10 may be paused by stopping oscillation of the pre-pulse laser beam LP. Without being limited thereto, however, as in the pulse laser beam L1 in the first embodiment, generation of the EUV light L10 may be paused by shifting the oscillation timing of the pre-pulse laser beam LP (see FIG. 18A) while the pulse laser beam L1 is oscillated continuously (see FIG. 18B). Hereinafter, this case will be described as a first modification of the second embodiment.

Figure 19:
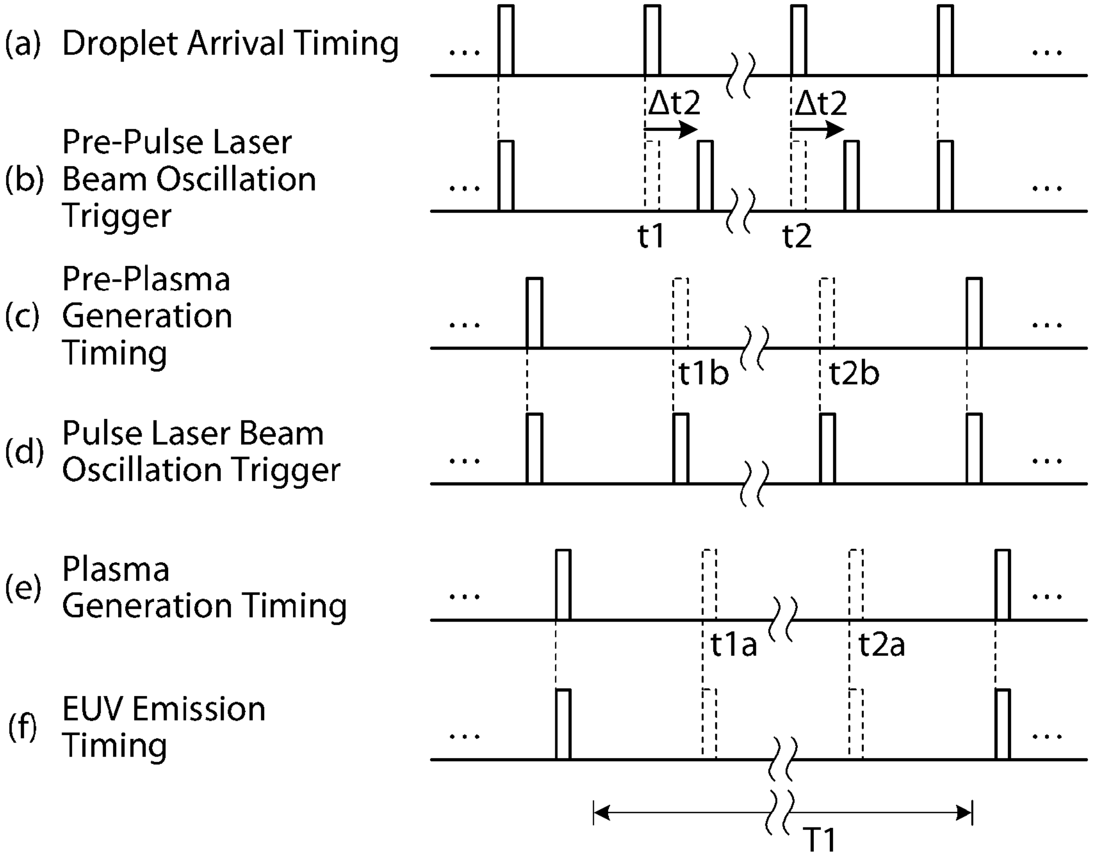
FIG. 19 is a timing chart illustrating an operation during the successive light emission pause period according to the first modification of the second embodiment.

As shown in (b) of FIG. 19, in the first modification, the oscillation timing of the pre-pulse laser beam LP may be delayed by Δt2 during the successive light emission pause period T1. With this, the pre-plasma PP may not be generated at the pre-plasma generating timing t1*b* and t2*b*. Therefore, even when the pulse laser beam L1 is oscillated at the pulse laser beam oscillation timing t1*b* and t2*b*, the EUV light L10 may not be emitted at the EUV light emission timing t1*a* and t2*a*. In this case, the pre-pulse laser 30 may be in the successive light emission operation; therefore, as in the driver laser 1, a stable pre-pulse laser beam LP may be outputted. As a result, stable EUV light L10 may be emitted. In the first modification, the same effect may be obtained even when the oscillation timing of the pre-pulse laser beam LP is shifted forward.

Figure 20:
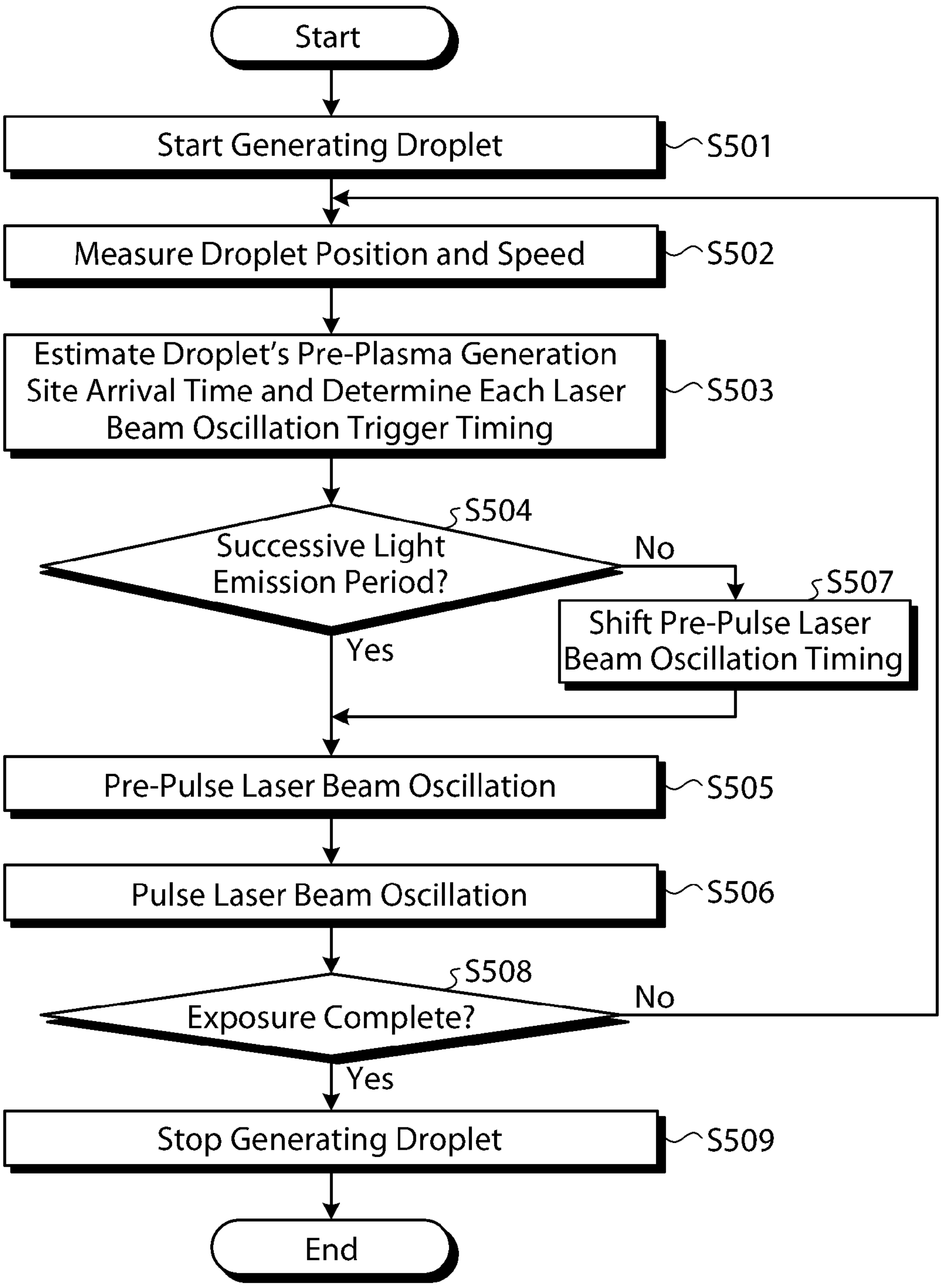
FIG. 20 is a flowchart illustrating a burst control processing procedure according to the first modification of the second embodiment.

Here, the burst control processing according to the first modification of the second embodiment will be described in detail with reference to a flowchart shown in FIG. 20. The EUV light source controller C may first perform processing to cause the target supply unit 11 to start generating the droplet 13 (Step S501). Then, the EUV light source controller C may measure the position (or trajectory) and the speed of the droplet 13 based on the image information around the pre-plasma generation site P11 by the imaging unit 12 (Step S502). Subsequently, the EUV light source controller C may estimate the pre-plasma generation site arrival time, and determine the oscillation trigger timing of the pre-pulse laser beam LP and of the pulse laser beam L1 based on the estimated pre-plasma generation site arrival time (Step S503).

Thereafter, the burst control unit C1 of the EUV light source controller C may determine whether or not the successive light emission period T2 is occurring at a given moment (Step S504). If the successive light emission period T2 is occurring (Step S504, Yes), the burst control unit C1 may cause the pre-pulse laser beam LP to continue being oscillated (Step S505), and then cause the pulse laser beam L1 to be oscillated (Step S506). With this, the pre-plasma PP generated by being irradiated with the pre-pulse laser beam LP may be irradiated with the pulse laser beam L1, whereby the EUV light L10 may be generated.

Meanwhile, if the successive light emission period T2 is not occurring (Step S504, No), that is, if a successive light emission pause period T1 is occurring, the oscillation timing of the pre-pulse laser beam LP may be shifted (Step S507), and thereafter the pre-pulse laser beam LP may be oscillated (Step S505), and the pulse laser beam L1 may be oscillated (Step S506). In this case, although both the pre-pulse laser beam LP and the pulse laser beam L1 may be oscillated, the EUV light L10 may not be emitted.

Thereafter, the EUV light source controller C may determine whether or not the burst light emission indication signal S1 indicating completion of the exposure has been inputted from the exposure apparatus 20 (Step S508). If the exposure is not complete (Step S508, No), the processing may return to Step S502 and the above-described burst operation may be continued. If the exposure is complete (Step S508, Yes), the EUV light source controller C may stop generation of the droplet 13 (Step S509), and the processing may be terminated.

In the first modification of the second embodiment, generation of the EUV light L10 may be paused by shifting the oscillation timing of the pre-pulse laser beam LP during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 and the pre-pulse laser 30 may be in the successive light emission operation during the burst operation, the optical systems in the driver laser 1 and in the pre-pulse laser 30 may be thermally stable. A stable pulse laser beam L1 and a stable pre-pulse laser beam LP are outputted, and stable EUV light L10 may be emitted.
3. Since the driver laser 1 and the pre-pulse laser 30 may be in the successive light emission operation during the burst operation, the heat load variation of the driver laser 1 and of the pre-pulse laser 30 may be reduced. With this, damage to the optical elements or the like used in the driver laser 1 and in the pre-pulse laser 30 caused by the heat load variation may be reduced. As a result, the lifetime of the optical elements may be extended.

Second Modification of Second Embodiment

Figures 21A, 21B:
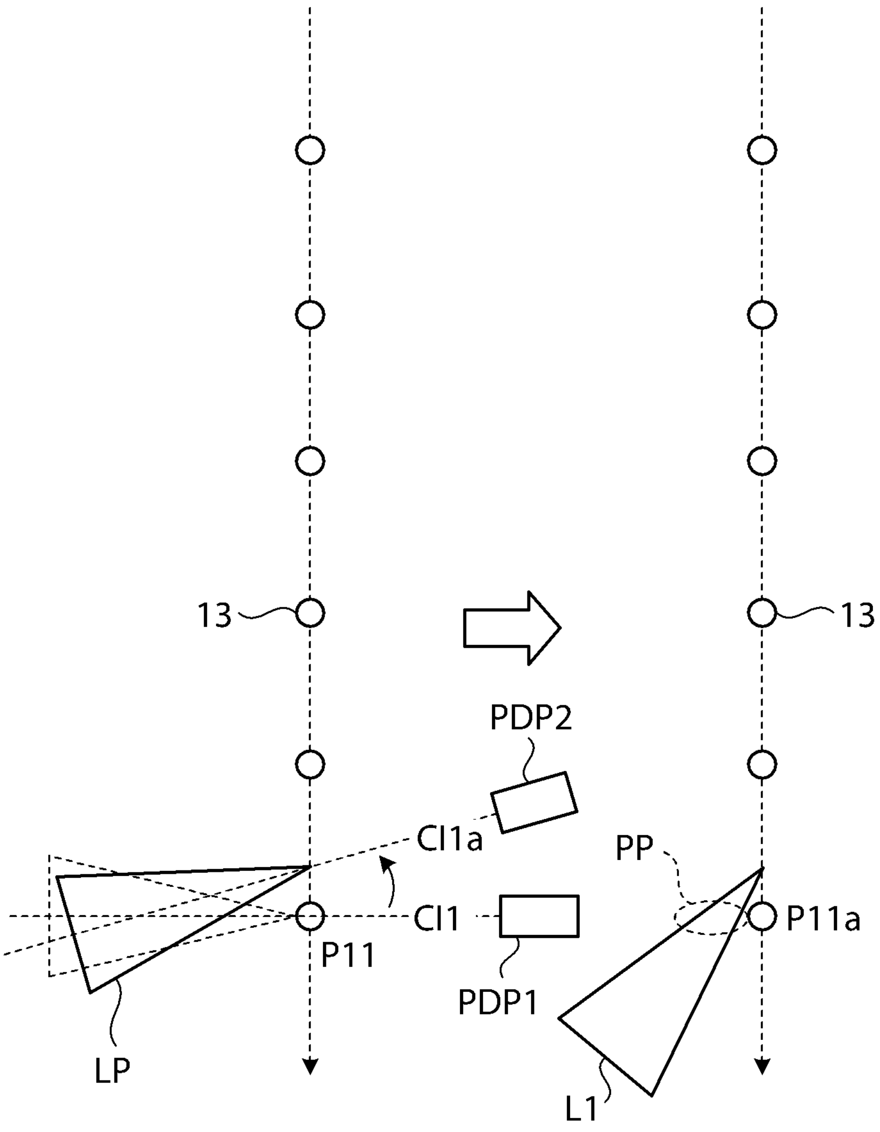
FIGS. 21A and 21B schematically illustrate an operation during a successive light emission pause period according to a second modification of the second embodiment.

In the first modification of the second embodiment, generation of the EUV light L10 may be paused by shifting the oscillation timing of the pre-pulse laser beam LP while the pre-pulse laser beam LP and the pulse laser beam L1 may be oscillated continuously. In a second modification of the second embodiment, as in the pulse laser beam L1 in the first modification of the first embodiment, a beam axis CI1 of the pre-pulse laser beam LP may be shifted to a beam axis CI1*a* (see FIG. 21A). With this control as well, even when the pulse laser beam L1 is oscillated, since the pre-plasma PP may not be generated, generation of the EUV light L10 may be paused (see FIG. 21B). Note that, in addition to a beam dump PDP1 disposed on the extension of the beam axis CI1 of the pre-pulse laser beam LP, a beam dump PDP2 may be provided on an extension of the beam axis CI1*a*.

Figure 22:
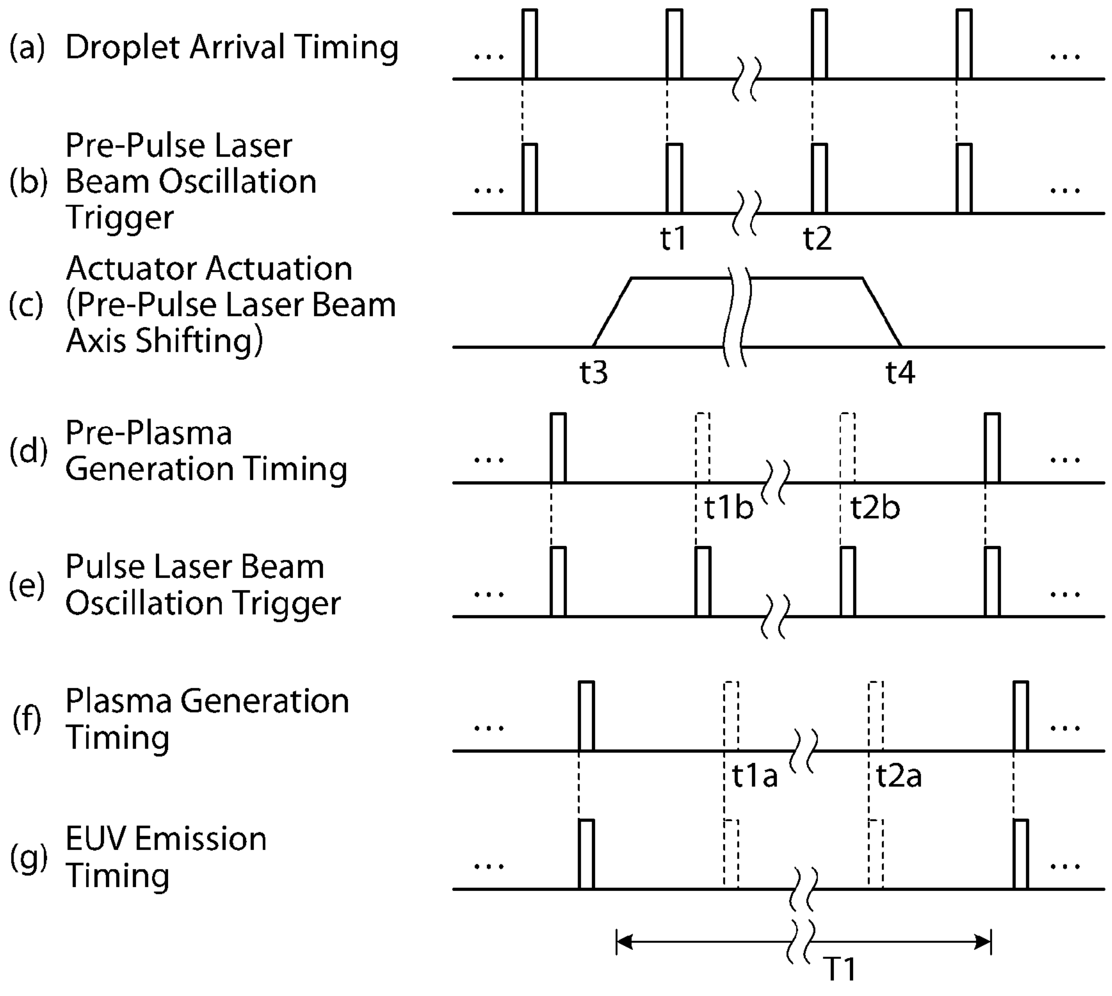
FIG. 22 is a timing chart illustrating the operation during the successive light emission pause period according to the second modification of the second embodiment.

As shown in (c) of FIG. 22, the mirror actuator M5*a* may be actuated during a period including the successive light emission pause period T1 from the time point t3 until the time point t4, whereby the beam axis of the pre-pulse laser beam LP may be shifted (see FIG. 12). With this, the droplet 13 may not be irradiated with the pre-pulse laser beam LP; therefore, the pre-plasma PP may not be generated at the pre-plasma generation timing t1*b* and t2*b* (see (d) of FIG. 22). As a result, the EUV light L10 may not be generated at the EUV light emission timing t1*a* and t2*a* (see (g) of FIG. 22).

Figure 23:
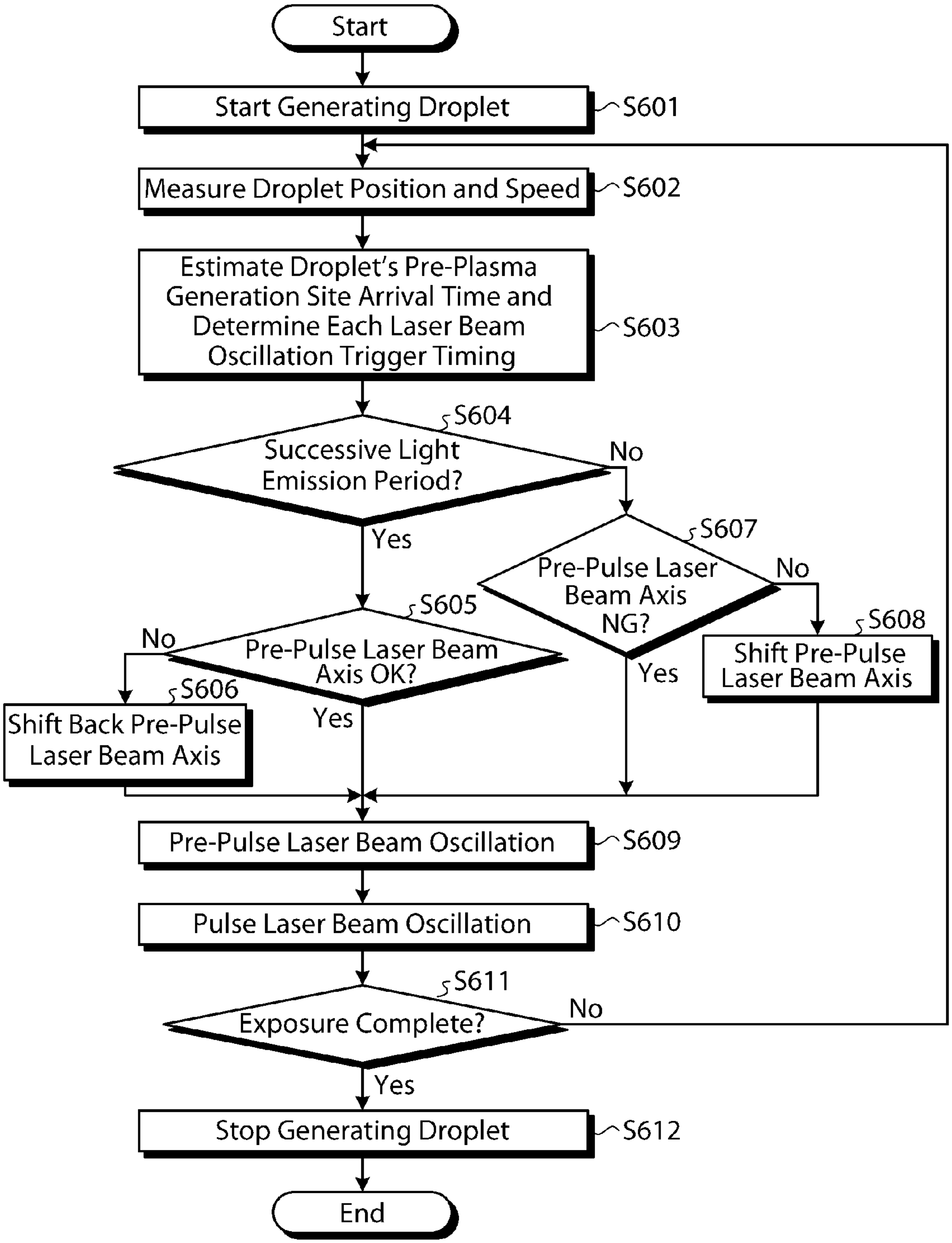
FIG. 23 is a flowchart illustrating a burst control processing procedure according to the second modification of the second embodiment.

The burst control processing according to the second modification of the second embodiment will be described in detail below with reference to a flowchart shown in FIG. 23. The EUV light source controller C may first perform processing to cause the target supply unit 11 to start generating the droplet 13 (Step S601). Then, the EUV light source controller C may measure the position (or trajectory) and the speed of the droplet 13 based on the image information around the pre-plasma generation site P11 by the imaging unit 12 (Step S602). Subsequently, the EUV light source controller C may estimate the pre-plasma generation site arrival time, and determine the oscillation trigger timing of the pre-pulse laser beam LP and of the pulse laser beam L1 based on the estimated pre-plasma generation site arrival time (Step S603).

Thereafter, the burst control unit C1 of the EUV light source controller C may determine whether or not the successive light emission period T2 is occurring at a given moment (Step S604). If the successive light emission period T2 is occurring (Step S604, Yes), the burst control unit C1 may determine whether or not the beam axis of the pre-pulse laser beam LP is shifted at that moment (Step S605). Then, when the beam axis of the pre-pulse laser beam LP is shifted to the beam axis CI1*a* (Step S605, No), the burst control unit C1 may shift the beam axis of the pre-pulse laser beam LP back to the beam axis CI1 (Step S606), and thereafter cause the pre-pulse laser beam LP to be oscillated at the oscillation trigger timing determined in Step S603 (Step S609) and cause the pulse laser beam L1 to be oscillated (Step S610). With this, the droplet 13 may be irradiated with the pre-pulse laser beam LP, whereby the pre-plasma PP may be generated, and the pre-plasma PP may be irradiated with the pulse laser beam L1, whereby the EUV light L10 may be generated.

Meanwhile, if the successive light emission period T2 is not occurring (Step S604, No), that is, if the successive light emission pause period T1 is occurring, the burst control unit C1 may determine whether or not the beam axis of the pre-pulse laser beam LP is shifted at a given moment (Step S607). Then, when the beam axis of the pre-pulse laser beam LP is not shifted (Step S607, No), the burst control unit C1 may cause the beam axis of the pre-pulse laser beam LP to be shifted (Step S608), and thereafter cause the pre-pulse laser beam LP to be oscillated at the oscillation trigger timing determined in Step S603 (Step S609) and the pulse laser beam L1 to be oscillated (Step S610). In this case, the droplet 13 may not be irradiated with the pre-pulse laser beam LP outputted from the pre-pulse laser 30, whereby generation of the EUV light L10 may be paused.

Thereafter, the EUV light source controller C may determine whether or not the burst light emission indication signal S1 indicating completion of the exposure has been inputted from the exposure apparatus 20 (Step S611). If the exposure is not complete (Step S611, No), the processing may return to Step S602 and the above-described burst operation may be continued. If the exposure is complete (Step S611, Yes), the EUV light source controller C may stop generation of the droplet 13 (Step S612), and the processing may be terminated.

In the second modification of the second embodiment, generation of the EUV light L10 may be paused by shifting the beam axis of the pre-pulse laser beam LP during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 and the pre-pulse laser 30 may be in the successive light emission operation during the burst operation, the optical systems of the driver laser 1 and of the pre-pulse laser 30 may be thermally stable. A stable pulse laser beam L1 and a stable pre-pulse laser beam LP are outputted, and stable EUV light L10 may be emitted.
3. Since the driver laser 1 and the pre-pulse laser 30 may be in the successive light emission operation during the burst operation, the heat load variation in the driver laser 1 and in the pre-pulse laser 30 may be reduced. With this, damage to the optical elements or the like used in the driver laser 1 and in the pre-pulse laser 30 caused by the heat load variation may be reduced. As a result, the lifetime of the optical elements may be extended.

Third Modification of Second Embodiment

Figures 24A, 24B:
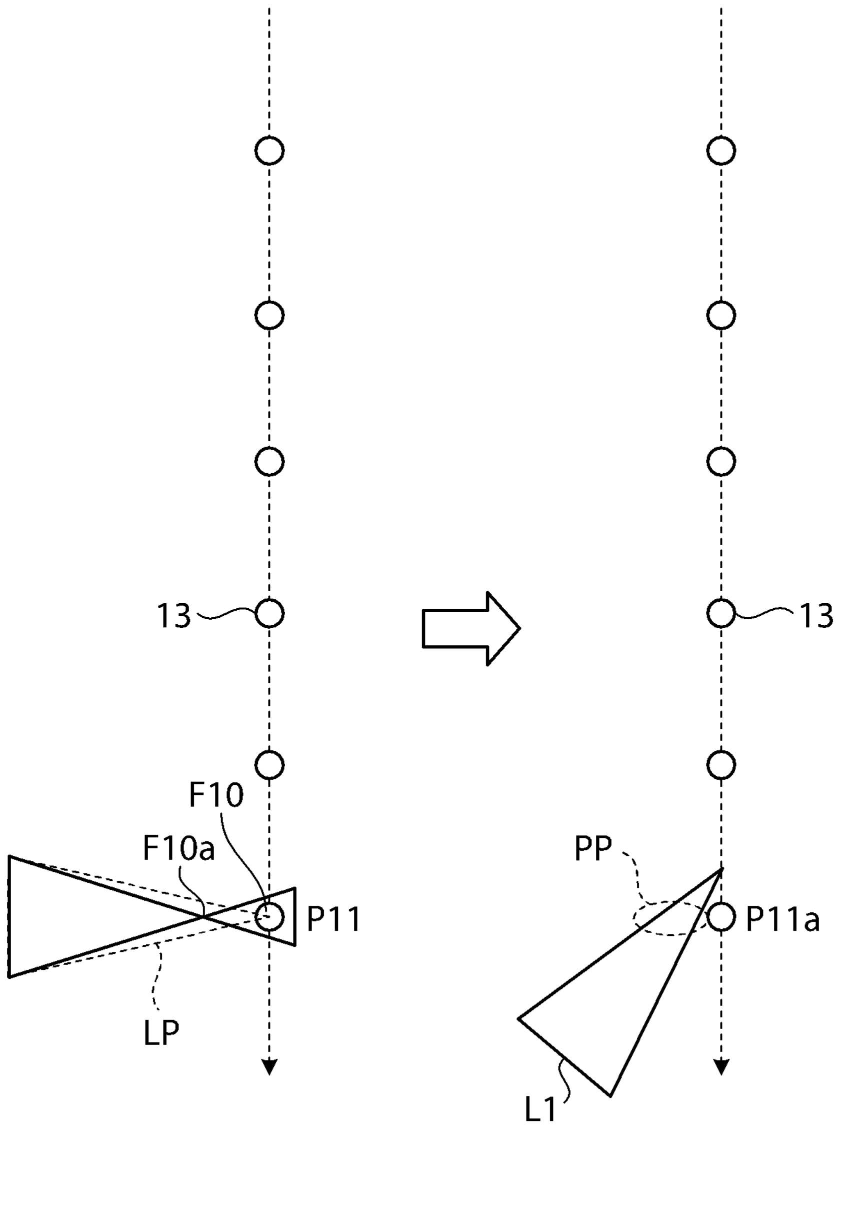
FIGS. 24A and 24B schematically illustrate an operation during a successive light emission pause period according to a third modification of the second embodiment.

As in the pulse laser beam L1 according to the second modification of the first embodiment, generation of the EUV light L10 may be paused by shifting a focus F10 of the pre-pulse laser beam LP to a focus F10*a* (see FIG. 24A) while the pulse laser beam L1 and the pre-pulse laser beam LP are oscillated continuously (see FIG. 24B). Hereinafter, this case will be described as a third modification of the second embodiment.

Figure 25:
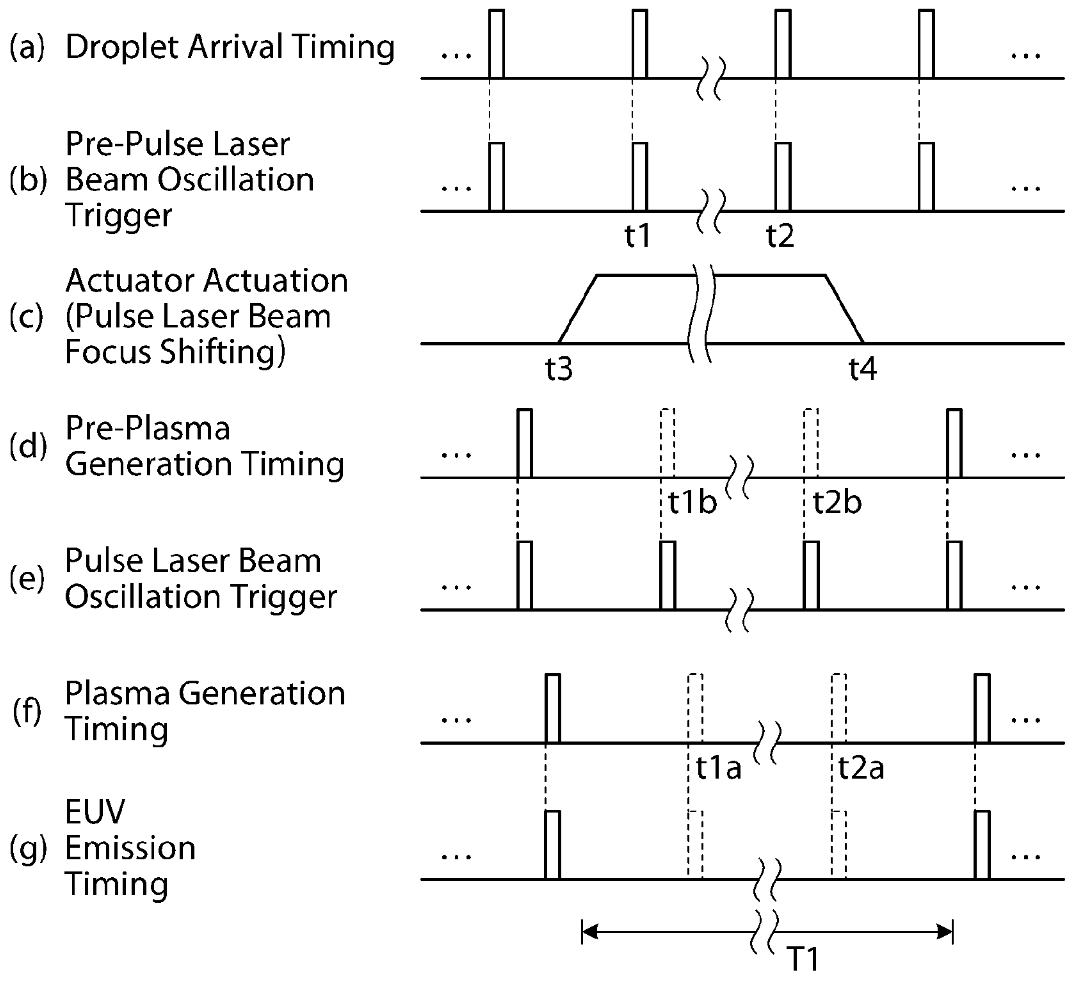
FIG. 25 is a timing chart illustrating an operation during the successive light emission pause period according to the third modification of the second embodiment.

As shown in (c) of FIG. 25, the mirror actuator M5*a* and the mirror M4 for the pre-pulse laser 30 may be actuated during a period including the successive light emission pause period T1 from the time point t3 until the time point t4, whereby the focus of the pre-pulse laser beam LP may be shifted (see FIG. 12). As a result, the energy density of the pre-pulse laser beam LP in the pre-plasma generation site P11 may be reduced, whereby the pre-plasma PP may not be generated even when the target 13 is irradiated with the pre-pulse laser beam LP. Accordingly, the pre-plasma PP may not be generated at the pre-plasma generation timing t1*b* and t2*b* (see (d) of FIG. 25), whereby the EUV light L10 may not be generated at the EUV light emission timing t1*a* and t2*a* (see (g) of FIG. 25).

Figure 26:
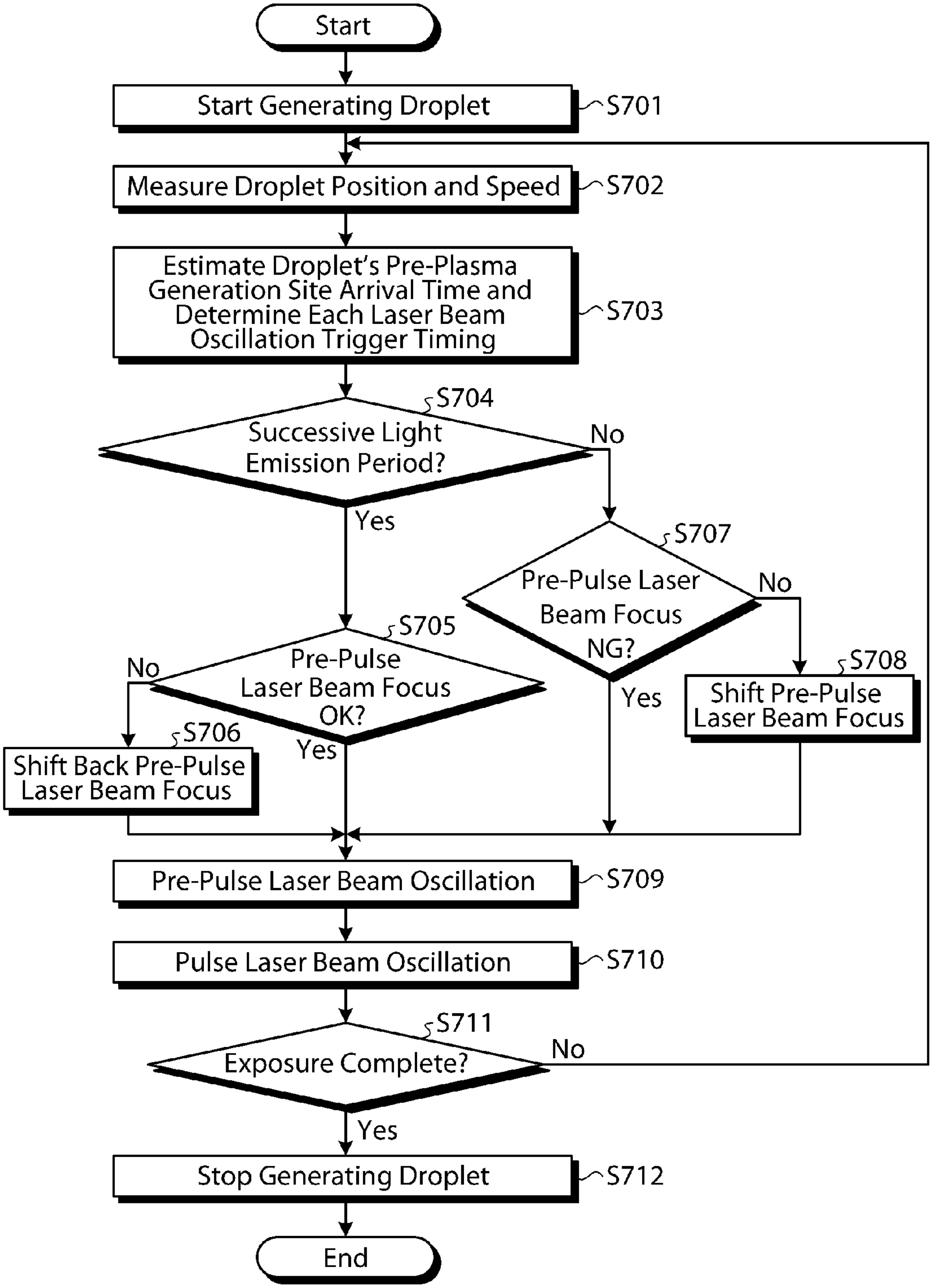
FIG. 26 is a flowchart illustrating a burst control processing procedure according to the third modification of the second embodiment.

The burst control processing according to the third modification of the second embodiment will be described in detail below with reference to a flowchart shown in FIG. 26. The EUV light source controller C may first perform processing to cause the target supply unit 11 to start generating the droplet 13 (Step S701). Then, the EUV light source controller C may measure the position (or trajectory) and the speed of the droplet 13 based on the image information around the pre-plasma generation site P11 by the imaging unit 12 (Step S702). Subsequently, the EUV light source controller C may estimate the pre-plasma generation site arrival time, and determine the oscillation trigger timing of the pre-pulse laser beam LP and of the pulse laser beam L1 based on the estimated pre-plasma generation site arrival time (Step S703).

Thereafter, the burst control unit C1 of the EUV light source controller C may determine whether or not the successive light emission period T2 is occurring at a given moment (Step S704). If the successive light emission period T2 is occurring (Step S704, Yes), the burst control unit C1 may determine whether or not the focus of the pre-pulse laser beam LP is shifted at that moment (Step S705). Then, when the focus of the pre-pulse laser beam LP is shifted to the focus F10*a* (Step S705, No), the burst control unit C1 may shift the focus of the pre-pulse laser beam LP back to the focus F10 (Step S706), and thereafter cause the pre-pulse laser beam LP to be oscillated at the oscillation trigger timing determined in Step S703 (Step S709) and the pulse laser beam L1 to be oscillated (Step S710). With this, the droplet 13 may be irradiated with the pre-pulse laser beam LP, whereby the pre-plasma PP may be generated, and the pre-plasma PP may be irradiated with the pulse laser beam L1, whereby the EUV light L10 may be generated.

Meanwhile, if the successive light emission period T2 is not occurring (Step S704, No), that is, if the successive light emission pause period T1 is occurring, the burst control unit C1 may determine whether or not the focus of the pre-pulse laser beam LP is shifted at that moment (Step S707). Then, when the focus of the pre-pulse laser beam LP is not shifted (Step S707, No), the burst control unit C1 may cause the focus of the pre-pulse laser beam LP to be shifted to the focus F10*a* (Step S708), and thereafter cause the pre-pulse laser beam LP to be oscillated at the oscillation trigger timing determined in Step S703 (Step S709) and the pulse laser beam L1 to be oscillated (Step S710). In this case, the droplet 13 may not be turned into the pre-plasma by being irradiated with the pre-pulse laser beam LP, whereby generation of the EUV light L10 may be paused.

Thereafter, the EUV light source controller C may determine whether or not the burst light emission indication signal S1 indicating completion of the exposure has been inputted from the exposure apparatus 20 (Step S711). If the exposure is not complete (Step S711, No), the processing may return to Step S702 and the above-described burst operation may be continued. If the exposure is complete (Step S711, Yes), the EUV light source controller C may stop generation of the droplet 13 (Step S712), and the processing may be terminated.

In the third modification of the second embodiment, generation of the EUV light L10 may be paused by shifting the focus of the pre-pulse laser beam LP during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 and the pre-pulse laser 30 may be in the successive light emission operation during the burst operation, the optical systems of the driver laser 1 and of the pre-pulse laser 30 may be thermally stable. A stable pulse laser beam L1 and a stable pre-pulse laser beam LP may be outputted, and stable EUV light L10 may be emitted.
3. Since the driver laser 1 and the pre-pulse laser 30 may be in the successive light emission operation during the burst operation, the heat load variation in the driver laser 1 and in the pre-pulse laser 30 may be reduced. With this, damage to the optical elements or the like used in the driver laser 1 and in the pre-pulse laser 30 caused by the heat load variation may be reduced. As a result, lifetime of the optical elements may be extended.

In the second embodiment and the modifications thereof, burst-emission of the EUV light L10 may be achieved by controlling the pre-pulse laser beam LP. However, the present disclosure is not limited to the second embodiment and the modifications thereof. For example, burst-emission of the EUV light L10 may be achieved by shifting oscillation timing of both the pre-pulse laser beam LP and the pulse laser beam L1, by shifting the beam axes of both the pre-pulse laser beam LP and the pulse laser beam L1, or by shifting the foci of both the pre-pulse laser beam LP and the pulse laser beam L1. These methods may be effective when the foci of the pre-pulse laser beam LP and of the pulse laser beam L1 substantially coincide with each other. For example, when the droplet serving as the target is mass-limited (approximately 10 μm in diameter), the extent of the target material diffused by being irradiated with the pre-pulse laser beam LP may be close to the original position of the droplet. In this case, even when the pre-pulse laser beam LP is controlled so that the droplet may not be irradiated therewith, the droplet may be irradiated with the pulse laser beam L1; thus, the burst control may be difficult. In such a case, burst-emission of the EUV light L10 may be achieved by performing the above-mentioned simultaneous control.

An example of an EUV light source apparatus in which a pre-pulse laser beam LP and a pulse laser beam L1 may strike a droplet 13 coaxially and foci of the pre-pulse laser beam LP and of the pulse laser beam L1 may be made to substantially coincide with each other, as mentioned above, is shown in FIG. 27.

Figure 27:
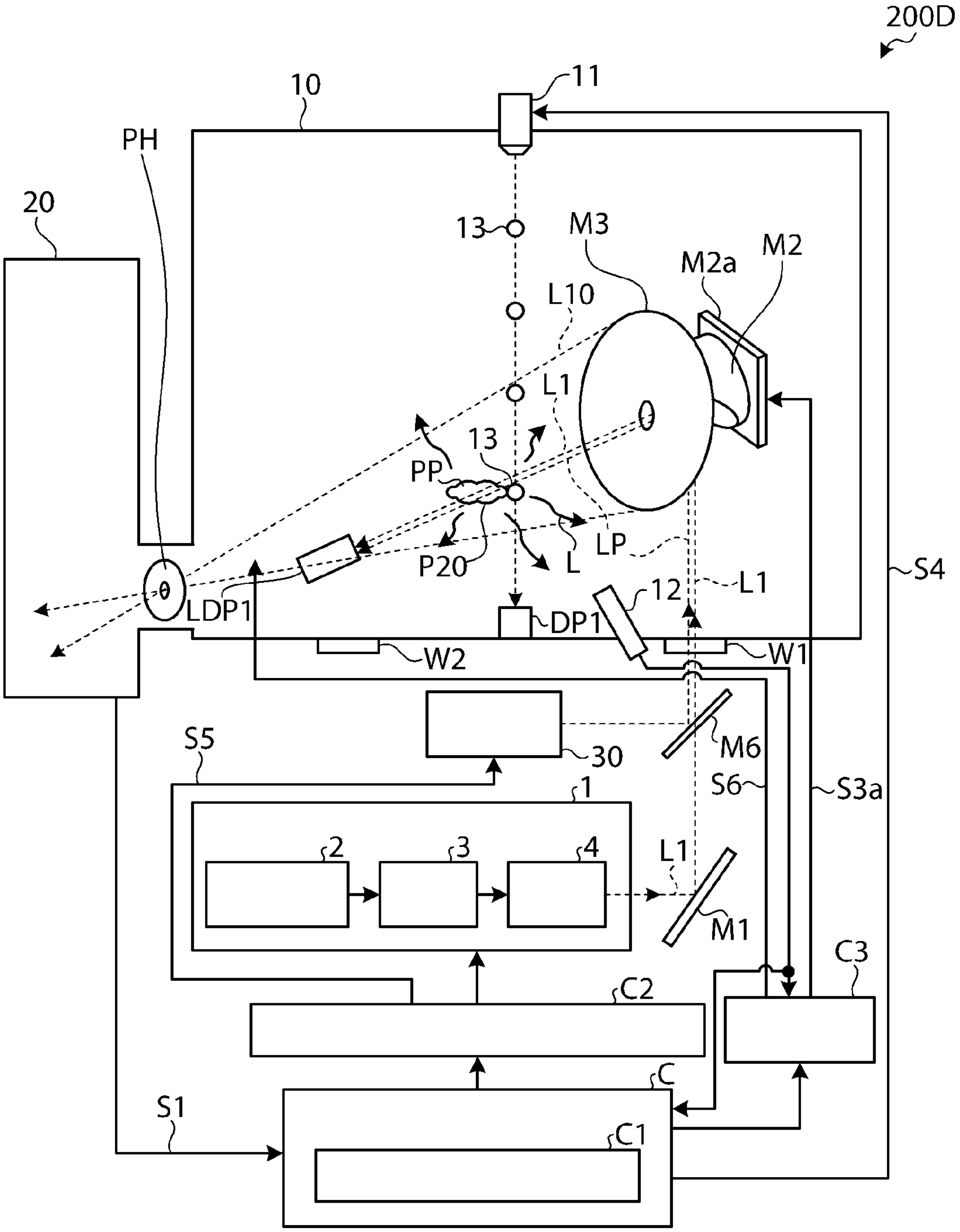
FIG. 27 schematically illustrates a configuration of an EUV light source apparatus according to a fourth modification of the second embodiment, in which a pre-pulse laser beam and a pulse laser beam travel in substantially the same direction and are focused at substantially the same point.

In the EUV light source apparatus 200D shown in FIG. 27, the droplet 13 may be irradiated with the pre-pulse laser beam LP outputted from the pre-pulse laser 30 via a beam splitter M6, substantially coaxially with the pulse laser beam L1. The pre-plasma PP may also be irradiated with the pulse laser beam L1 via the beam splitter M6, substantially coaxially with the pre-pulse laser beam LP. That is, the droplet 13 and the pre-plasma PP may respectively be irradiated with the pre-pulse laser beam LP and the pulse laser beam L1 coaxially via the beam splitter M6 and the focusing mirror M2. The beam dump LDP1 may also function as a beam dump for the pre-pulse laser beam LP.

When the pre-pulse laser beam LP and the pulse laser beam L1 strike the droplet 13 substantially coaxially, the focusing mirror M2 can be used as the focusing mirror common to both laser beams. As a result, simplification and size-reduction of the apparatus may be facilitated, and further, the beam axes or the foci of the pre-pulse laser beam LP and of the pulse laser beam L1 may be shifted simultaneously only by operating the focusing mirror M2. The control of the focusing mirror M2 may be carried out, for example, by a mirror actuation control signal S3*a* outputted from the mirror controller C3.

Third Embodiment

Next, a third embodiment of this disclosure will be described. In the third embodiment, as in the second embodiment, an EUV light source apparatus, in which the pre-pulse laser beam LP may be oscillated by the pre-pulse laser 30 and the generated pre-plasma PP may be irradiated with the pulse laser beam L1, may generate EUV light L10. In the third embodiment, in such EUV light source apparatus, generation of the EUV light L10 may be paused by stopping output of the droplet 13 during the successive light emission pause period T1 in a state in which the driver laser 1 and the pre-pulse laser 30 are in the successive light emission operation during the burst operation. Note that the third embodiment, as in the first embodiment, may be applied to an EUV light source apparatus in which the pre-pulse laser beam LP is not employed.

Figures 28A, 28B:
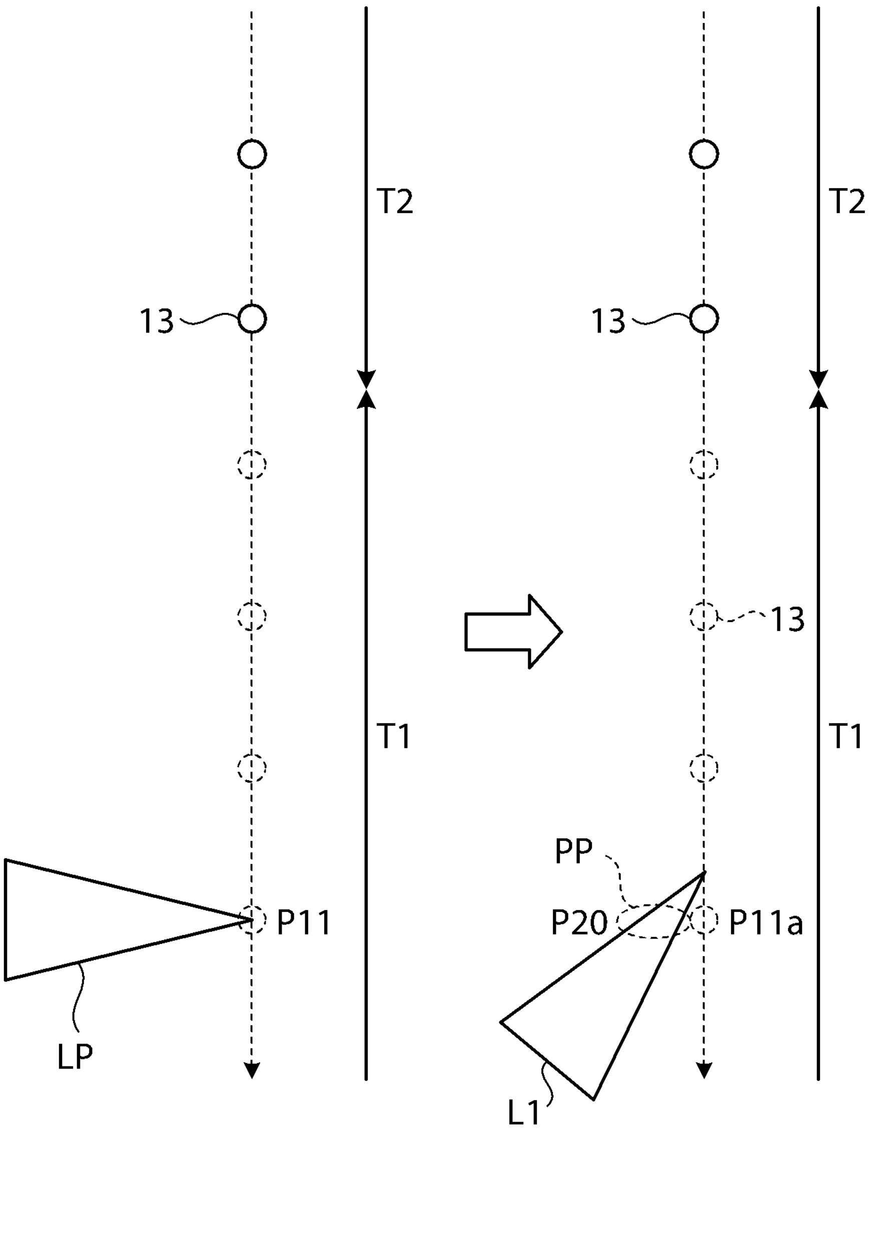
FIGS. 28A and 28B schematically illustrate an operation during a successive light emission pause period according to a third embodiment of this disclosure.

In the third embodiment, as shown in FIGS. 28A and 28B, the target material (droplet 13) serving as a source for generating the EUV light L10 may not be supplied during the successive light emission pause period T1. Thus, the EUV light L10 may not be generated even when the pre-plasma generation site P11 and the plasma generation site P20 are irradiated respectively with the pre-pulse laser beam LP and the pulse laser beam L1.

Figure 29:
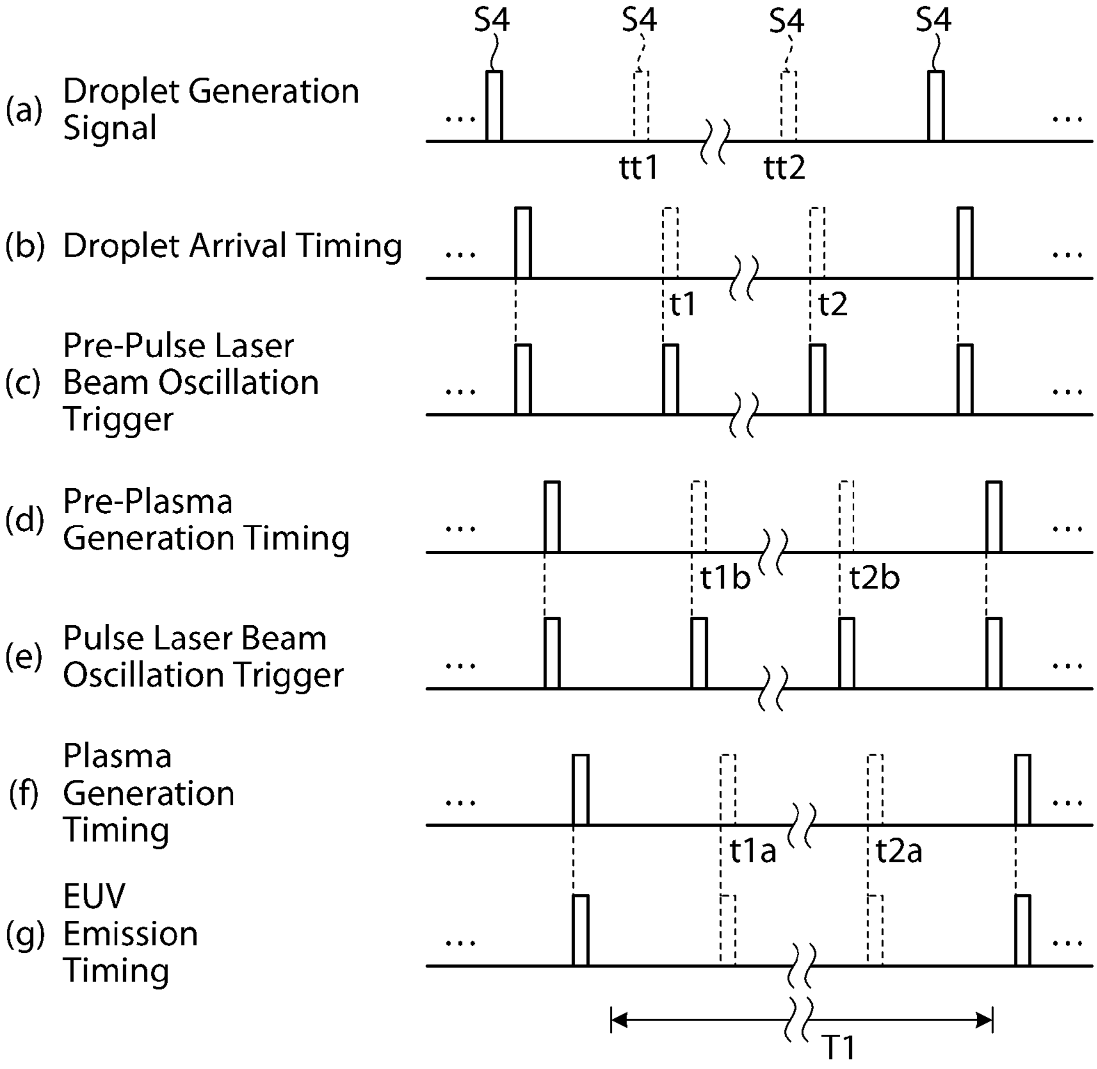
FIG. 29 is a timing chart illustrating an operation during the successive light emission pause period according to the third embodiment.

In the third embodiment, the burst control unit C1 of the EUV light source controller C may output the target generation signal S4 to the target supply unit 11 to thereby control supply of the droplet 13. In particular, the burst control unit C1 may control an output period and an output pause period of the droplet 13 (see FIG. 12 or FIG. 27). Accordingly, as shown in (a) of FIG. 29, the target generation signal S4 instructing generation of the droplet 13 may not be outputted at timing tt1 and tt2 at which the pre-plasma PP is to be generated, during the successive light emission pause period T1, whereby the droplet 13 may not be generated. As a result, since the droplet 13 may not be present at the pre-plasma generation site P11 at the timing t1 and t2 during the successive light emission pause period T1 (see (b) of FIG. 29), even when the pre-pulse laser beam oscillation trigger is generated to cause the pre-pulse laser beam LP to be outputted at the timing t1 and t2 (see (c) of FIG. 29), the pre-plasma PP may not be generated. Further, even when the pulse laser beam oscillation trigger may be generated to cause the pulse laser beam L1 to be outputted at the timing t1*b* and t2*b* (see (e) of FIG. 29), the plasma may not be generated at the timing t1*a* and t2*a* (see (f) of FIG. 29). As a result, the EUV light L10 may not be generated, either (see (g) of FIG. 29).

In the third embodiment, generation of the EUV light L10 may be paused by stopping output of the droplet 13 during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 and the pre-pulse laser 30 may be in the successive light emission operation during the burst operation, the optical systems in the driver laser 1 and in the pre-pulse laser 30 may be thermally stable. A stable pulse laser beam L1 and a stable pre-pulse laser beam LP may be outputted and stable EUV light L10 may be emitted.
3. Since the driver laser 1 and the pre-pulse laser 30 may be in the successive light emission operation during the burst operation, the heat load variation in the driver laser 1 and in the pre-pulse laser 30 may be reduced. With this, damage to the optical elements or the like used in the driver laser 1 and in the pre-pulse laser 30 caused by the heat load variation may be reduced. As a result, lifetime of the optical elements may be extended.
4. Since the droplet may not be outputted during the successive light emission pause period T1, the amount of the target material to be consumed may be reduced.

First Modification of Third Embodiment

In the above-described third embodiment, generation of the EUV light L10 may be paused by stopping output of the droplet 13. However, without being limited thereto, generation of the EUV light L10 may be paused by shifting the generation timing of the droplet 13 while the pre-pulse laser beam LP and the pulse laser beam L1 may be oscillated continuously. Hereinafter, this case will be described as a first modification of the third embodiment.

Figure 30A:
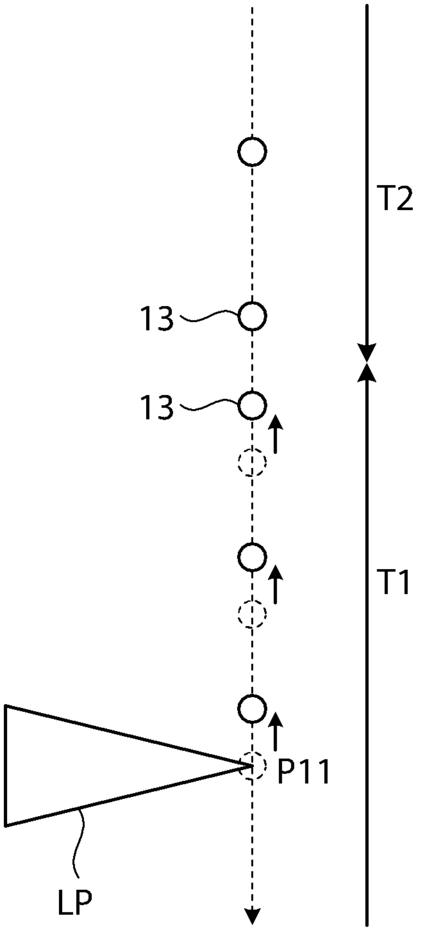
FIGS. 30A and 30B schematically illustrate an operation during a successive light emission pause period according to a first modification of the third embodiment.
Figure 30B:
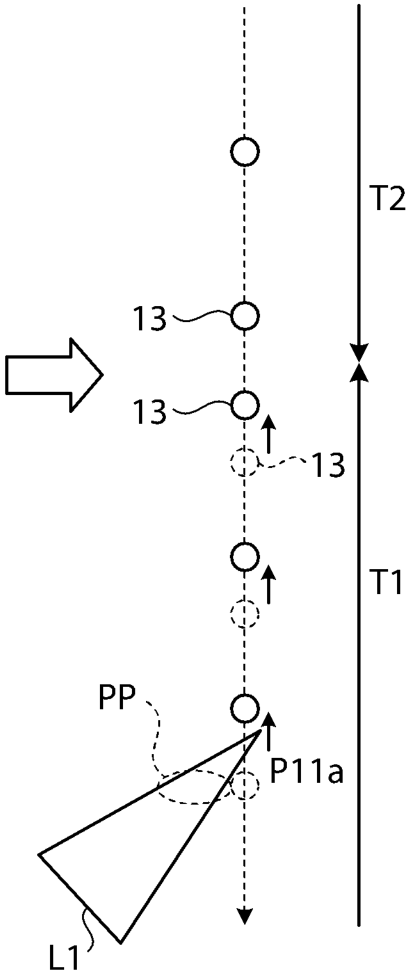

As shown in FIG. 30A, in the first modification, the generation timing of the droplet 13 may be delayed during the successive light emission pause period T1. With this, the droplet 13 may not be irradiated with the pre-pulse laser beam LP, whereby the pre-plasma PP may not be generated. As a result, even when the pulse laser beam L1 is oscillated, the EUV light L10 may not be generated. Here, similar effects may be obtained even when the generation timing of the droplet 13 is shifted forward.

Figure 31:
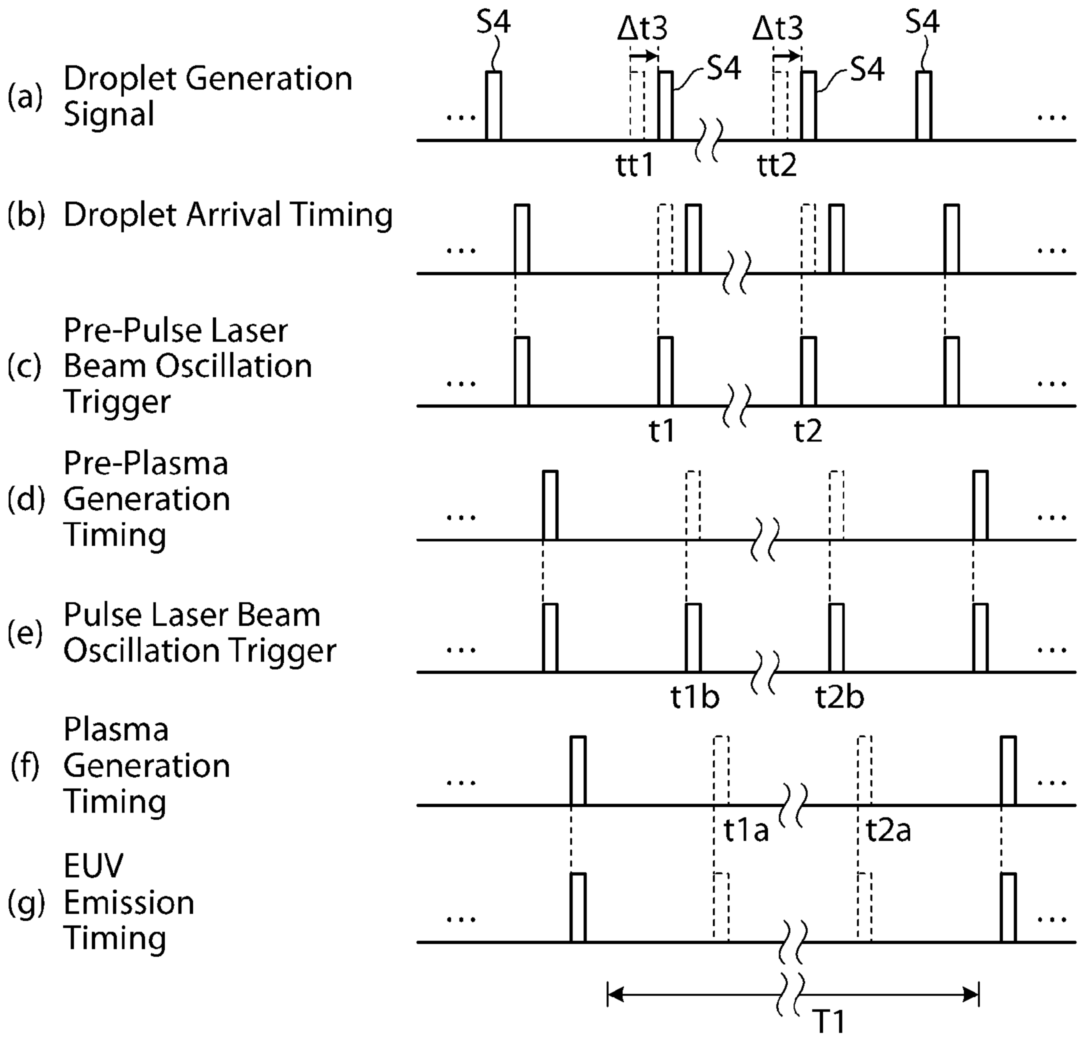
FIG. 31 is a timing chart illustrating the operation during the successive light emission pause period according to the first modification of the third embodiment.

In (a) of FIG. 31, the generation timing of the target generation signal S4 may be delayed by Δt3 during the successive light emission pause period T1 (timing of tt1 and tt2 of the target generation signal S4). As a result, since the droplet 13 may not arrive in the pre-plasma generation site P11 at timing t1 and t2 (see (b) of FIG. 31), even when the pre-pulse laser beam oscillation trigger is generated at timing t1 and t2, the droplet 13 may not be irradiated with the pre-pulse laser beam LP. Accordingly, the pre-plasma PP may not be generated at timing t1*b* and t2*b* (see (d) of FIG. 31). As a result, even when the pre-plasma generation site P11 is irradiated with the pulse laser beam L1 at timing t1*b* and t2*b* (see (e) of FIG. 31), the plasma may not be generated at timing t1*a* and t2*a*; thus, the EUV light L10 may not be generated, either (see (f) and (g) of FIG. 31).

In the first modification of the third embodiment, generation of the EUV light L10 may be paused by shifting the output timing of the droplet 13 during the successive light emission pause period T1, whereby the following advantages may be expected in some cases:

1. Damage to an optical element such as the EUV collector mirror M3 in the EUV chamber 10 may be reduced. As a result, the lifetime of the EUV light source apparatus may be extended.
2. Since the driver laser 1 and the pre-pulse laser 30 may be in the successive light emission operation during the burst operation, the optical systems of the driver laser 1 and of the pre-pulse laser 30 may be thermally stable. A stable pulse laser beam L1 and a stable pre-pulse laser beam LP may be outputted and stable EUV light L10 may be emitted.
3. Since the driver laser 1 and the pre-pulse laser 30 may be in the successive light emission operation during the burst operation, the heat load variation in the driver laser 1 and in the pre-pulse laser 30 may be reduced. With this, damage to the optical elements or the like used in the driver laser 1 and in the pre-pulse laser 30 caused by the heat load variation may be reduced. As a result, the lifetime of the optical elements may be extended.

Second Modification of Third Embodiment

The droplet 13 may be prevented from being irradiated with the pre-pulse laser beam LP by being accelerated or decelerated after it is outputted, whereby generation of the EUV light L10 may be paused. Hereinafter, a third modification of the third embodiment will be described.

Figure 32:
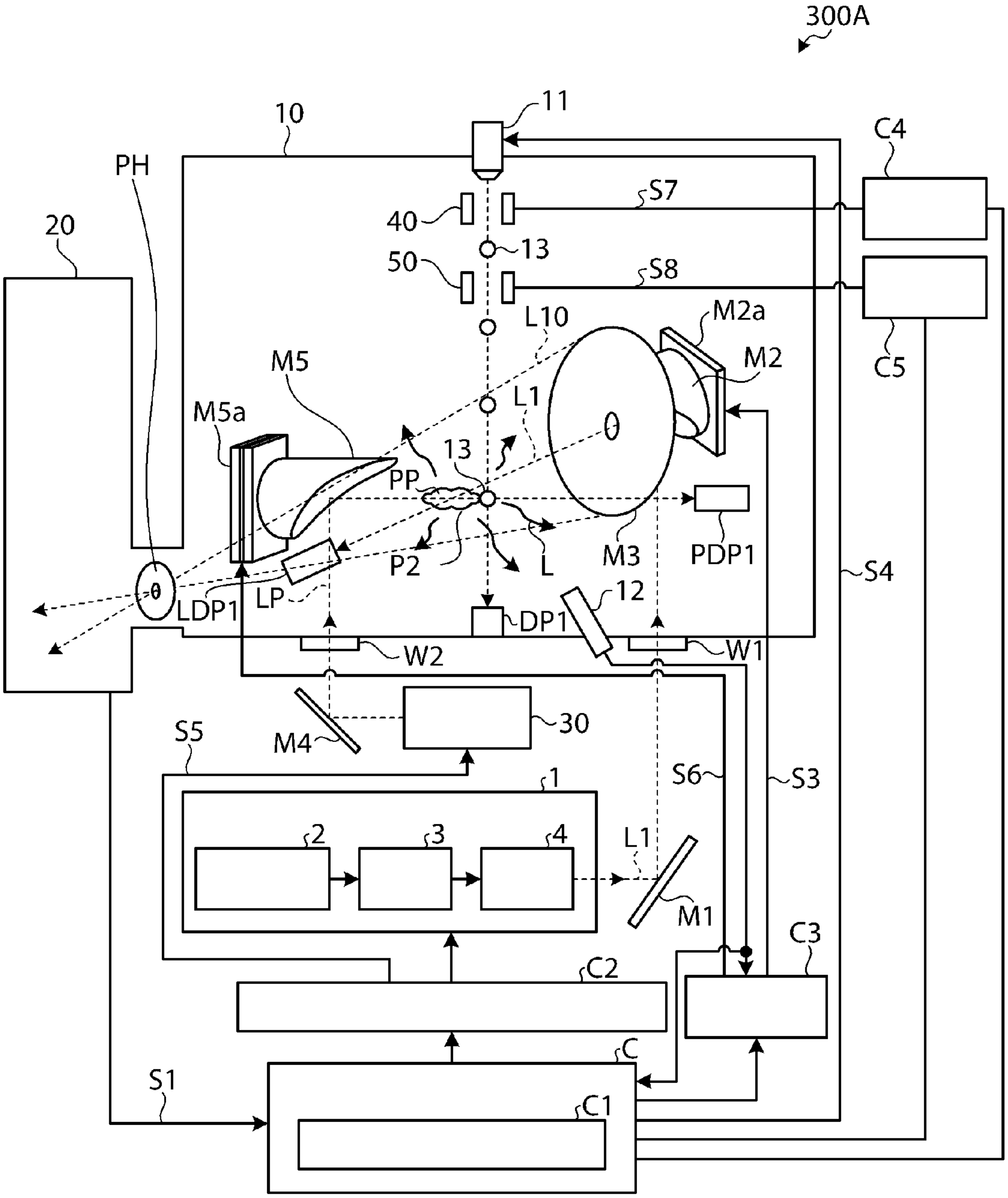
FIG. 32 schematically illustrates a configuration of an EUV light source apparatus according to a second modification of the third embodiment.

In an EUV light source apparatus 300A shown in FIG. 32, a charging electrode 40 and an acceleration/deceleration mechanism 50 may be provided, in this order from the side of the target supply unit 11, along the trajectory of the droplet 13 between an output end of the target supply unit 11 and the irradiation site of the pre-pulse laser beam LP. Charging voltage of the charging electrode 40 may be controlled by a charging voltage controller C4. Acceleration/deceleration of the droplet 13 by the acceleration/deceleration mechanism 50 may be controlled by an acceleration/deceleration controller C5. The charging electrode 40 may cause the droplet 13 passing through the charged electrode to become charged. The acceleration/deceleration mechanism 50 may be embodied by a pair of electric field generating electrodes or magnetic field generating coils facing each other, and the acceleration/deceleration mechanism 50 may accelerate or decelerate the charged droplet 13 by the electric field or the magnetic field. The charging controller C4 and the acceleration/deceleration controller C5 may be connected to the EUV light source controller C and provided with control instructions from the burst control unit C1 of the EUV light source controller C.

Figures 33A, 33B:
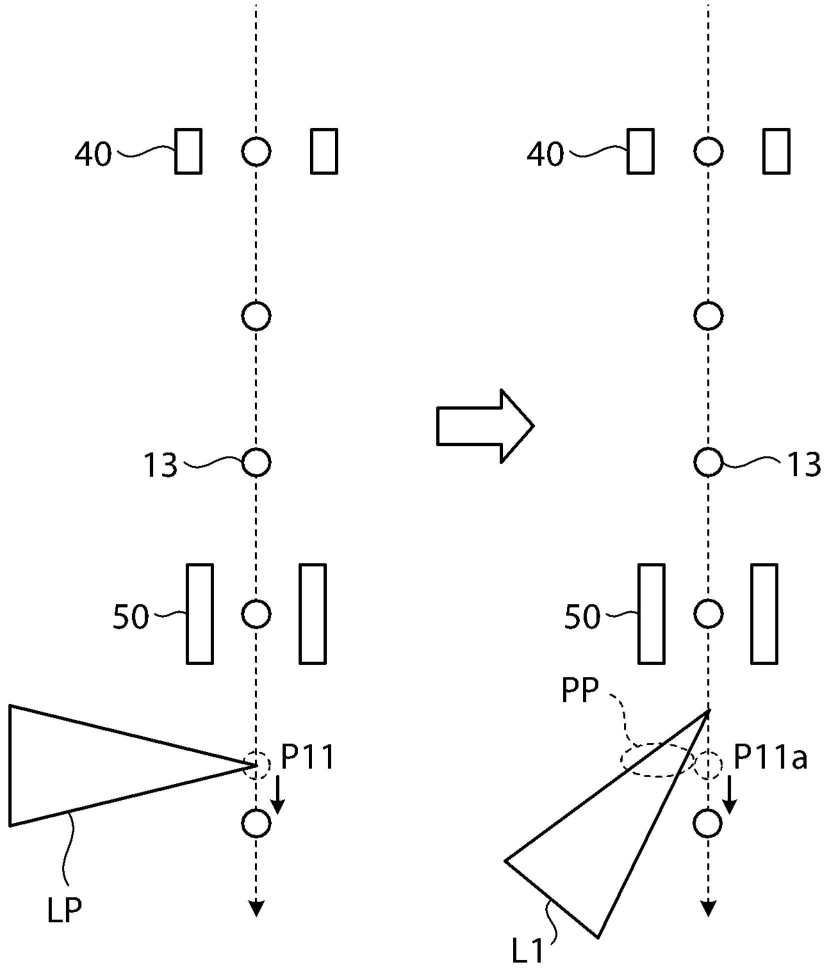
FIGS. 33A and 33B schematically illustrate an operation during a successive light emission pause period according to the second modification of the third embodiment.
Figure 34:
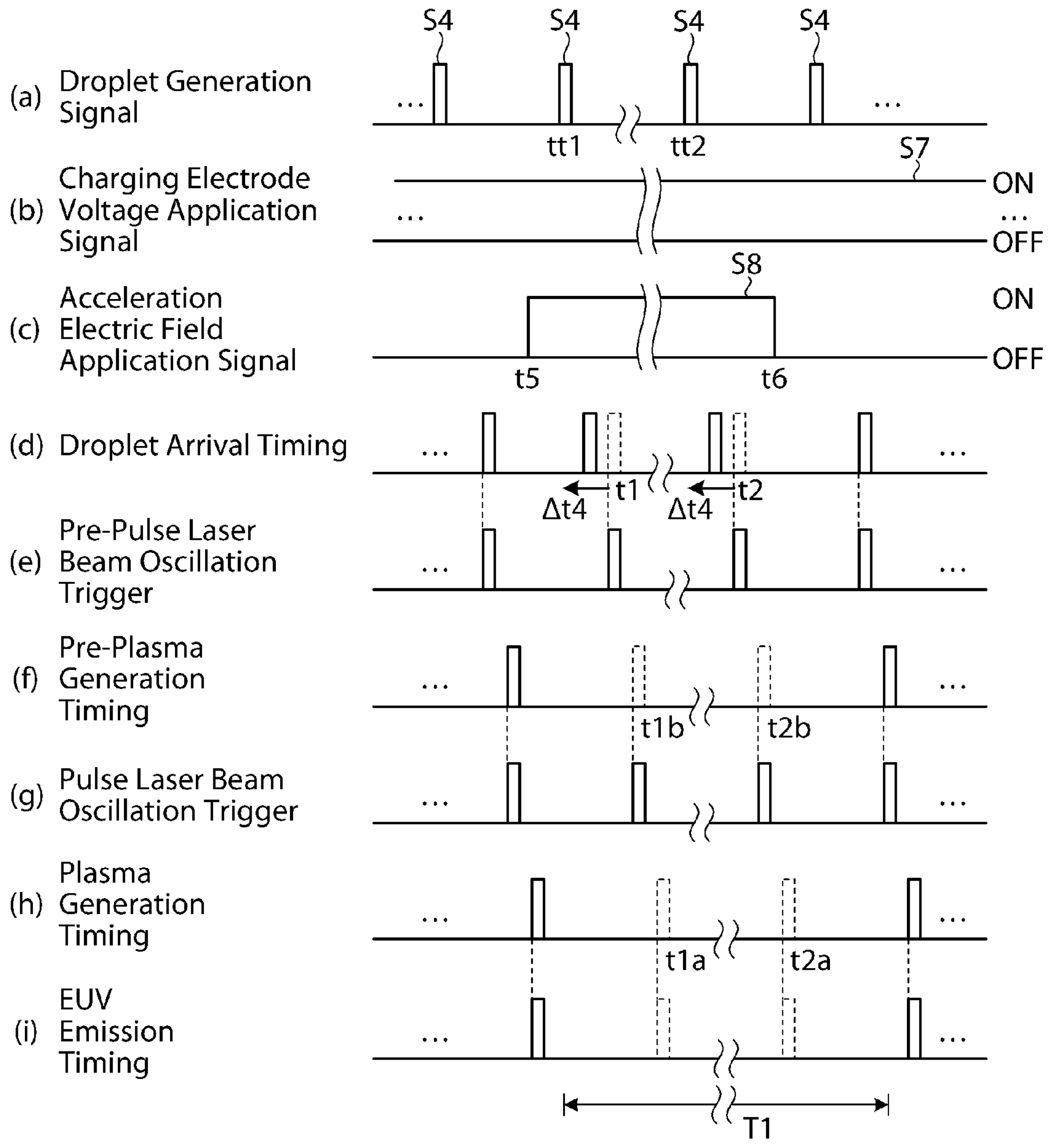
FIG. 34 is a timing chart illustrating an operation during the successive light emission pause period according to the second modification of the third embodiment.

For example, as shown in FIGS. 33A through 34, a charging electrode voltage application signal S7 may continually be applied to the charging electrode 40 by the charging electrode controller C4. With this, the droplet 13 outputted during the successive light emission pause period T1 may be positively charged by the charging electrode 40 (see (b) of FIG. 34). Further, an acceleration electric field application signal S8 may be applied to the acceleration/deceleration mechanism 50 by the acceleration/deceleration controller C5 (see (c) of FIG. 34) during the successive light emission pause period T1 (period between t5 and t6). Accordingly, the charged droplet 13 may be accelerated by the acceleration/deceleration mechanism 50. With this, the droplet 13 may arrive in the pre-plasma generation site P11 earlier by a period Δt4 (see (d) of FIG. 34). As a result, the droplet 13 may not be irradiated with the pre-pulse laser beam LP in the pre-plasma generation site P11 (FIG. 33A). Thus, the pre-plasma PP may not be generated at the pre-plasma generation timing t1*b* and t2*b* (see (f) of FIG. 34 and FIG. 33B). With this, even when the pulse laser beam oscillation trigger is generated at timing t1*b* and t2*b* (see (g) of FIG. 34), the plasma may not be generated at the timing t1*a* and t2*a* (see (h) of FIG. 34). As a result, the EUV light L10 may not generated either (see (i) of FIG. 34).

With this, emission of the EUV light L10 may be paused during the successive light emission pause period T1 while the driver laser 1 and the pre-pulse laser 30 are in the successive light emission operation.

Figure 35:
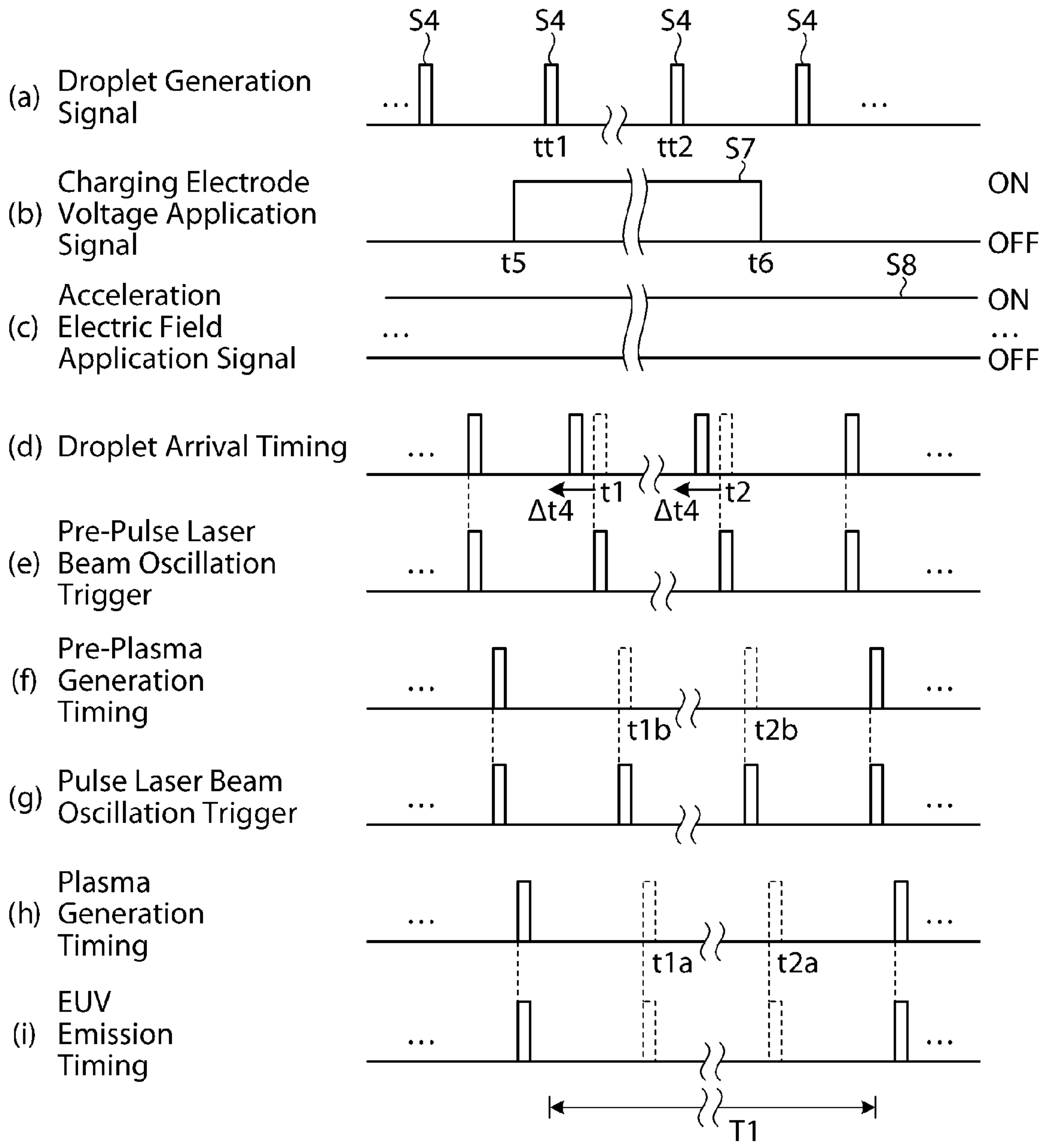
FIG. 35 is a timing chart illustrating an operation during the successive light emission pause period according to the second modification of the third embodiment.

As shown in FIG. 35, the configuration may be such that the droplet 13 may be charged with the charging electrode voltage application signal S7 being in an ON state only during the successive light emission pause period T1 (see (b) of FIG. 35) and with the acceleration electric field application signal S8 being continually in an ON state, whereby the droplet 13 is accelerated (see (c) of FIG. 35). Alternatively, the configuration may be such that both the charging electrode voltage application signal S7 and the acceleration electric field application signal S8 are in the ON state only during the successive light emission pause period T1.

Alternatively, the charging electrode voltage application signal S7 may continually be in the ON state, and the acceleration electric field application signal S8 may be in the ON state during the successive light emission period T2 and in an OFF state during the successive light emission pause period T1. In this case, the charged droplet 13 may be decelerated during the successive light emission pause period T1. Alternatively, the acceleration electric field application signal S8 may continually be in the ON state, and the charging electrode voltage application signal S7 may be in the ON state during the successive light emission period T2 and in the OFF state during the successive light emission pause period T1. In this case, compared to the droplet 13 during the successive light emission period T2, the droplet 13 during the successive light emission pause period T1 may be decelerated. At this time, the acceleration electric field application signal S8 may be in the OFF state during the successive light emission pause period T1. That is, the charging electrode voltage application signal S7 and the acceleration electric field application signal S8 may be in the ON state during the successive light emission period T2 and in the OFF state during the successive light emission pause period T1. In this case, compared to the droplet 13 during the successive light emission period T2, the droplet 13 during the successive light emission pause period T1 may be decelerated.

Summarizing these, six control patterns a1 through a6 shown in FIG. 36 can be exemplified as ON-OFF control patterns of the charging electrode 40 and of the acceleration/deceleration mechanism 50 for the successive light emission period T2 and the successive light emission pause period T1.

Further, the acceleration/deceleration controller C5 may be configured to apply a deceleration voltage application signal in place of the acceleration electric field application signal S8 to the acceleration/deceleration mechanism 50 to decelerate a charged target.

Third Modification of Third Embodiment

In a third modification of the third embodiment, the trajectory of the charged droplet 13 may be shifted, whereby the droplet 13 is prevented from being irradiated with the pre-pulse laser beam LP.

Figure 37:
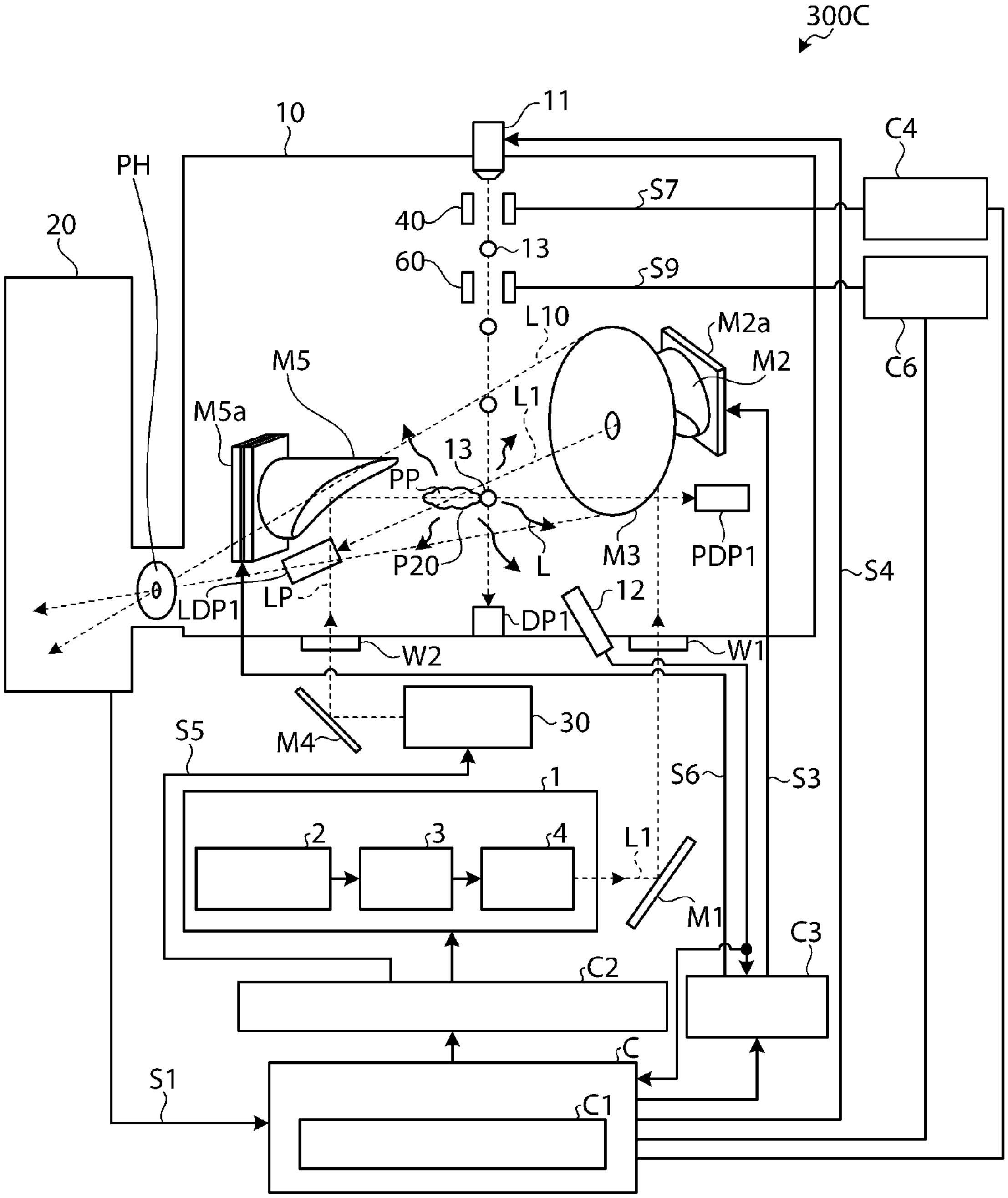
FIG. 37 schematically illustrates a configuration of an EUV light source apparatus according to a third modification of the third embodiment.

In an exemplary EUV light source apparatus 300C shown in FIG. 37, a deflection mechanism 60 may be provided in place of the acceleration/deceleration mechanism 50, and a deflection controller C6 may be provided in place of the acceleration/deceleration controller C5. The deflection controller C6 may apply a deflection electric field application signal S9 to the deflection mechanism 60, whereby the trajectory of the droplet 13 passing through the deflection mechanism 60 may be shifted.

Figures 38A, 38B:
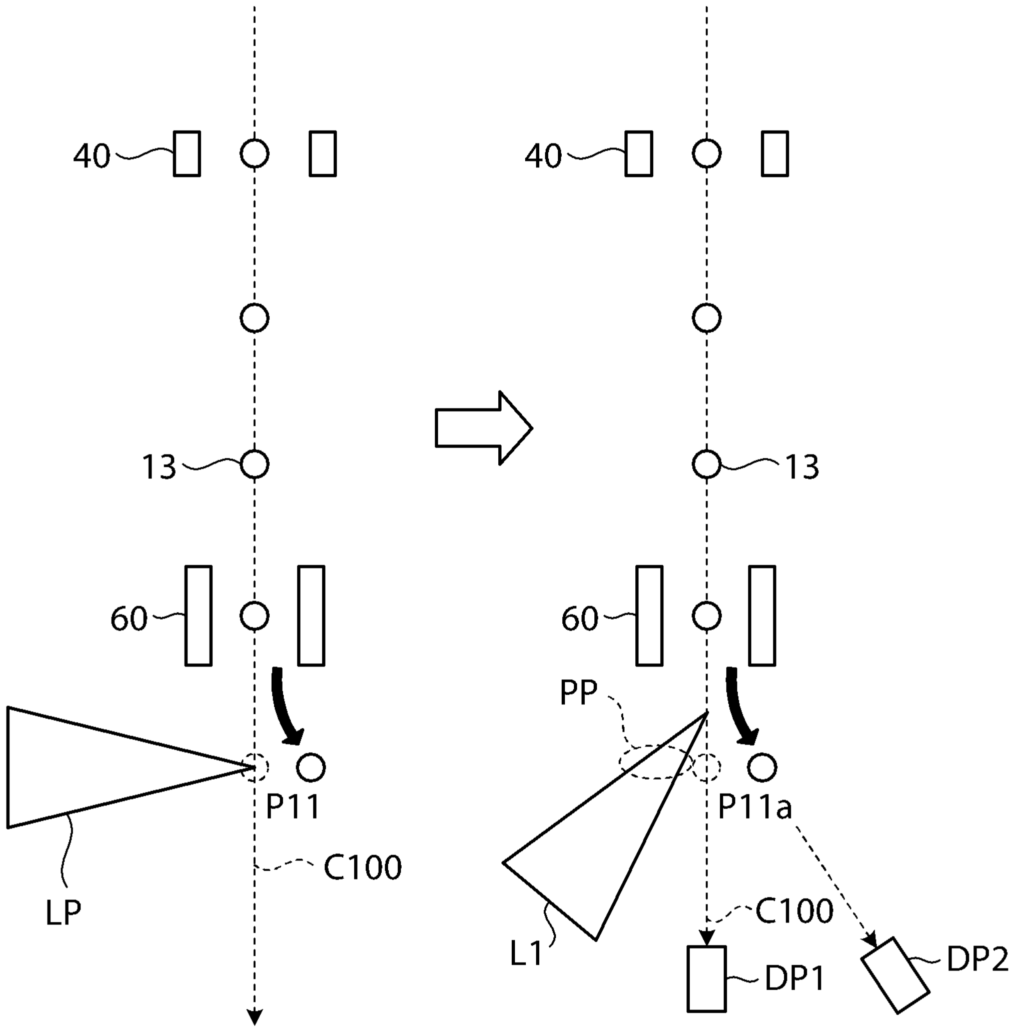
FIGS. 38A and 38B schematically illustrate an operation during a successive light emission pause period according to the third modification of the third embodiment.
Figure 39:
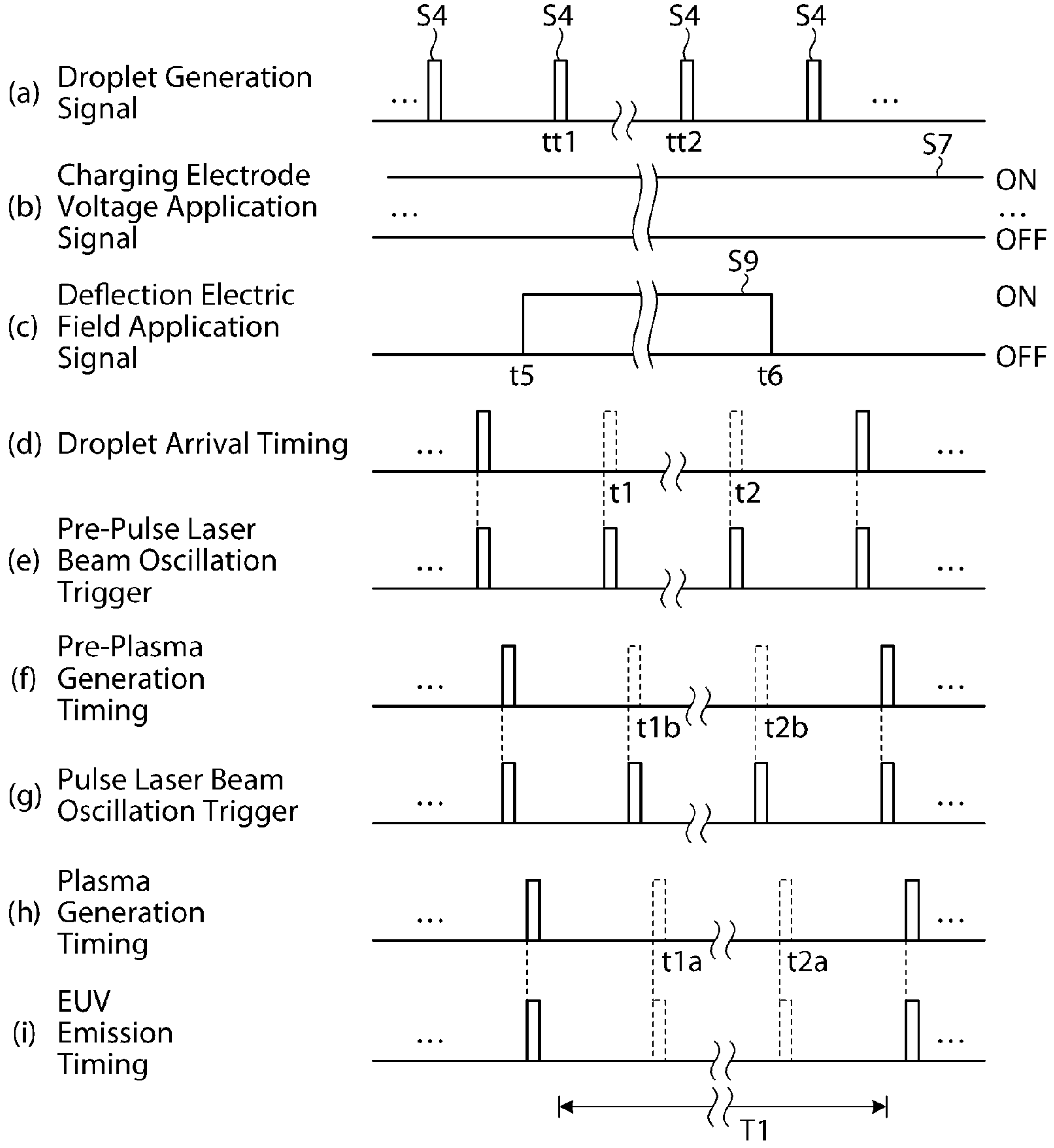
FIG. 39 is a timing chart illustrating an operation during the successive light emission pause period according to the third modification of the third embodiment.

For example, as shown in FIGS. 38A through 39, the charging electrode voltage application signal S7 may continually be applied to the charging electrode 40, whereby the droplet 13 passing therethrough may be charged (see (b) of FIG. 39), and the deflection electric field application signal S9 may be applied to the deflection mechanism 60 during the successive light emission pause period T1 (see (c) of FIG. 9). With this control, the charged droplet 13 may be deflected, and the trajectory thereof may be shifted to a trajectory which at least does not pass through the pre-plasma generation site P11 (see FIG. 38A). Accordingly, the charged droplet 13 may not arrive in the pre-plasma generation site P11. Therefore, the droplet 13 may not be irradiated with the pre-pulse laser beam LP. As a result, even when the pulse laser beam L1 is oscillated, the EUV light L10 may not be emitted. Note that in addition to the target collection unit DP1 for collecting the non-deflected droplet 13, a target collection unit DP2 may be provided for collecting the deflected droplet 13.

In the third modification of the third embodiment, emission of the EUV light L10 may be paused during the successive light emission pause period T1 while the driver laser 1 and the pre-pulse laser 30 may be in the successive light emission operation.

Figure 40:
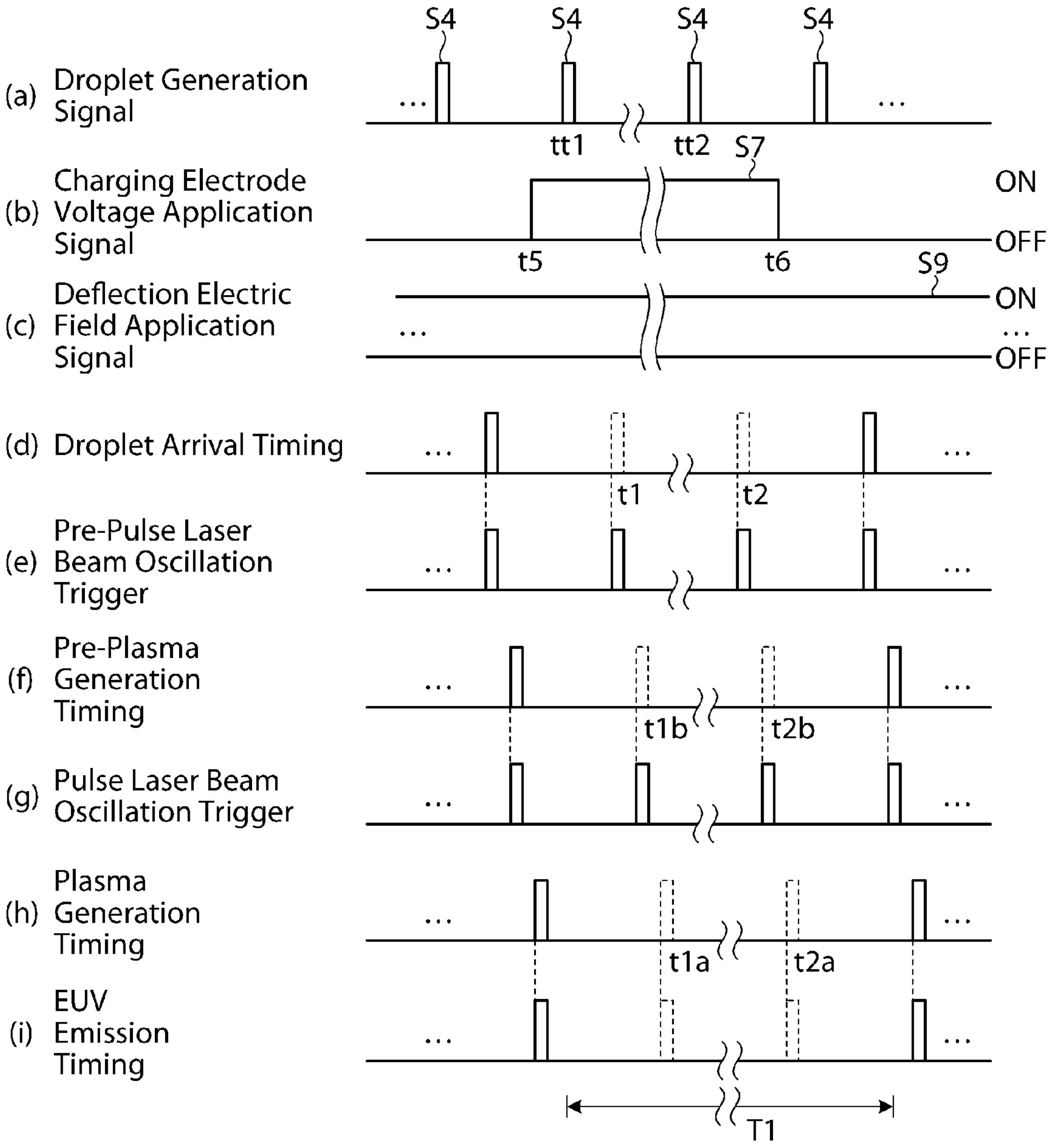
FIG. 40 is a timing chart illustrating an operation during a successive light emission pause period according to a fourth modification of the third embodiment.

As shown in FIG. 40, the configuration may be such that the charging electrode voltage application signal S7 is in the ON state only during the successive light emission pause period T1 to thereby cause the droplet 13 to be charged (see (b) of FIG. 40), and the deflection electric field application signal S9 is continually in the ON state, whereby the charged droplet 13 may be deflected (see (c) of FIG. 40). Alternatively, the configuration may be such that both the charging electrode voltage application signal S7 and the deflection electric field application signal S9 are in the ON state only during the successive light emission pause period T1.

Figures 41A, 41B:
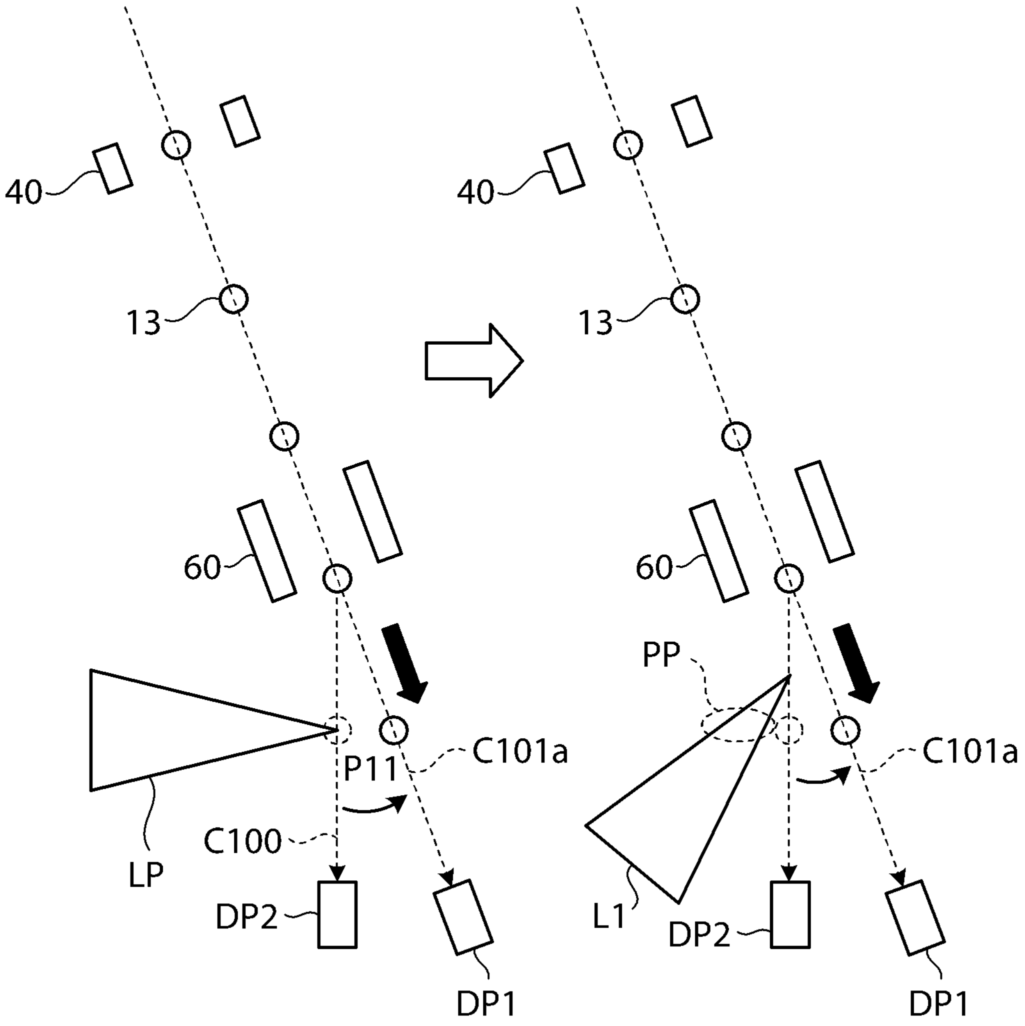
FIGS. 41A and 41B schematically illustrate an operation during a successive light emission pause period according to a fifth modification of the third embodiment.

Further, in the above-described third modification of the third embodiment, the charged droplet 13 may be deflected during the successive light emission pause period T1, whereby the trajectory thereof may be shifted. However, without being limited thereto, as shown in FIGS. 41A and 41B, the configuration may be such that the pre-plasma generation site P11 may be positioned on a deflected trajectory C100, and the charge droplet 13 may be continually deflected during the successive light emission period T2. In this case, the charged droplet 13 may not be deflected during the successive light emission pause period T1. With this, the charged droplet 13 may travel along a trajectory C101*a* on which the pre-plasma generation site P11 does not exist during the successive light emission pause period T1. Thus, the droplet 13 may be prevented from being irradiated with the pre-pulse laser beam LP, whereby generation of the EUV light L10 may be paused.

Figure 42:
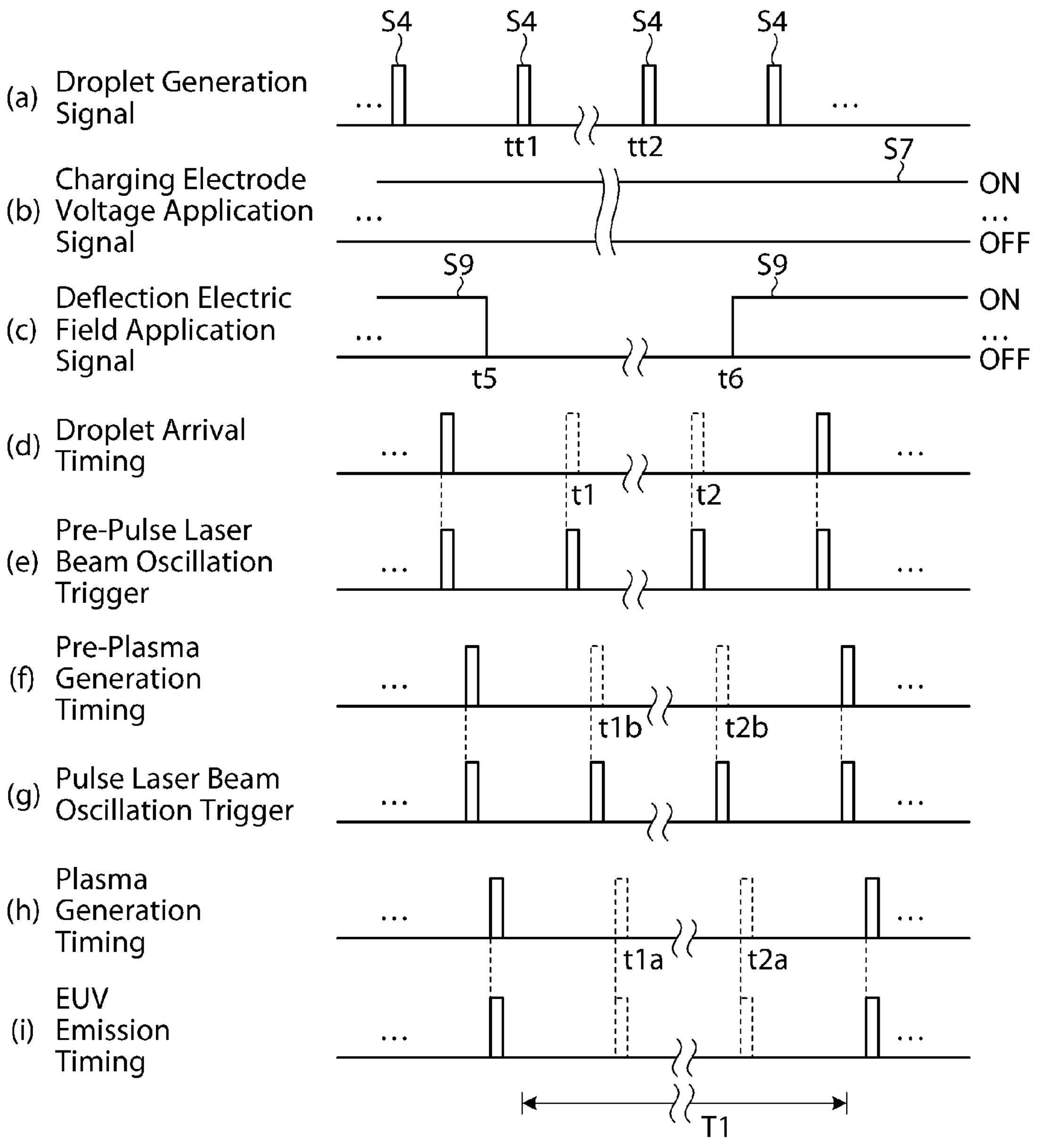
FIG. 42 is a timing chart illustrating the operation during the successive light emission pause period according to the fifth modification of the third embodiment.

Such deflection of the trajectory of the droplet 13 may be achieved by, as shown in FIG. 42 applying the charging electrode voltage application signal S7, which continually is in the ON state, to the charging electrode 40 (see (b) of FIG. 42), and applying the deflection electric field application signal S9, which is in the OFF state only during the successive light emission pause period T1, to the deflection mechanism 60 (see (c) of FIG. 42).

Figure 43:
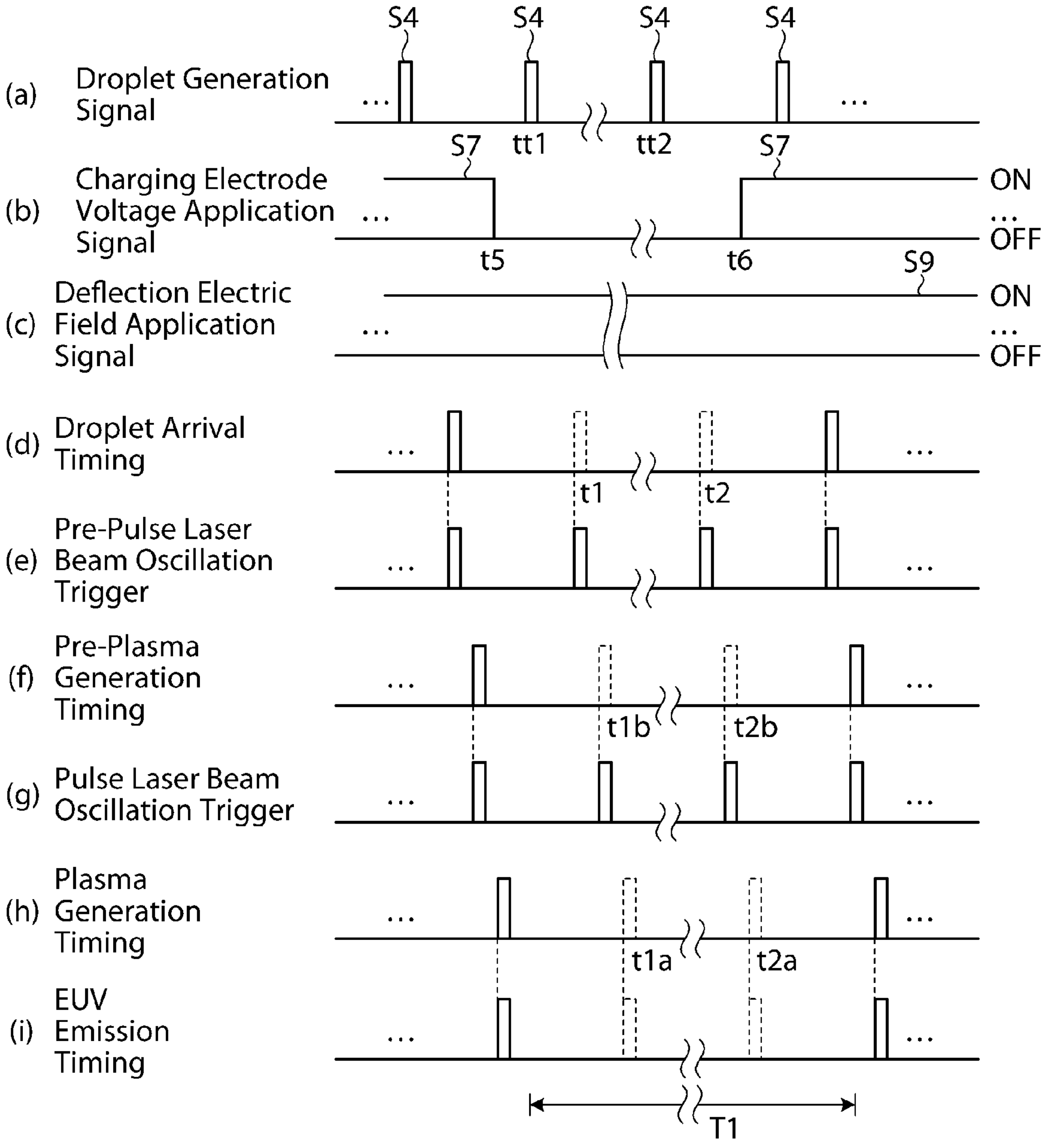
FIG. 43 is a timing chart illustrating an operation during a successive light emission pause period according to a sixth modification of the third embodiment.

Alternatively, as shown in FIG. 43, the deflection of the trajectory of the droplet 13 may also be achieved by applying the charging electrode voltage application signal S7, which is in the OFF state only during the successive light emission pause period T1, to the charging electrode 40 (see (b) of FIG. 43), and applying the deflection electric field application signal S9, which continually is in the ON state, to the deflection mechanism 60 (see (c) of FIG. 43). In this case, the deflection electric field application signal S9 may not be applied to the deflection mechanism 60 during the successive light emission pause period T1.

Summarizing these, six control patterns b1 through b6 shown in FIG. 44 may be exemplified as ON-OFF control patterns of the charging electrode 40 and of the deflection mechanism 60 for the successive light emission period T2 and the successive light emission pause period T1.

Figure 45:
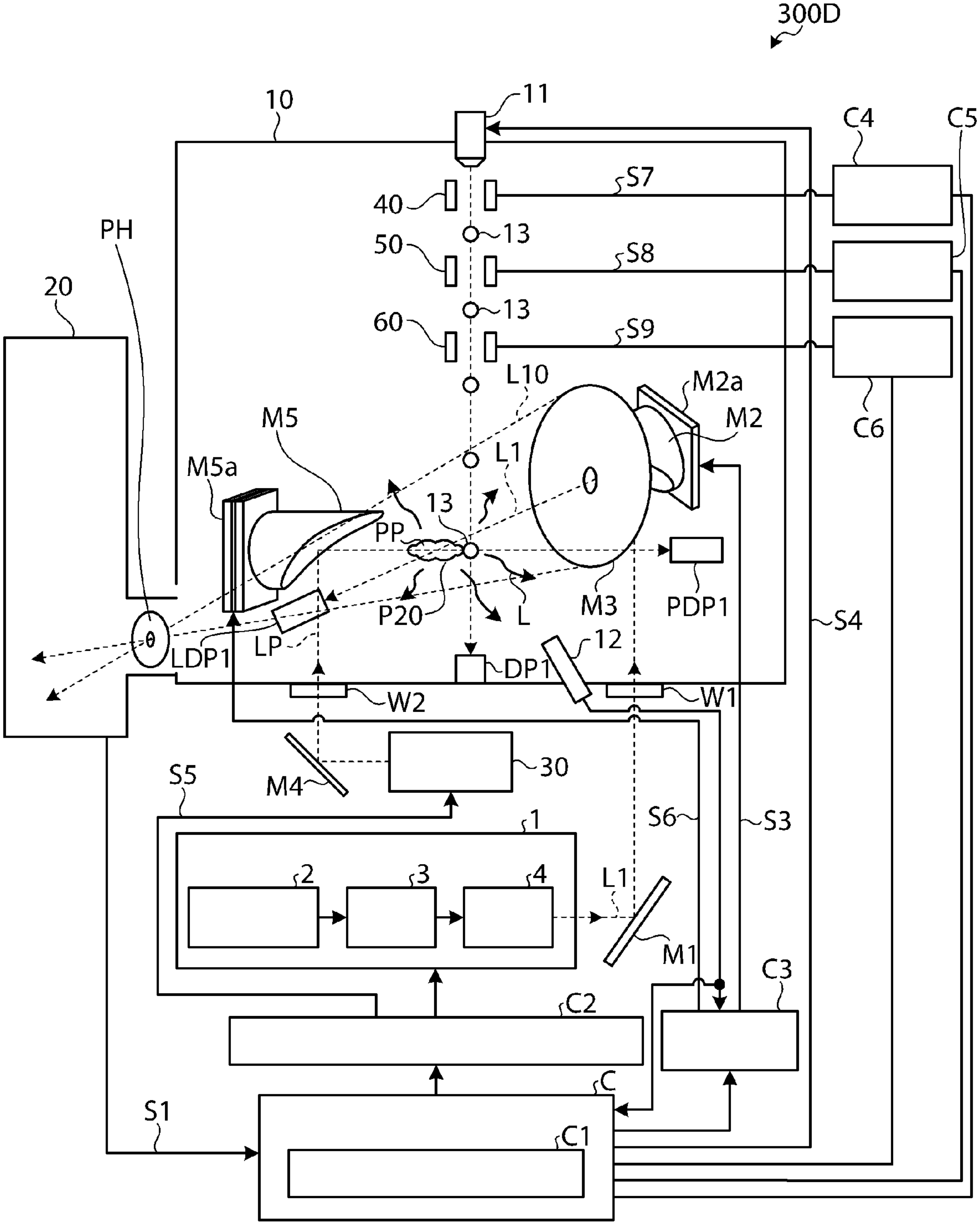
FIG. 45 schematically illustrates an EUV light source apparatus according to seventh modification of the third embodiment.

Here, as in an EUV light source apparatus 300D according to a fourth modification of the third embodiment shown in FIG. 45, all of the charging electrode 40, the acceleration/deceleration mechanism 50, and the deflection mechanism 60 may be provided. In this case, the configuration may be such that the charging electrode 40, the acceleration/deceleration mechanism 50, and the deflection mechanism 60 may selectively controlled to cause the traveling timing and/or the trajectory of the droplet 13 to be shifted during the successive light emission pause period T1, whereby emission of the EUV light L10 may be paused.

The charging electrode 40, the acceleration/deceleration mechanism 50, and the deflection mechanism 60 may be configured as separate units from the target supply unit 11 or integrated, in part or in the entirety thereof, with the target supply unit 11.

Further, in the above-described third embodiment and the modifications thereof, a method in which the output port of the target supply unit 11 is successively opened or closed in a predetermined cycle using a piezoelectric element, whereby the droplet 13 is outputted successively. However, without being limited thereto, a so-called drop-on-demand method may be adopted in which output of the droplet 13 may be started or stopped at a desired timing. In the drop-on-demand method, an output charging electrode, which may be turned ON/OFF, may be provided to the output port of the target supply unit 11. In such a case, the droplet 13 may be pulled out through the output port and outputted by electrostatic force generated as the output charging electrode is turned ON.

Figure 46:
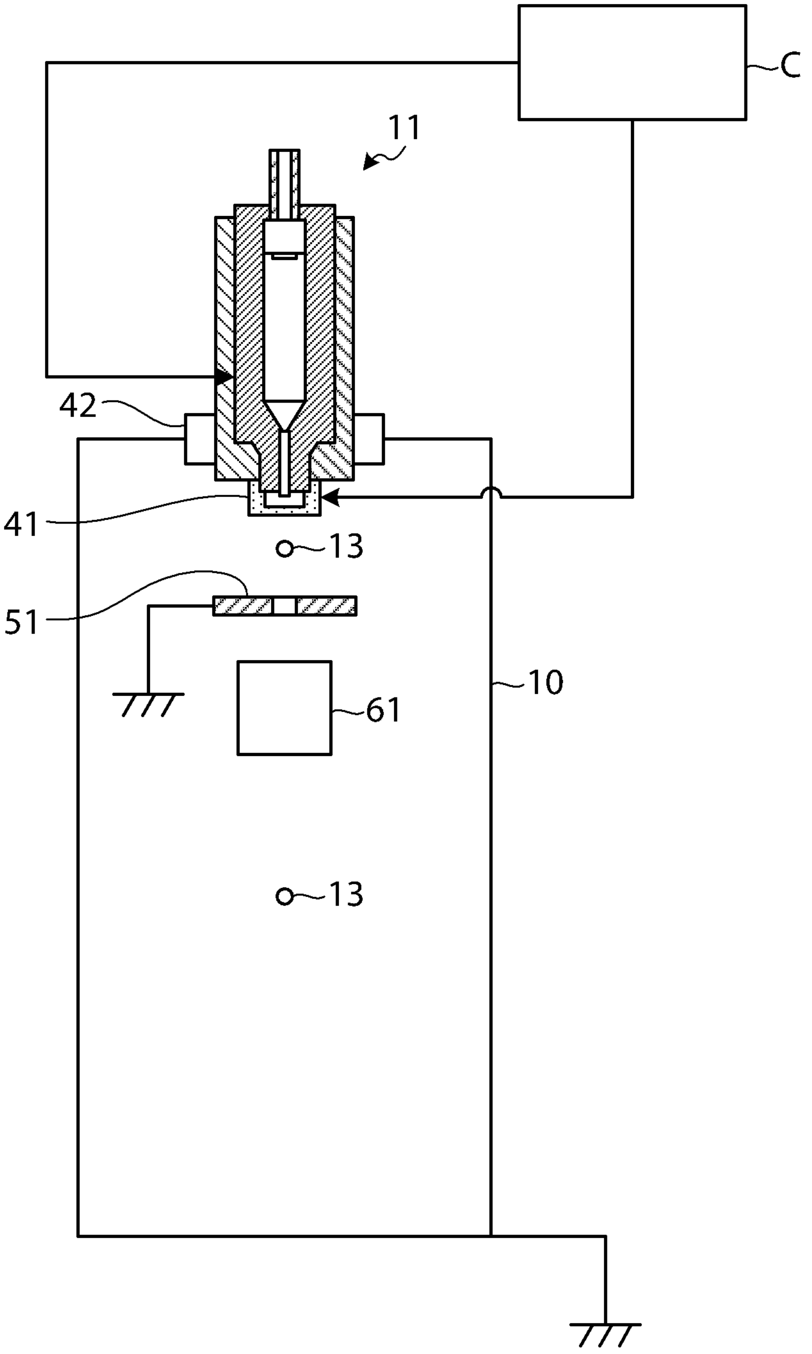
FIG. 46 schematically illustrates a target supply mechanism in which a drop-on-demand method is employed.

In particular, a target supply mechanism in which the drop-on-demand method may be employed may have the configuration shown in FIG. 46. As shown in FIG. 46, an output charging electrode 41 may be provided to the output port of the target supply unit 11, and the target material may be outputted as the droplet 13 in accordance with a pulse instruction sent from the EUV light source controller C. On the trajectory of the outputted droplet 13, an acceleration electrode 51 corresponding to the acceleration/deceleration mechanism 50 of FIG. 48 and a deflection mechanism 61 corresponding to the deflection mechanism 60 of FIG. 45 may be provided in this order.

The target supply unit 11 may be filled with liquid metal, such as molten Sn, serving as the target material. Here, as pulsed positive high voltage is applied to the output charging electrode 41, the liquid metal may be pulled out as the droplet 13 by the electrostatic force. At this time, the droplet 13 may be positively charged. In this way, the output charging electrode 41 may also function as the charging electrode 40 of FIG. 45. The target supply unit 11 may positively be charged, so that when the droplet 13 is outputted, the discharged droplet 13 may not return to the output port. The droplet 13 having passed through the output charging electrode 41 may be accelerated by the Coulomb force toward the disc-shaped acceleration electrode 51, which is grounded, and pass through a through-hole provided at the center of the acceleration electrode 51. Then, the accelerated droplet 13 may be deflection-controlled by the deflection mechanism 61, as in the deflection mechanism 60 of FIG. 45. The deflection mechanism 61 may be achieved, for example, by an electrostatic lens or the like, and deflect the trajectory of the droplet 13 electrostatically.

Note that the EUV chamber 10 may be grounded so as not to influence the trajectory of the outputted droplet 13. Further, the target supply unit 11 and the EUV chamber 10 are connected to each other with an insulating material 42 therebetween. This is because the droplet 13 may return toward the target supply unit 11 after being outputted therefrom if the vicinity of the connection part between the target supply unit 11 and the EUV chamber 10 are grounded.

In this case, when the droplet 13 is outputted, the droplet 13 may be always charged by the output charging electrode 41. Thus, the deflection control according to the above-mentioned control pattern a1 or a4 may be adopted.

It should be noted that the above-described first through third embodiments and the modifications thereof may be appropriately combined. For example, an embodiment or a modification in which the pre-pulse laser beam LP is used may be applied to an embodiment or a modification in which only the pulse laser beam L1 is used.

Figure 47:
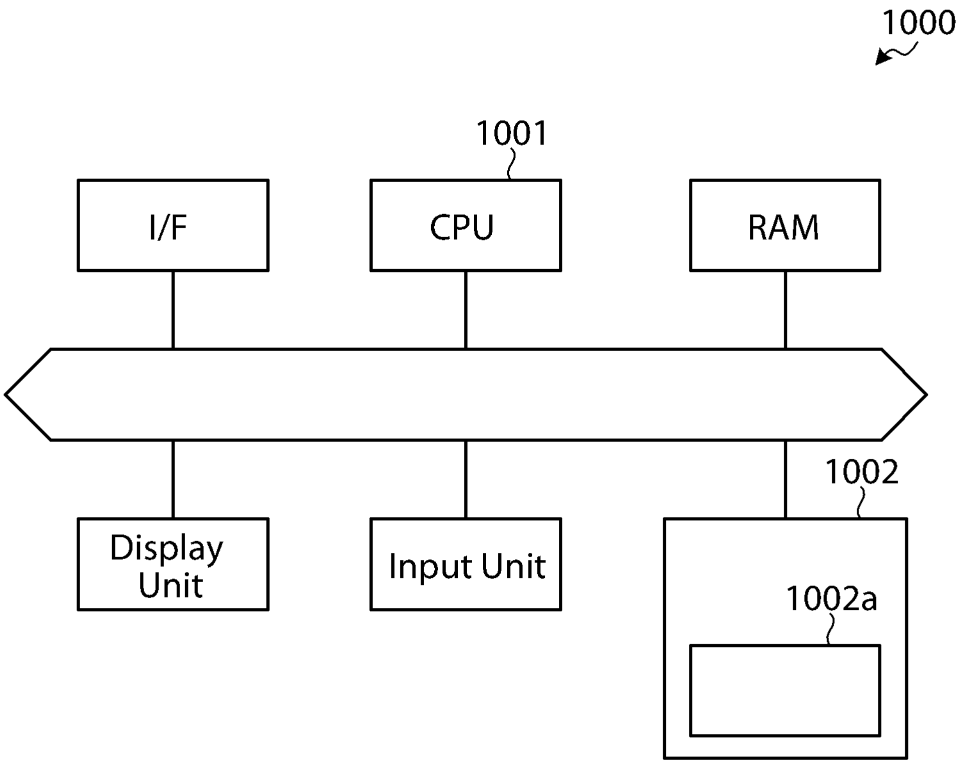
FIG. 47 schematically illustrates the configuration of controllers employed in the embodiments and the modifications thereof.

Further, various controllers (EUV light source controller C including burst control unit C1, laser controller C2, mirror controller C3, and so forth) of the above-described embodiments and the modifications thereof may be achieved, for example, using an information processing device 1000 as shown in FIG. 47. Operation of the various controllers may, for example, be achieved by a processing unit such as a CPU 1001 configured to read out and execute a program 1002*a* recorded in a recording medium (including writable or rewritable medium) 1002 such as a ROM, a CD-ROM, a DVD-ROM, or a flash memory.

What is claimed is:

1. An extreme ultraviolet light source apparatus configured to irradiate a target material with a laser beam from a laser apparatus, whereby the target material is turned into plasma and emits extreme ultraviolet light, the extreme ultraviolet light source apparatus comprising:

a laser apparatus configured to output a laser beam successively in pulses; and a burst control unit configured to control irradiation of the target material with the laser beam, such that, upon irradiation of the target material, the extreme ultraviolet light is emitted successively in pulses, and wherein the burst control unit is configured to prevent extreme ultraviolet light from being emitted from the target material by preventing the laser beam from irradiating the target material when the successive pulsed emission is paused.

2. The extreme ultraviolet light source apparatus of claim 1, wherein the target material is configured to move, and the burst control unit is configured to prevent the target material from emitting extreme ultraviolet light by displacing relative positions of the laser beam and of the target material when the successively pulsed emission is paused.

3. The extreme ultraviolet light source apparatus of claim 2, wherein the burst control unit is configured to shift at least one of an optical axis of the laser beam and a trajectory of the target material to thereby displace the relative positions of the laser beam and of the target material.

4. The extreme ultraviolet light source apparatus of claim 2, wherein the burst control unit is configured to shift at least one of oscillation timing of the laser beam and supply timing of the target material to thereby displace the relative positions of the laser beam and of the target material.

5. The extreme ultraviolet light source apparatus of claim 2, wherein the burst control unit is configured to accelerate or decelerate the target material to thereby displace the relative positions of the laser beam and of the target material.

6. The extreme ultraviolet light source apparatus of claim 1, wherein the burst control unit is configured to shift a focus of the laser beam to thereby reduce energy of the laser beam with which the target material is irradiated.

7. The extreme ultraviolet light source apparatus of claim 1, wherein the laser beam includes a first laser beam for turning the target material into pre-plasma or into a fragment, and a second laser beam for turning the pre-plasma or the fragment into plasma, and the burst control unit is configured to prevent the target material from being turned into a fragment or pre-plasma and into plasma by displacing a relative position of at least one of the first and second laser beams and the target material when the successive pulsed emission is paused.

8. The extreme ultraviolet light source apparatus of claim 7, wherein the burst control unit is configured to shift at least one of a beam axis of at least one of the first and second laser beams and a trajectory of the target material to thereby displace the relative positions of at least one of the first and second laser beams and of the target material.

9. The extreme ultraviolet light source apparatus of claim 7, wherein the burst control unit is configured to shift at least one of oscillation timing of at least one of the first and second laser beams and supply timing of the target material to thereby displace the relative positions of at least one of the first and second laser beams and of the target material.

10. The extreme ultraviolet light source apparatus of claim 7, wherein the burst control unit is configured to accelerate or decelerate the target material to thereby displace the relative positions of at least one of the first and second laser beams and of the target material.

11. The extreme ultraviolet light source apparatus of claim 7, wherein the burst control unit is configured to stop oscillation of the first laser beam when the successively pulsed emission is paused.

12. The extreme ultraviolet light source apparatus of claim 7, wherein the burst control unit is configured to shift a focus of at least one of the first and second laser beams to thereby reduce energy of the at least one of the first and second laser beams with which the target material is irradiated.

13. The extreme ultraviolet light source apparatus of claim 1, wherein the burst control unit is configured to stop supply of the target material when the successive pulsed emission is paused.

14. A method for controlling a light source apparatus configured to irradiate a target material with a laser beam from a laser apparatus, whereby the target material is turned into plasma and emits extreme ultraviolet light, the method comprising:

irradiating the target material with the laser beam outputted from the laser apparatus such that extreme ultraviolet light is emitted successively in pulses; and preventing the laser beam from irradiating the target material, thereby preventing the target material from being turned into plasma by the laser beam while the laser beam is outputted from the laser apparatus successively in pulses when the successively pulsed emission is paused.

15. A non-transitory tangible recording medium with a program recorded thereon for controlling a light source apparatus in which a target material is irradiated with a laser beam from a laser apparatus and the target material is turned into plasma and which emits extreme ultraviolet light, the non-transitory tangible recording medium comprising:

a program which causes the light source apparatus to control irradiation of the target material with the laser beam outputted successively in pulses from the laser apparatus such that extreme ultraviolet light is emitted successively in pulses upon irradiation of the target material, and prevent extreme ultraviolet light from being emitted from the target material by preventing the laser beam from irradiating the target material when the successive pulsed emission is paused.

16. The non-transitory tangible recording medium with the program recorded thereon of claim 15, wherein a target supply unit is configured to supply the target material, and the light source apparatus is configured to prevent the target material from emitting extreme ultraviolet light by displacing relative positions of the laser beam and of the target material when the successive pulsed emission is paused.

17. The non-transitory tangible recording medium with the program recorded thereon of claim 15, wherein the laser beam includes a first laser beam for turning the target material into pre-plasma or into a fragment, and a second laser beam for turning the pre-plasma or the fragment into plasma, and the light source apparatus is configured to prevent the target material from being turned into a fragment or pre-plasma and into plasma by displacing relative positions of at least one of the first and second laser beams and of the target material when the successive pulsed emission is paused.

18. The non-transitory tangible recording medium with the program recorded thereon of claim 15, wherein the light source apparatus is configured to shift a focus of at least one of the first and second laser beams to thereby reduce energy of the at least one of the first and second laser beams with which the target material is irradiated.

19. The non-transitory tangible recording medium with the program recorded thereon of claim 15, wherein the light source apparatus is configured to stop supply of the target material when the successive pulsed emission is paused.

* * * * *